(12) United States Patent
Tanaka et al.

(10) Patent No.: US 11,270,047 B2
(45) Date of Patent: Mar. 8, 2022

(54) METAL SHEET FORMING METHOD, INTERMEDIATE SHAPE DESIGN METHOD, METAL SHEET FORMING DIE, COMPUTER PROGRAM, AND RECORDING MEDIUM

(71) Applicant: NIPPON STEEL CORPORATION, Tokyo (JP)

(72) Inventors: Yasuharu Tanaka, Tokyo (JP); Takashi Miyagi, Tokyo (JP); Misao Ogawa, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 352 days.

(21) Appl. No.: 16/471,442

(22) PCT Filed: Dec. 25, 2017

(86) PCT No.: PCT/JP2017/046477
§ 371 (c)(1),
(2) Date: Jun. 19, 2019

(87) PCT Pub. No.: WO2018/123989
PCT Pub. Date: Jul. 5, 2018

(65) Prior Publication Data
US 2020/0311325 A1    Oct. 1, 2020

(30) Foreign Application Priority Data
Dec. 26, 2016   (JP) .............................. JP2016-251820

(51) Int. Cl.
*G06F 30/23* (2020.01)
*B21D 22/24* (2006.01)

(52) U.S. Cl.
CPC ............. *G06F 30/23* (2020.01); *B21D 22/24* (2013.01)

(58) Field of Classification Search
CPC .......... G06F 30/23; B21D 22/24; B21D 22/00; B21D 22/26
See application file for complete search history.

(56) References Cited

U.S. PATENT DOCUMENTS 6,722,174 B1 * 4/2004 Nishii ...................... B21B 1/02
72/200
2007/0125149 A1 * 6/2007 Yoshitome ............. B21D 22/02
72/356
(Continued)

FOREIGN PATENT DOCUMENTS

CN       105960295 A    9/2016
EP        3100797 A1   12/2016
(Continued)

OTHER PUBLICATIONS

Kim et al., "Finite element inverse analysis for the design of intermediate dies in multi-stage deep-drawing processes with large aspect ratio", Journal of Materials Processing Technology, 2001, vol. 113, pp. 779-785 (7 pages).
(Continued)

*Primary Examiner* — Doon Y Chow
*Assistant Examiner* — Phuong N Hoang
(74) *Attorney, Agent, or Firm* — Solaris Intellectual Property Group, PLLC

(57) ABSTRACT

A method of forming a metal sheet into a target shape by press-forming, such that the metal sheet is formed into an intermediate shape that is different from the target shape and then the target shape is formed from the intermediate shape, the method includes: when forming the intermediate shape from the metal sheet, forming the intermediate shape by forming a first region including at least a portion at which a ratio of sheet thickness reduction from the metal sheet is larger when the target shape is formed via the intermediate
(Continued)

shape than when the target shape is formed directly from the metal sheet.

30 Claims, 40 Drawing Sheets

(56) References Cited

U.S. PATENT DOCUMENTS

| | | | | |
|---|---|---|---|---|
| 2009/0119031 | A1* | 5/2009 | Niwa | B21D 22/02 702/43 |
| 2015/0082855 | A1* | 3/2015 | Fujii | G01N 3/28 72/379.2 |
| 2016/0288184 | A1* | 10/2016 | Zhao | B21D 5/02 |
| 2016/0354825 | A1 | 12/2016 | Shinmiya et al. | |
| 2017/0140081 | A1* | 5/2017 | Suzuki | B21D 37/20 |
| 2018/0185899 | A1* | 7/2018 | Saito | B21D 22/26 |

FOREIGN PATENT DOCUMENTS

| | | |
|---|---|---|
| JP | 2007-326112 A | 12/2007 |
| JP | 2010-172916 A | 8/2010 |
| JP | 4879588 B2 | 2/2012 |
| JP | 2015-110237 A | 6/2015 |
| JP | 2016-104492 A | 6/2016 |
| KR | 10-2016-0101126 A | 8/2016 |
| WO | WO 2015/115348 A1 | 8/2015 |

OTHER PUBLICATIONS

International Preliminary Report on Patentability and English translation of the Written Opinion of the International Searching Authority, dated Jul. 11, 2019, for International Application No. PCT/JP2017/046477.
International Search Report for PCT/JP2017/046477 dated Mar. 20, 2018.
Written Opinion of the International Searching Authority for PCT/JP2017/046477 (PCT/ISA/237) dated Mar. 20, 2018.
Chinese Office Action, dated Feb. 3, 2020 for Chinese Application No. 201780078222.7, with an English translation.
Russian Office Action, dated Feb. 17, 2020, for Russian Application No. 2019119706, with an English translation.

* cited by examiner

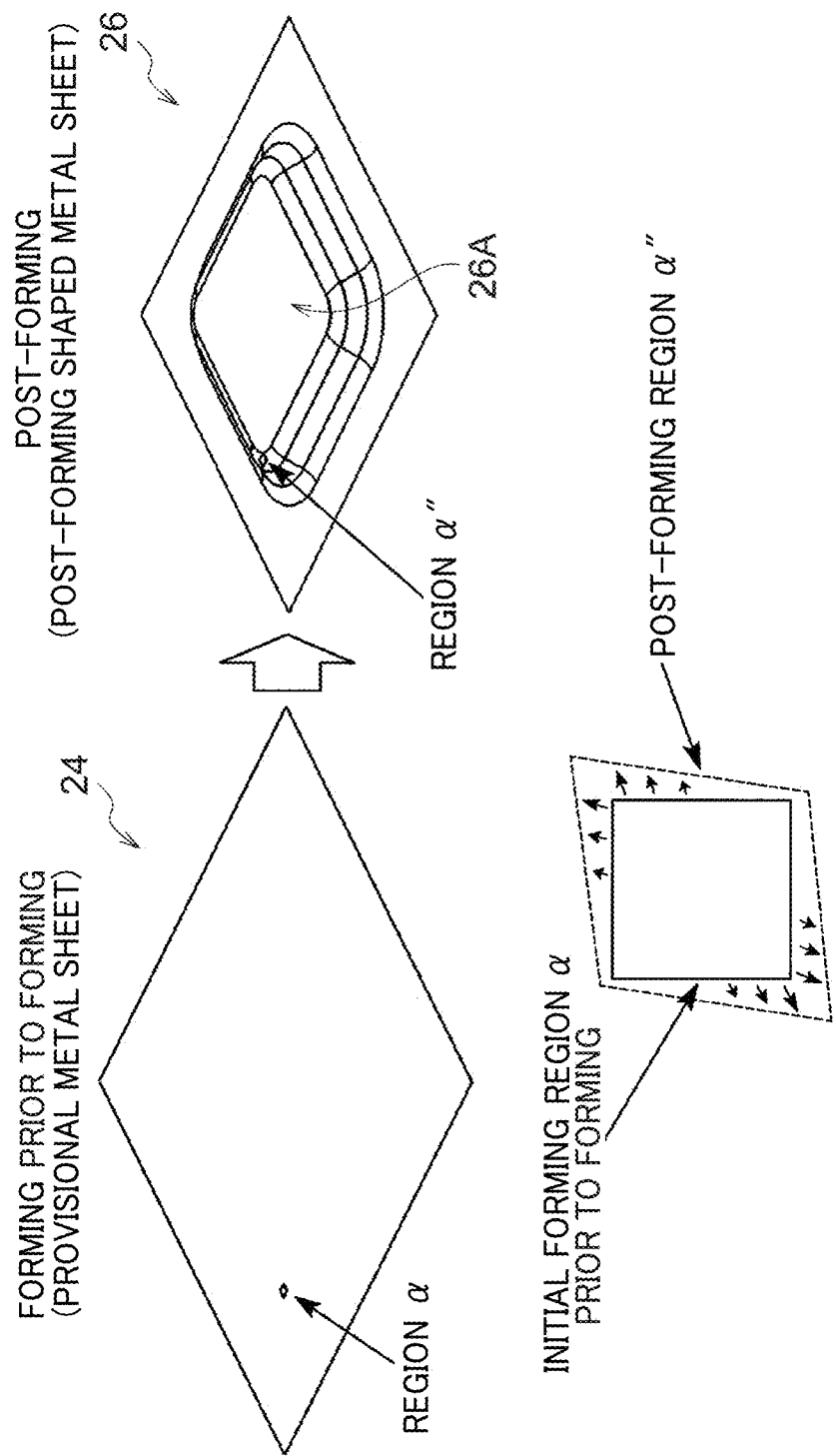

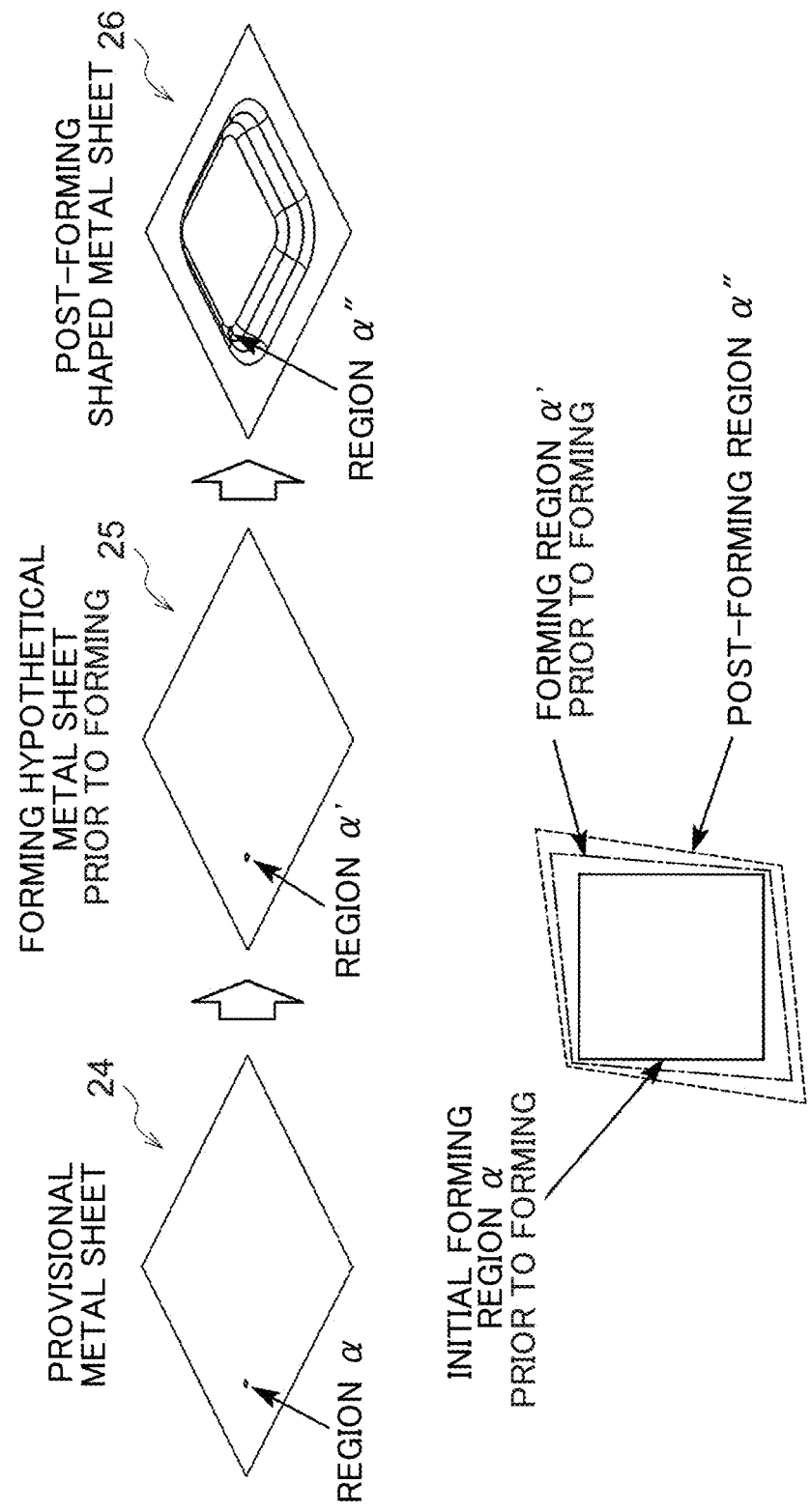

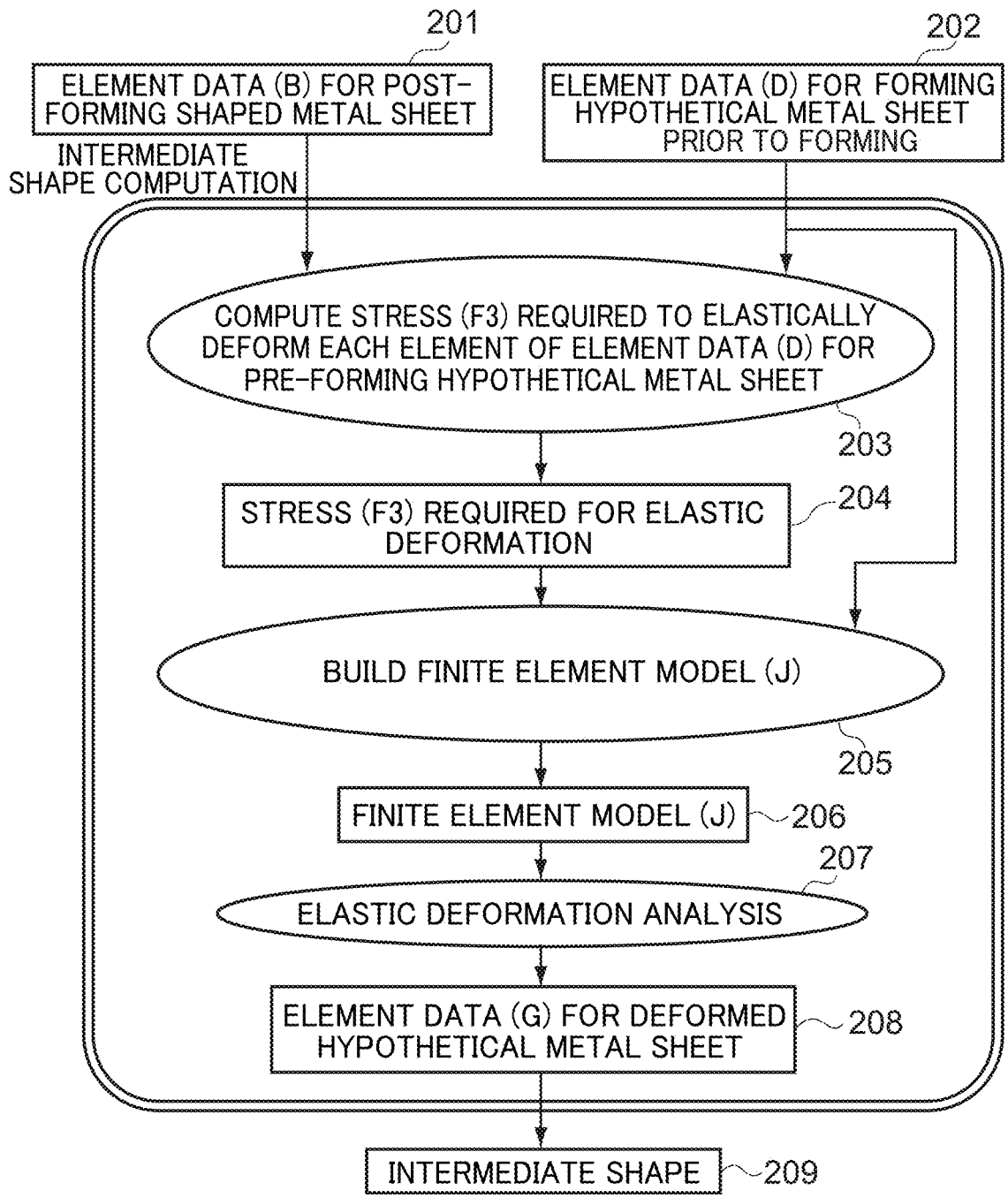

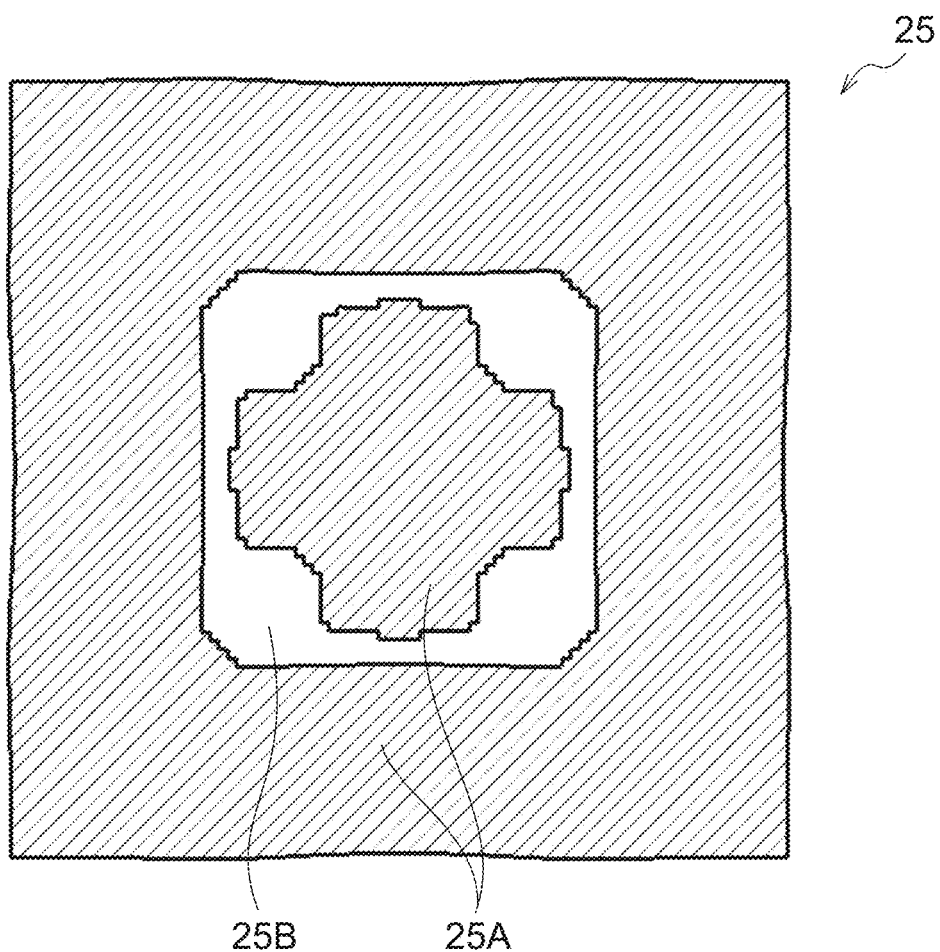

FIG.14B
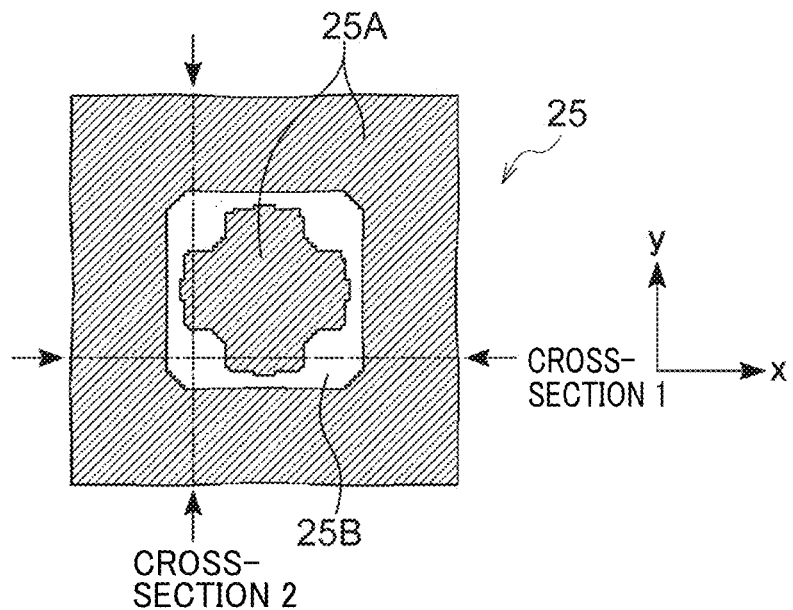
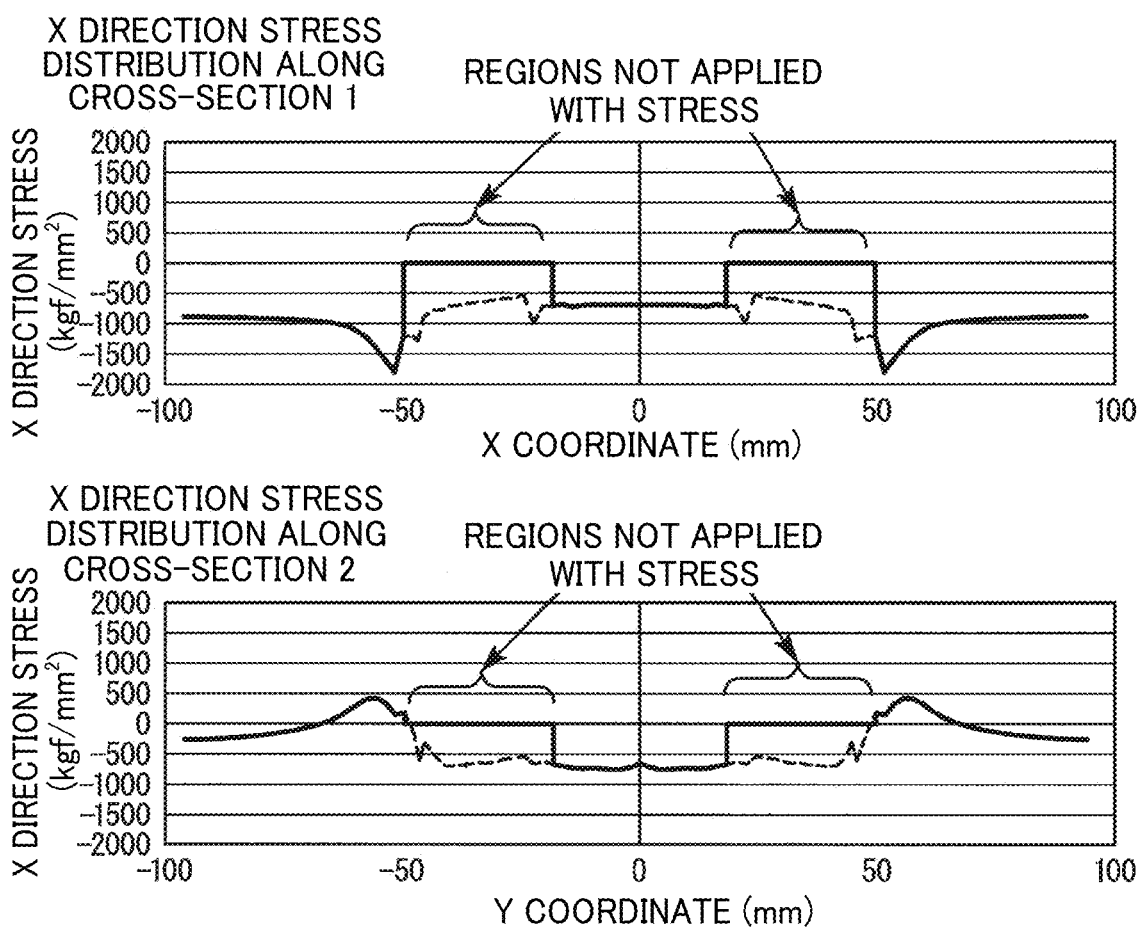

FIG.14C
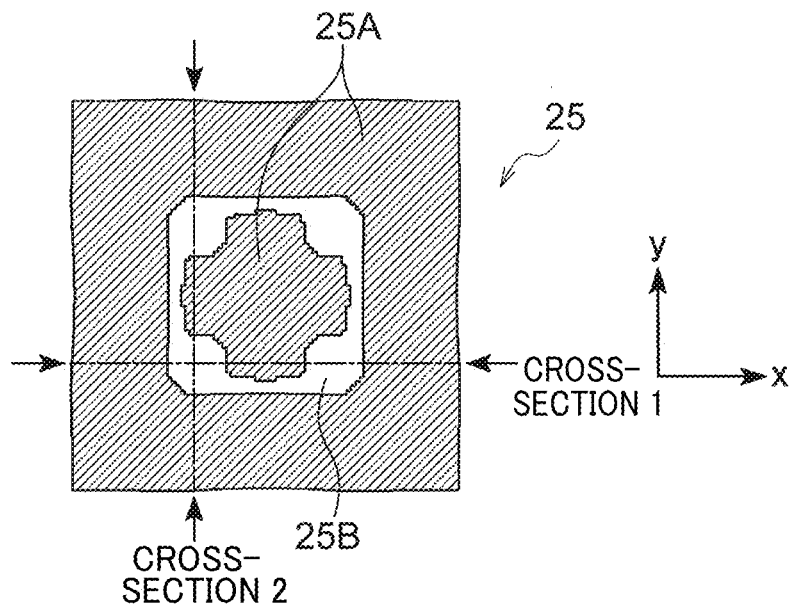
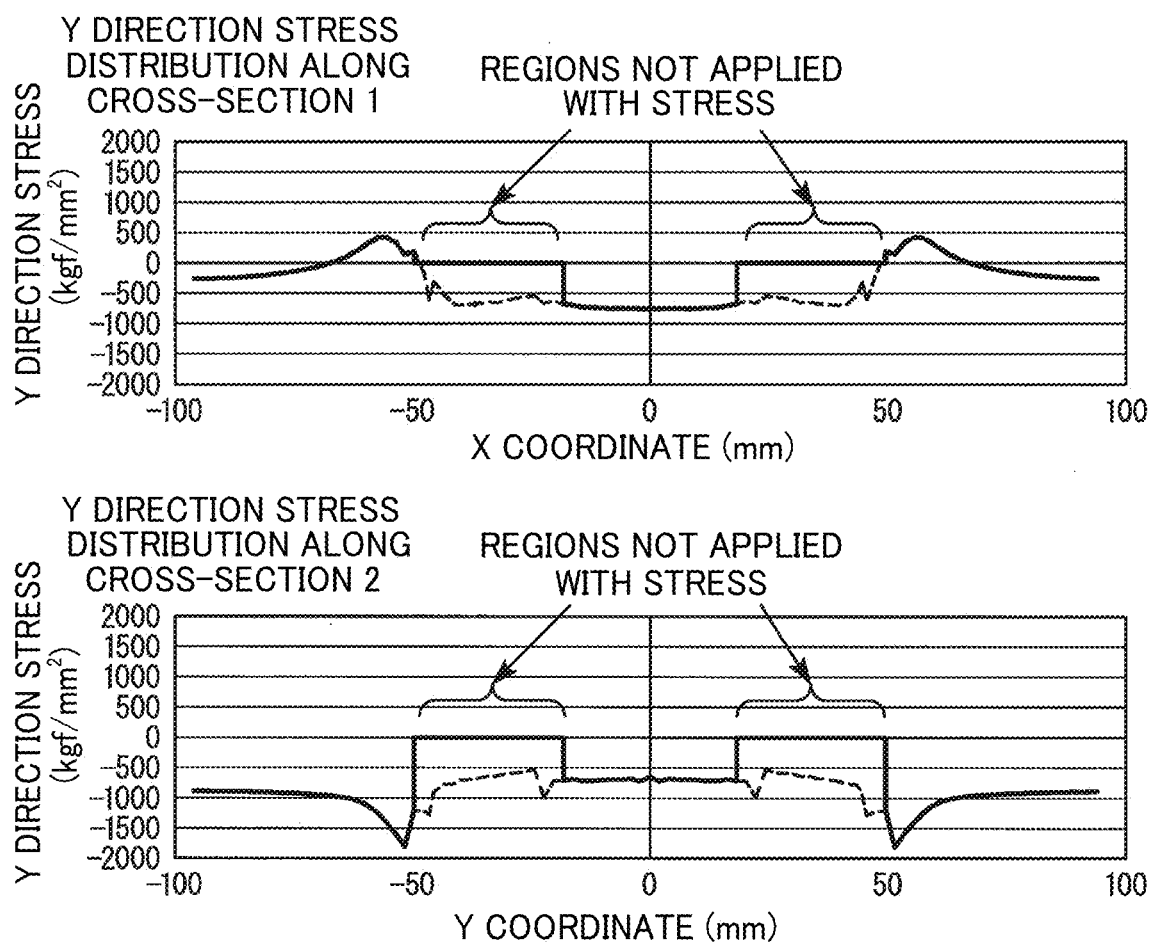

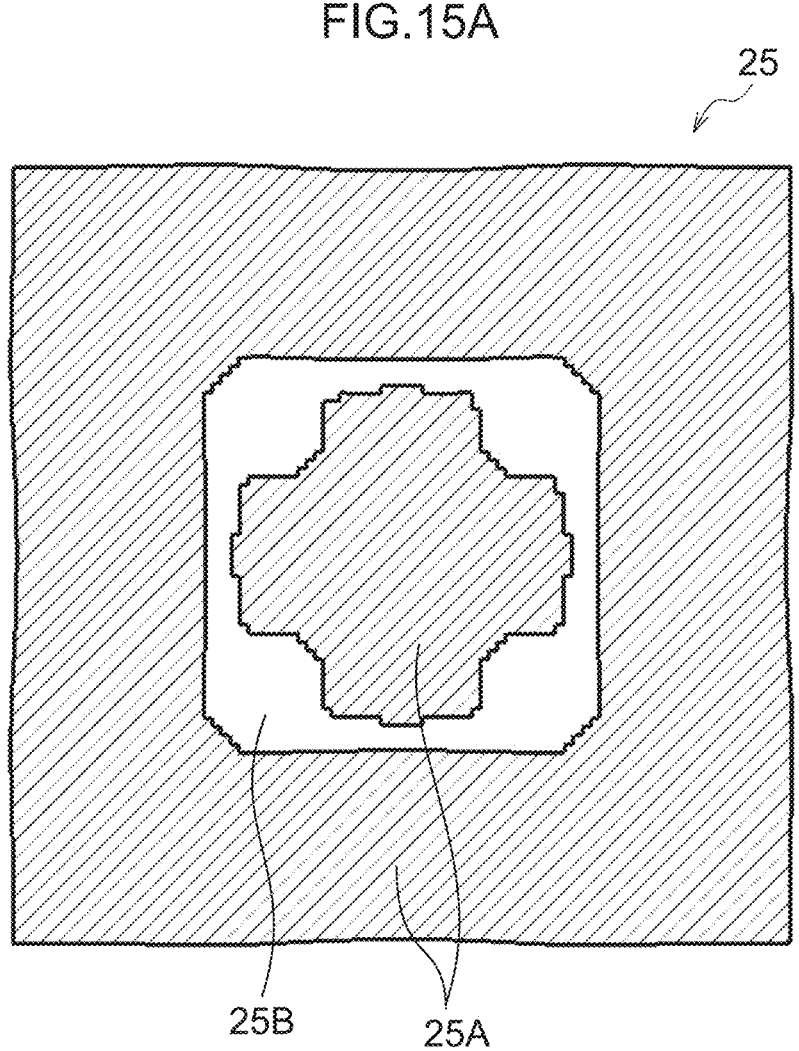

FIG.15B
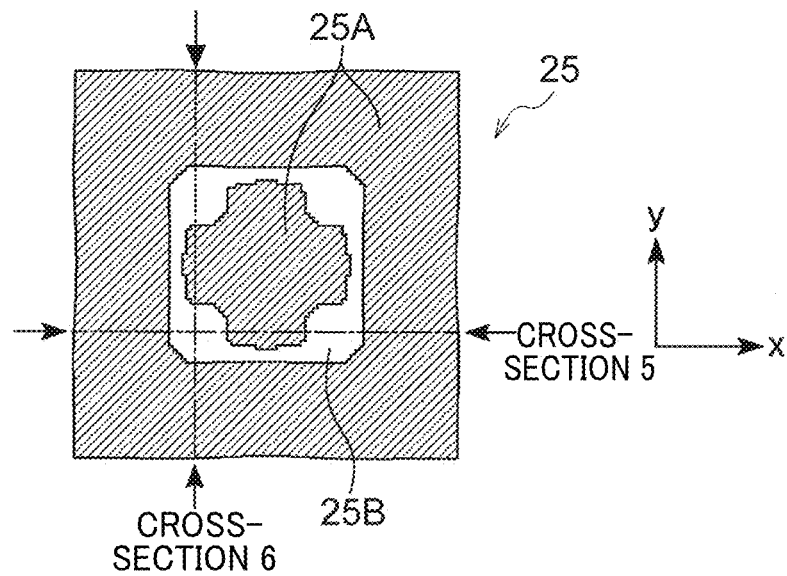
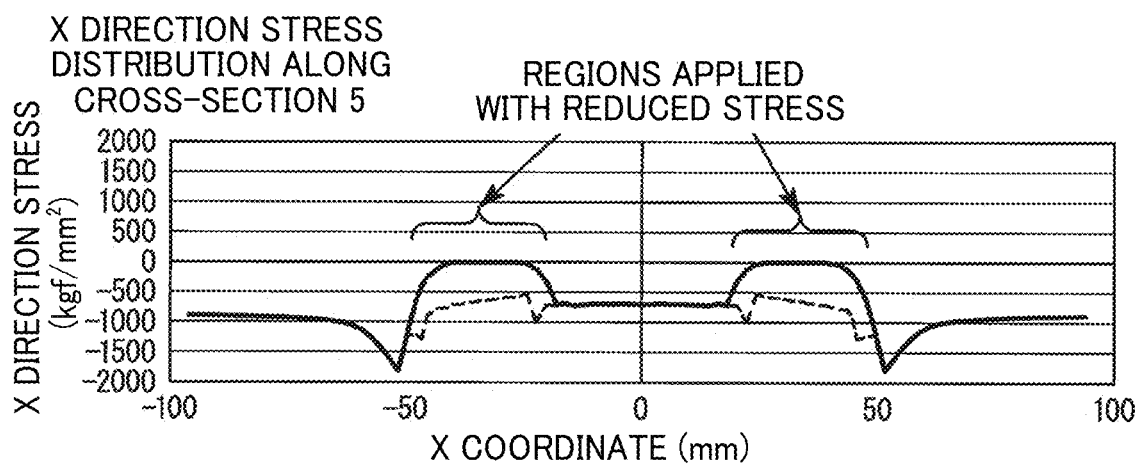
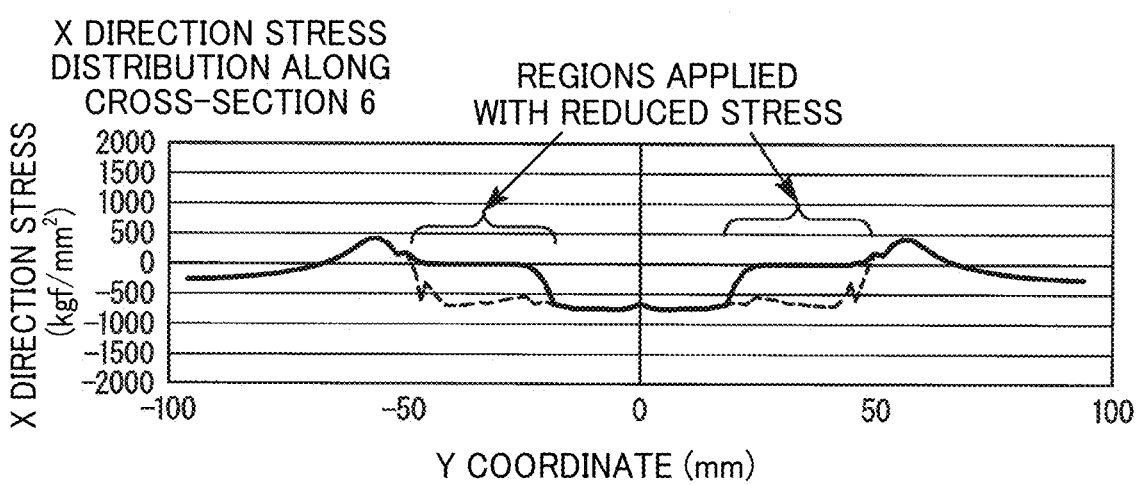

FIG.15C
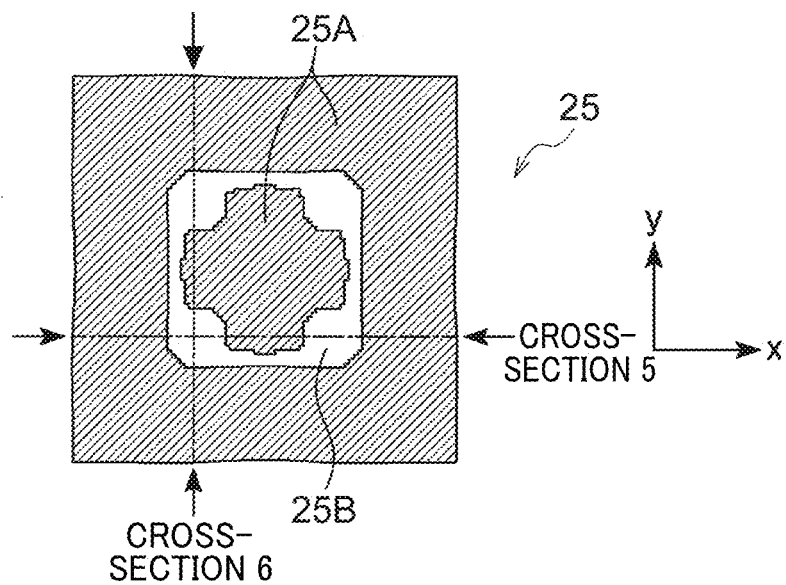
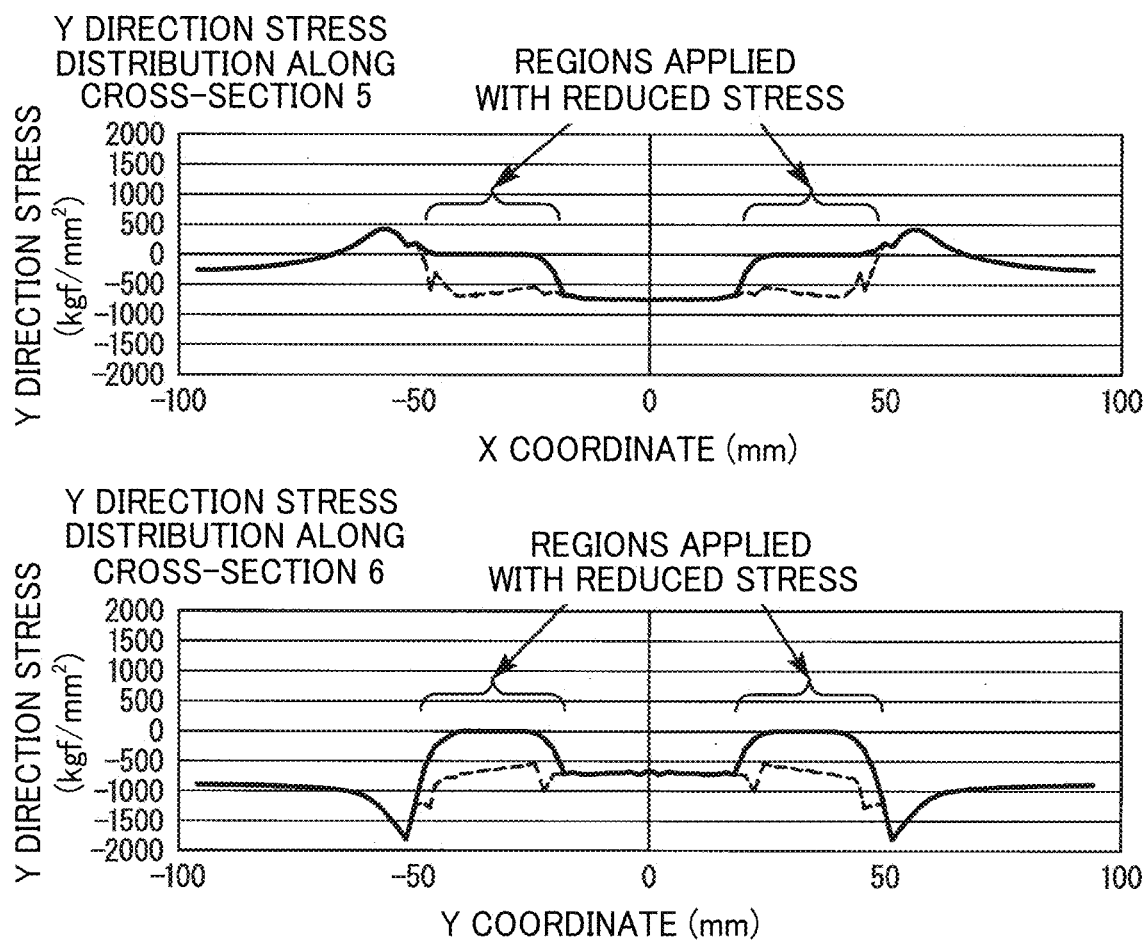

FIG.16A
(a)
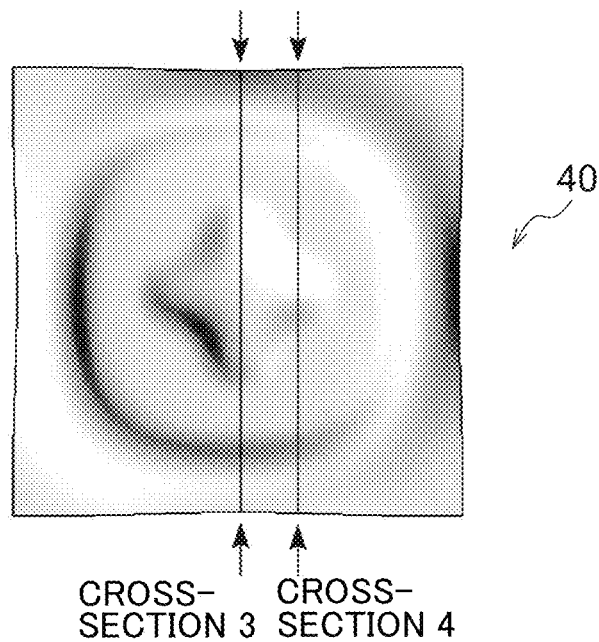
CROSS-SECTION 3    CROSS-SECTION 4
(b)
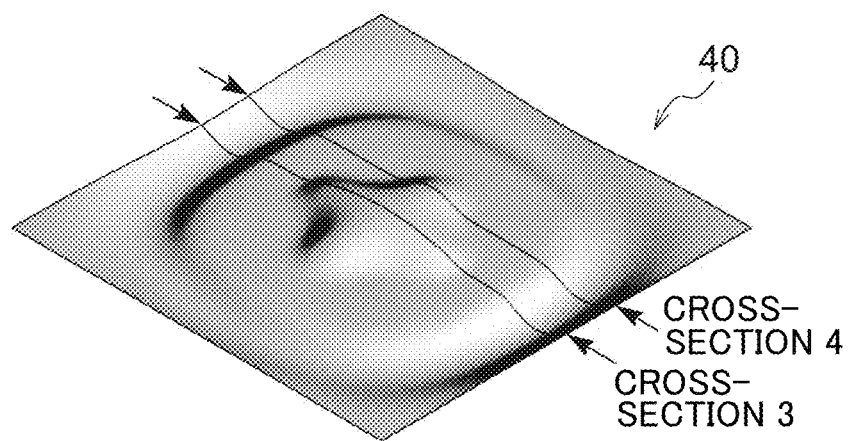
CROSS-SECTION 4
CROSS-SECTION 3
(c)
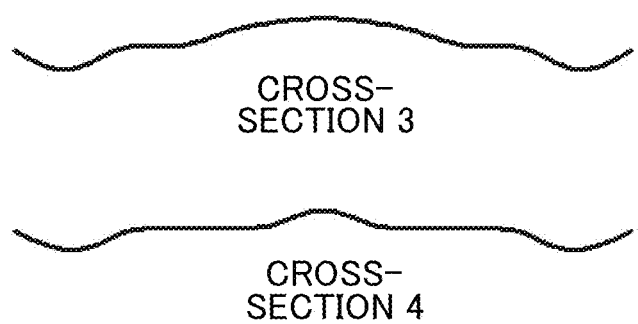
CROSS-SECTION 3
CROSS-SECTION 4

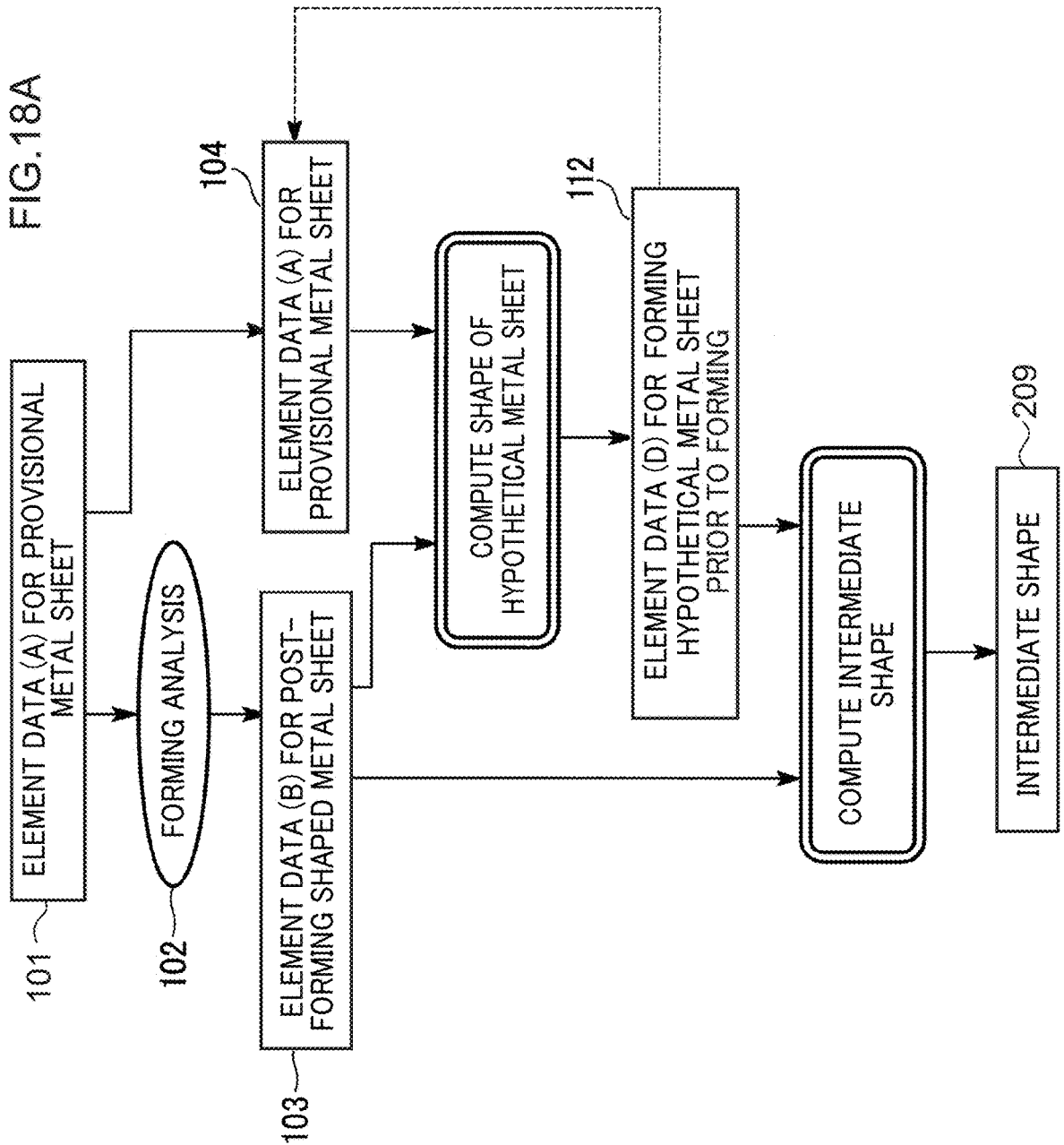

25

25

(a)
FIG.27
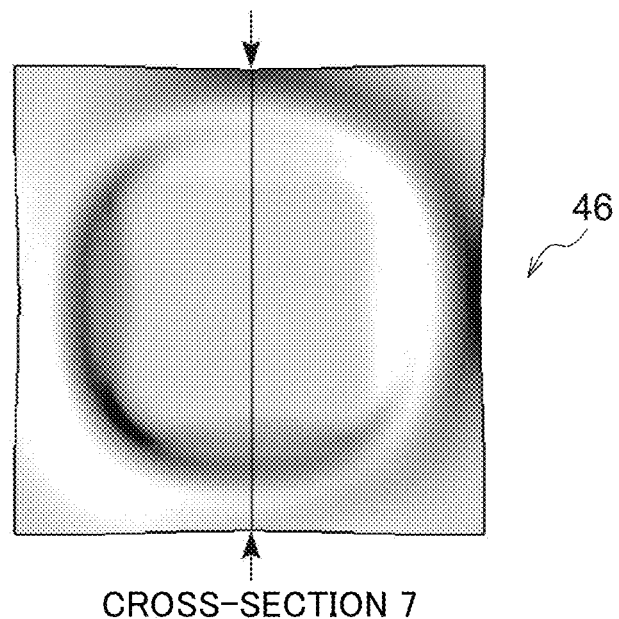
CROSS-SECTION 7
(b)
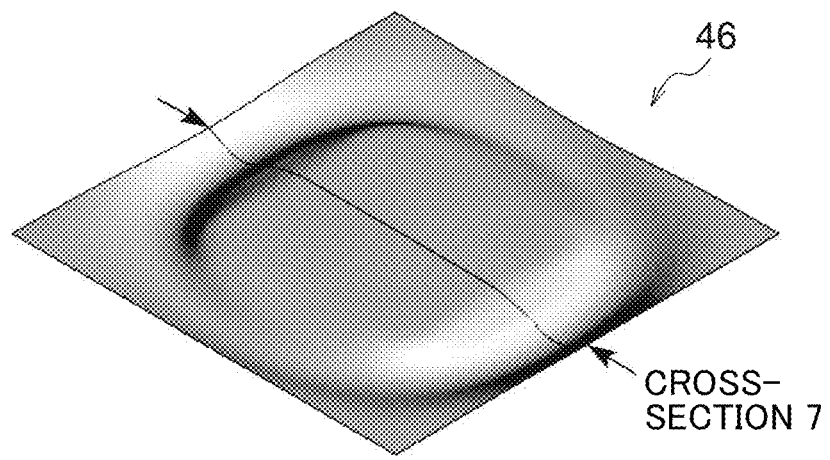
CROSS-SECTION 7
(c)
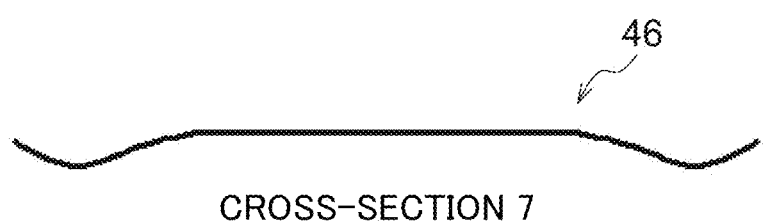
CROSS-SECTION 7

FIG.28
(a)
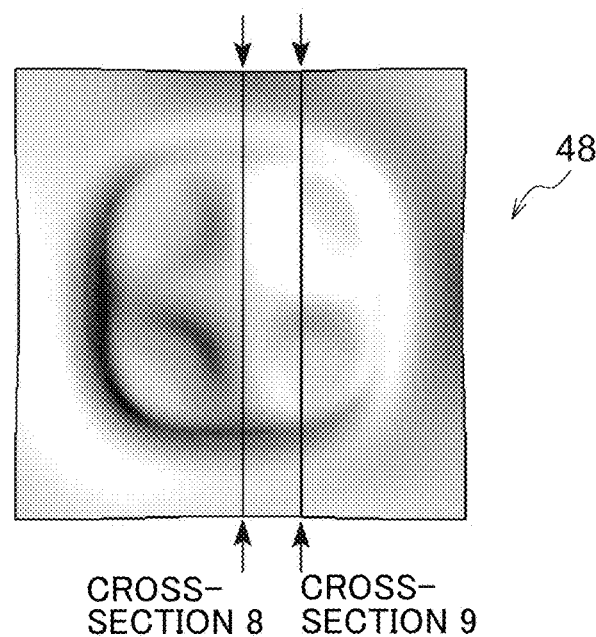
CROSS-SECTION 8   CROSS-SECTION 9
(b)
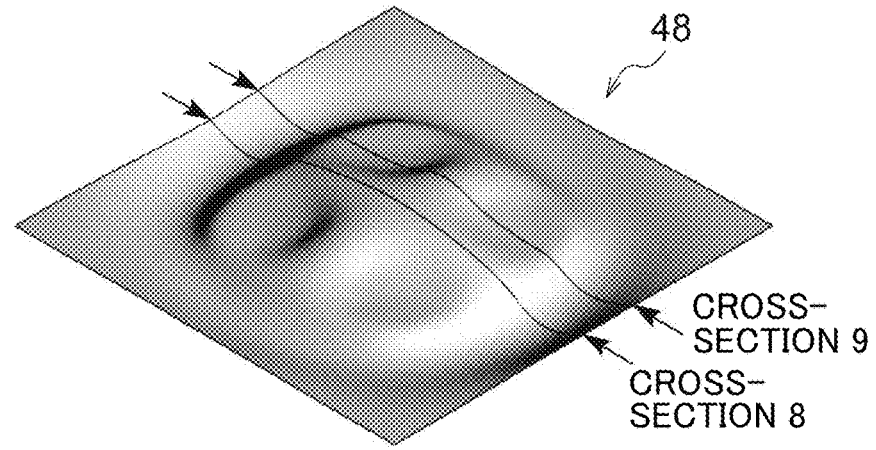
CROSS-SECTION 9
CROSS-SECTION 8
(c)
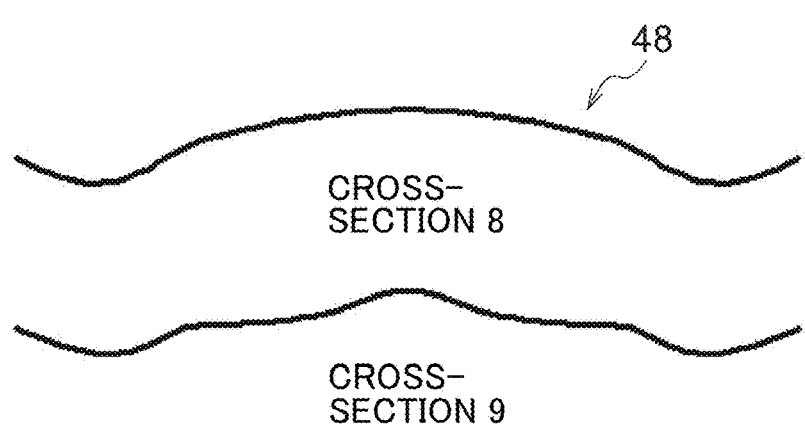
CROSS-SECTION 8
CROSS-SECTION 9

METAL SHEET FORMING METHOD, INTERMEDIATE SHAPE DESIGN METHOD, METAL SHEET FORMING DIE, COMPUTER PROGRAM, AND RECORDING MEDIUM

TECHNICAL FIELD

The present invention relates to a metal sheet forming method, an intermediate shape design method, and a metal sheet forming die, computer program, and recording medium.

BACKGROUND ART

A reduction in sheet thickness is not necessarily uniform across portions deformed by pressing in press-forming a metal sheet. For example, when a metal sheet is press-formed to form a bulging portion of protrusion shape, the greatest sheet thickness reduction occurs at an apex portion in the bulging portion, and necking (localized narrowing) or cracking sometimes occurs. There is accordingly demand for technology to distribute sheet thickness reduction over the entire component and to utilize material to the maximum (completely use material). In particular with high tensile strength steel, cracking occurs even when there is a slight reduction in sheet thickness. It is therefore necessary to lower the maximum value of the ratio of sheet thickness reduction in the metal sheet.

Japanese Patent No. 4879588 discloses a method for press-forming a metal sheet. A large amount of spring-back occurs when there is a ridge line portion where a large residual stress is generated in a press-formed component. Accordingly, in a drawing process that is a process preceding a press-forming process, a shape having a radius of curvature at least 1 mm smaller than the final shape of a location is employed for the shape on a die corresponding to such a location. Then, when subsequently forming the final shape in a stamping process, residual tensile stress at the ridge line portion is alleviated by forming so as to push a portion that is overhanging at the outside back in. However, in the method of Japanese Patent No. 4879588, there are limitations to the radius of curvature of the ridge line portion and to the tensile strength of the metal sheet (metal sheet prior to forming) of a blank, and this is an issue in that is imposes limitations on the shape of press-formed components. Moreover, countermeasures to necking and cracking caused by sheet thickness reduction are not mentioned in Japanese Patent No. 4879588.

Moreover, a press-forming method is disclosed in Japanese Patent Application Laid-Open (JP-A) No. 2007-326112 in which a blank is held by a die and a blank holder, and pre-forming is performed by overhanging a blank in a state in which a movable punch has been projected out from a die. This leads to an increase in surface area due to sheet thickness reduction also occurring in regions, such as the bottom face of a product, which are barely deformed by traditional methods. Uniform deformation is thus imparted over a wide area of a forming panel. However, the method described in JP-A No. 2007-326112 is a method suited to press-forming cylindrical containers, and application to shapes other than cylindrical containers is not considered. The method disclosed in JP-A No. 2007-326112 forms a formed article using a single pressing process and so the shape of the die is complicated. Moreover, the regions over which strain is distributed are limited to a punch shoulder and a vertical wall portion, and so the issues of necking and cracking that accompany sheet thickness reduction are not conclusively resolved.

SUMMARY OF INVENTION

Technical Problem

In consideration of the above circumstances, an object of the present invention is to provide a metal of forming a sheet method, a method of designing an intermediate shape, and a metal sheet forming die computer program and recording medium that enable a reduction in the maximum value of ratio of sheet thickness reduction after press-forming.

Solution to Problem

The aspects (1) to (32) related to the present invention are disclosed below.

(1) A method of forming a metal sheet into a target shape by press-forming, such that the metal sheet is formed into an intermediate shape that is different from the target shape and then the target shape is directly formed via the intermediate shape, the method including, when forming the intermediate shape from the metal sheet, the intermediate shape being formed by forming a region including at least a portion at which a ratio of sheet thickness reduction from the metal sheet is larger when the formed shape is formed from the intermediate shape than when the formed shape is formed from the metal sheet.

(2) The method of (1), further including, based on element data (B) for a post-forming shaped metal sheet and element data (D) for a hypothetical metal sheet prior to forming derived by finite element analysis in which a first step and a second step are sequentially performed:

imparting strain to at least one element, corresponding to the first region, in the element data (D), at a strain required for deformation into respective shapes of respective elements in the element data (B) that correspond to each of the at least one element in the element data (D);

for remaining elements in the element data (D), corresponding to a second region including at least a portion at which a ratio of sheet thickness reduction from the metal sheet is larger when the target shape is formed directly from the metal sheet than when the target shape is formed via the intermediate shape, imparting strain, having a smaller absolute value than strain required for deformation into respective shapes of respective elements in the element data (B) corresponding to each of the remaining elements, to the remaining elements or imparting no strain to the remaining elements; and adopting a shape of element data (G) for a hypothetical metal sheet after deformation, in a case in which the hypothetical metal sheet prior to forming has been deformed, as the intermediate shape, in which:

the first step includes preparing element data (A) for a provisional metal sheet and the element data (B) for the post-forming shaped metal sheet; and the second step includes correcting the element data (A) so as to reduce a difference in shape between each corresponding element in the element data (A) and the element data (B), and deriving the element data (D).

(3) The method of (2), in which, in the first step, the element data (B) is derived, by formation analysis using a finite element method, based on the element data (A).

(4) The method of (2), in which, in the first step, the element data (A) is derived, by reverse analysis using a finite element method, based on the element data (B).

(5) The method of any one of (2) to (4), in which, in the second step, a step 2-1, a step 2-2, and a step 2-3 are sequentially performed such that the element data (A) is corrected so as to reduce the difference in shape between each corresponding element in the element data (A) and the element data (B), and the element data (D) is derived, in which:

step 2-1 includes deriving a stress (F1) for each element in the element data (A), the stress (F1) being a stress amount required to elastically deform each of the elements in the element data (A) into a shape of each corresponding element in the element data (B);

step 2-2 includes building a finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element; and step 2-3 includes deriving post-elastic-deformation element data (H) by performing elastic deformation analysis using a finite element method based on the finite element model (I) built in the step 2-2, correcting respective shapes of the finite elements in the element data (A) to respective shapes of the finite elements of the post-elastic-deformation finite element data (H), and adopting the corrected finite element data as the element data (D).

(6) The method of (5), in which the stress (F2) has an absolute value that is larger than the stress (F1) but no more than 1.5 times larger than the stress (F1).

(7) The method of any one of (2) to (6), further including:

deriving a stress (F3) for each element in the element data (D), the stress (F3) being a stress amount required for elastic deformation into respective shapes of the respective elements in the element data (B) corresponding to the respective elements in the element data (D);

building a finite element model (J) by applying the stress (F3) required for the elastic deformation to at least one of the elements in the element data (D), and by applying a stress having a smaller absolute value than the stress (F3) required for the elastic deformation, or by applying no stress, to remaining elements in the element data (D); and performing elastic deformation analysis based on the finite element model (J), using a finite element method, to derive the element data (G) for the hypothetical metal sheet after deformation, by:

imparting strain to at least one of the elements in the element data (D) at a strain required for deformation into respective shapes of the respective elements in the element data (B) corresponding to the at least one of the elements, and imparting strain to remaining elements in the element data (D) at a strain having a smaller absolute value than the strain required for deformation into respective shapes of the respective elements in the element data (B) corresponding to the remaining elements, or imparting no strain to the remaining elements in the element data (D).

(8) The method of (7), further including applying stress to the remaining elements such that the stress applied to elements, among the remaining elements in the element data (D) that are in a vicinity of a boundary with the at least one of the elements, has a smaller absolute value than the stress (F3), and the absolute value of the stress gradually decreases in a direction away from the elements in the vicinity of the boundary.

(9) The method of any one of (2) to (8), further including recalculating the element data (D) by performing the first step and the second step, or by performing the second step, after substituting the element data (D) obtained in the second step in place of the element data (A) in the first step.

(10) The method of any one of (2) to (9), further including:

setting an upper limit threshold value, or an upper limit threshold value and a lower limit threshold value, for a state change amount ($\Delta X$) before and after forming for each corresponding element in the element data (D) and the element data (B); and repeatedly recalculating the element data (D) by performing the first step and the second step, or by performing the second step, after substituting the element data (D) obtained in the second step in place of the element data (A) in the first step, either:

until the element data (D) has a maximum value of the state change amount ($\Delta X$) that is not higher than the threshold value when the threshold value has only been set for the upper limit of the state change amount ($\Delta X$), or until the element data (D) has a maximum value and a minimum value of the state change amount ($\Delta X$) lying in a range from the upper limit threshold value to the lower limit threshold value when the threshold values have been set for the upper limit and the lower limit of the state change amount ($\Delta X$).

(11) A method of forming a metal sheet into a target shape by press-forming such that the metal sheet is sequentially formed into a plurality of intermediate shapes that are different from the target shape and the target shape is formed from a final intermediate shape, the method including:

in at least one process selected from a group consisting of a process to obtain the plurality of intermediate shapes and a process to obtain the target shape, adopting a shape obtained by the method of any one of claim 1 to claim 10 as an intermediate shape to be formed in a process preceding the at least one process.

(12) A method of designing an intermediate shape when forming a metal sheet into a target shape by press-forming, such that the metal sheet is formed into an intermediate shape that is different from the target shape and then the target shape is formed from the intermediate shape, the method including:

when forming the intermediate shape from the metal sheet, adopting, as the intermediate shape, a shape in which a first region is formed that includes at least a portion at which a ratio of sheet thickness reduction from the metal sheet is larger when the target shape is formed via the intermediate shape than when the target shape is formed directly from the metal sheet.

(13) The method of designing an intermediate shape of (11), further including, based on element data (B) for a post-forming shaped metal sheet and element data (D) for a hypothetical metal sheet prior to forming derived by finite element analysis, in which a first step and a second step are sequentially performed:

imparting strain to at least one element corresponding to the first region in the element data (D), at a strain required for deformation into respective shapes of respective elements in the element data (B) corresponding to each element of the at least one element; for remaining elements in the element data (D) corresponding to a second region including at least a portion at which a ratio of sheet thickness reduction from the metal sheet is larger when the target shape is formed directly from the metal sheet than when the target shape is formed via the intermediate shape, imparting strain, having a smaller absolute value than strain required for deformation into respective shapes of respective elements in the element data (B) corresponding to each of the remaining elements, to the remaining elements, or imparting no strain to the remaining elements; and adopting a shape of element data (G) for a hypothetical metal sheet after deformation, in a case in which the hypothetical metal sheet prior to forming has been deformed, as the intermediate shape, in which:

the first step includes preparing element data (A) for a provisional metal sheet and the element data (B); and the second step includes correcting the element data (A) so as to reduce a difference in shape between each of topologically corresponding elements in the element data (A) and the element data (B), and deriving the element data (D).

(14) The method of designing an intermediate shape of (13), in which, in the first step, the element data (B) is derived by formation analysis using a finite element method, based on the element data (A).

(15) The method of designing an intermediate shape of (13), in which, in the first step, the element data (A) is derived, by reverse analysis using a finite element method, based on the element data (B).

(16) The method of designing an intermediate shape of any one of (13) to (15), in which, in the second step, a step 2-1, a step 2-2, and a step 2-3 are sequentially performed such that:

the element data (A) is corrected so as to reduce the difference in shape between each corresponding element in the element data (A) and the element data (B), and the element data (D) is derived, in which:

step 2-1 includes deriving a stress (F1) for each element in the element data (A), the stress (F1) being a stress amount required to be applied to each of the elements in the element data (A) to elastically deform each of the elements in the element data (A) into a shape of each of the topologically corresponding elements in the element data (B);

step 2-2 includes building a finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element; and step 2-3 includes deriving post-elastic-deformation element data (H) by performing elastic deformation analysis using a finite element method based on the finite element model (I) built in the step 2-2, correcting respective shapes of the finite elements in the element data (A) to respective shapes of the finite elements of the post-elastic-deformation finite element data (H), and adopting the corrected finite element data as the element data (D).

(17) The method of designing an intermediate shape of (16), in which the stress (F2) has an absolute value that is larger than the stress (F1) but no more than 1.5 times larger than the stress (F1).

(18) The method of designing an intermediate shape of any one of (13) to (17), further including:

deriving a stress (F3) for each element in the element data (D), the stress (F3) being a stress amount required for elastic deformation into respective shapes of the respective elements in the element data (B) corresponding to the respective elements in the element data (D);

building a finite element model (J) by applying the stress (F3) required for the elastic deformation to at least one of the elements in the element data (D), and by applying a stress having a smaller absolute value than the stress (F3) required for the elastic deformation, or by applying no stress, to remaining elements in the element data (D); and performing elastic deformation analysis based on the finite element model (J) using a finite element method, to derive the element data (G) for the hypothetical metal sheet after deformation in a case of deformation by:

imparting strain to at least one of the elements in the element data (D) at a strain required for deformation into respective shapes of the respective elements in the element data (B) corresponding to the at least one of the elements, and imparting strain to remaining elements in the element data (D) at a strain having a smaller absolute value than the strain required for deformation into respective shapes of the respective elements in the element data (B) corresponding to the remaining elements, or imparting no strain to the remaining elements in the element data (D).

(19) The method of designing an intermediate shape of (18), further including applying stress to the remaining elements such that the stress applied to elements, among the remaining elements in the element data (D) that are in a vicinity of a boundary with the at least one of the elements, has a smaller absolute value than the stress (F3), and the absolute value of the stress gradually decreases in a direction away from the elements in the vicinity of the boundary.

(20) The method of designing an intermediate shape of any one of (13) to (19), further including recalculating the element data (D) by performing the first step and the second step, or by performing the second step, after substituting the element data (D) obtained in the second step in place of the element data (A) in the first step.

(21) The method of designing an intermediate shape of any one of (13) to (19), further including:

setting an upper limit threshold value, or an upper limit threshold value and a lower limit threshold value, for a state change amount ($\Delta X$) before and after forming for each topologically corresponding finite element in the element data (D) and the element data (B); and repeatedly recalculating the element data (D) by performing the first step and the second step, or by performing the second step, after substituting the element data (D) obtained in the second step in place of the element data (A) in the first step, either:

until the element data (D) has a maximum value of the state change amount ($\Delta X$) that is not higher than the threshold value when the threshold value has only been set for the upper limit of the state change amount ($\Delta X$), or until the element data (D) has a maximum value and a minimum value of the state change amount ($\Delta X$) lying in a range from the upper limit threshold value to the lower limit threshold value when the threshold values have been set for the upper limit and the lower limit of the state change amount ($\Delta X$).

(22) A method of designing an intermediate shape when forming a metal sheet into a target shape by press-forming, such that the metal sheet is sequentially formed into a plurality of intermediate shapes that are different from the target shape and the target shape is formed from a final intermediate shape, the method including:

in at least one process selected from a group consisting of a process to obtain the plurality of intermediate shapes and a process to obtain the target shape, adopting a shape obtained by the method of any one of (12) to (21) as an intermediate shape to be formed in a process preceding the at least one process.

(23) A die for forming a metal sheet, the die including die faces having a shape of an intermediate shape obtained by the method of forming a metal sheet of any one of (1) to (11).

(24) A computer program for designing an intermediate shape used when forming a metal sheet into a target shape by press-forming, such that the metal sheet is formed into an intermediate shape that is different from the target shape and then the target shape is formed from the intermediate shape, the computer program causing a computer to execute processing including:

when forming the intermediate shape from the metal sheet, adopting, as the intermediate shape, a shape in which a first region is formed that includes at least a portion at which a ratio of sheet thickness reduction from the metal sheet is larger when the target shape is formed via the intermediate shape than when the target shape is formed directly from the metal sheet.

(25) The computer program of (24), the processing further including finite element analysis based on element data (A) for a provisional metal sheet and element data (B) for a post-forming shaped metal sheet corresponding to the element data (A), the finite element analysis including:

sequentially performing a step 2-1 and a step 2-2; and thereby building a finite element model (I) for performing elastic deformation analysis using a finite element method to correct the element data (A) so as to reduce a difference in shape between each corresponding element in the element data (A) and the element data (B), and to derive element data (D) for a hypothetical metal sheet prior to forming, in which:

step 2-1 includes deriving a stress (F1) for each element in the element data (A), the stress (F1) being a stress amount required to be applied to each of the elements in the element data (A) to elastically deform each of the elements in the element data (A) into a shape of each of the corresponding elements in the element data (B); and step 2-2 includes building the finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element.

(26) The computer program of (24), the processing further including finite element analysis based on element data (A) for a provisional metal sheet and element data (B) for a post-forming shaped metal sheet that are topologically homeomorphic to the element data (A), the finite element analysis including:

sequentially performing a step 2-1, a step 2-2, and a step 2-3; and thereby correcting the element data (A) so as to reduce a difference in shape between each topologically corresponding element in the element data (A) for the provisional metal sheet and the element data (B), and deriving the element data (D), in which:

step 2-1 includes deriving a stress (F1) for each element in the element data (A), the stress (F1) being a stress amount required to be applied to each of the elements in the element data (A) to elastically deform each of the elements in the element data (A) into a shape of each of the topologically corresponding elements in the element data (B);

step 2-2 includes building a finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element; and step 2-3 includes deriving post-elastic-deformation element data (H) by performing elastic deformation analysis using a finite element method based on the finite element model (I), correcting respective shapes of the finite elements in the element data (A) to respective shapes of the finite elements of the post-elastic-deformation finite element data (H), and adopting the corrected finite element data as the element data (D).

(27) The computer program of (25) or (26), in which the stress (F2) is larger than the stress (F1) but no more than 1.5 times larger than the stress (F1).

(28) The computer program of any one of (25) to (27), the processing further including finite element analysis based on the element data (D) and the element data (B) corresponding to the element data (D), the finite element analysis including:

deriving a stress (F3) for each element in the element data (D), the stress (F3) being a stress amount required for elastic deformation into respective shapes of the respective elements in the element data (B) corresponding to the respective elements in the element data (D); and building a finite element model (J) by applying the stress (F3) required for the elastic deformation to at least one of the elements corresponding to the first region in the element data (D), and by applying a stress having a smaller absolute value than the stress (F3) required for the elastic deformation, or by applying no stress, to remaining elements in the element data (D), the remaining elements corresponding to a second region including at least a portion at which a ratio of sheet thickness reduction from the metal sheet is larger when the target shape is formed directly from the metal sheet than when the target shape is formed via the intermediate shape.

(29) The computer program of (28), the finite element analysis further including:

performing elastic deformation analysis using a finite element method based on the finite element model (J), and deriving element data (G) for the hypothetical metal sheet after deformation in a case in which the hypothetical metal sheet prior to forming has been deformed by:

imparting strain to at least one of the elements corresponding to the first region in the element data (D) at a strain required for deformation into respective shapes of the respective elements in the element data (B) corresponding to the at least one of the elements, and imparting strain to remaining elements corresponding to the second region in the element data (D) at a strain having a smaller absolute value than the strain required for deformation into respective shapes of the respective elements in the element data (B) corresponding to the remaining elements, or imparting no strain to the remaining elements.

(30) The computer program of (28) or (29), the processing further including applying stress to the remaining elements such that the stress applied to elements, among the remaining elements in the element data (D) that are in a vicinity of a boundary with the at least one of the elements, has a smaller absolute value than the stress (F3), and the absolute value of the stress gradually decreases in a direction away from the elements in the vicinity of the boundary.

(31) The computer program of any one of (28) to (30), the processing further including:

a first step of deriving element data (A) for the provisional metal sheet and element data (B) for the post-forming shaped metal sheet for when forming the provisional metal sheet into the target shape by forming analysis using a finite element method; and a third step of deriving the intermediate shape by performing elastic deformation analysis using a finite element method based on the finite element model (J).

(32) The computer program of (31), the processing further including re-calculating the element data (D) by sequentially performing the first step to the step 2-3, or the step 2-1 to the step 2-3, after substituting the element data (D) obtained in the step 2-3 in place of the element data (A) in the first step.

(33) The computer program of (31) or (32), the processing further including:

setting an upper limit threshold value, or an upper limit threshold value and a lower limit threshold value, for a state change amount (ΔX) before and after forming for each corresponding element in the element data (D) and the element data (B); and repeatedly recalculating the element data (D) by performing the first step to the step 2-3, or by performing the step 2-1 to the step 2-3, after the substituting element data (D) obtained in the step 2-3 in place of the element data (A) in the first step, either:

until the element data (D) has a maximum value of the state change amount (ΔX) that is not higher than the threshold value when the threshold value has only been set for the upper limit of the state change amount (ΔX), or until the element data (D) has a maximum value and a minimum value of the state change amount (ΔX) lying in a range from the upper limit threshold value to the lower limit threshold value when the threshold values have been set for the upper limit and the lower limit of the state change amount (ΔX).

(34) The computer program of any one of (31) to (33), in which: the computer program is employed to derive the intermediate shape when forming a metal sheet into a target shape by press-forming such that the metal sheet is sequentially formed into a plurality of the intermediate shapes that are different from the target shape and the target shape is formed from a final intermediate shape; and the computer program causes a computer to substitute a shape derived by the computer program of any one of claim 31 to claim 33 for an intermediate shape and to sequentially perform the first step to the third step.

(35) A non-transitory computer readable recording medium at which is recorded the computer program of any one of (24) to (34).

The aspects [1] to [21] related to the present invention are disclosed below.

[1] A metal sheet forming method employed when forming a metal sheet into a target shape by press-forming such that the metal sheet is formed into an intermediate shape different to the target shape and then the target shape is formed from the intermediate shape.

In the metal sheet forming method, based on element data (B) for a post-forming shaped metal sheet and element data (D) for a hypothetical metal sheet prior to forming derived by finite element analysis in which a first step described below and a second step described below are sequentially performed, strain is imparted to some elements in the element data (D) for the hypothetical metal sheet prior to forming at a strain required to deform each of the elements into a shape of each of topologically corresponding elements in the element data (B) for the post-forming shaped metal sheet;

for remaining elements from out of the element data (D) for the hypothetical metal sheet prior to forming, strain having a smaller absolute value than the strain required to deform each of the elements into the shape of each of the topologically corresponding elements in the element data (B) for the post-forming shaped metal sheet is imparted to the remaining elements, or no strain is imparted to the remaining elements; and a shape of element data (G) for a hypothetical metal sheet after deformation when deformed is adopted as the intermediate shape.

The first step is a step in which the element data (B) for the post-forming shaped metal sheet is derived by forming analysis using a finite element method based on element data (A) for a provisional metal sheet.

The second step is a step in which the element data (A) for the provisional metal sheet is corrected so as to make a difference in shape smaller between each of the topologically corresponding elements in the element data (A) for the provisional metal sheet and the element data (B) for the post-forming shaped metal sheet, and the element data (D) for the hypothetical metal sheet prior to forming is derived.

[2] The metal sheet forming method of [1], in which at the second step, a step 2-1 described below, a step 2-2 described below, and a step 2-3 described below are sequentially performed such that the element data (A) for the provisional metal sheet is corrected so as to make the difference in shape smaller between each of the topologically corresponding elements in the element data (A) for the provisional metal sheet and the element data (B) for the post-forming shaped metal sheet, and the element data (D) for the hypothetical metal sheet prior to forming is derived.

The step 2-1 is a step in which a stress (F1) is derived for each element in the element data (A) for the provisional metal sheet, the stress (F1) being a stress amount required to be applied to each of the elements in the element data (A) for the provisional metal sheet to elastically deform each of the elements in the element data (A) for the provisional metal sheet into a shape of each of the topologically corresponding elements in the element data (B) for the post-forming shaped metal sheet.

The step 2-2 is a step in which a finite element model (I) is built by applying the stress (F1) or a stress (F2) not more than 1.5 times the stress (F1) corresponding to each of the elements in the element data (A) for the provisional metal sheet under application of a condition of restraining displacement in out-of-plane directions of nodes of each finite element.

The step 2-3 is a step in which post-elastic-deformation element data (H) is derived by performing elastic deformation analysis using a finite element method based on the finite element model (I) built at the step 2-2, and a shape of each of the finite elements in the element data (A) for the provisional metal sheet is corrected so as to be a shape of each of the finite elements of the post-elastic-deformation finite element data (H), and the corrected finite element data is adopted as the element data (D) for the hypothetical metal sheet prior to forming.

[3] The metal sheet forming method of [1] or [2], in which:

a stress (F3) is derived for each element of a stress amount required for elastic deformation of each of the elements in the element data (D) for the hypothetical metal sheet prior to forming into each of the topologically corresponding elements in the element data (B) for the post-forming shaped metal sheet;

a finite element model (J) is built by applying the stress (F3) required for the elastic deformation to some of the elements in the element data (D) for the hypothetical metal sheet prior to forming and by applying a stress having a smaller absolute value than the stress (F3) required for the elastic deformation or by applying no stress to remaining portions of the element data (D) for the hypothetical metal sheet prior to forming; and elastic deformation analysis is performed based on the finite element model (J) using a finite element method to derive the element data (G) for the hypothetical metal sheet after deformation when deformed by imparting strain to some of the elements in the element data (D) for the hypothetical metal sheet prior to forming at a strain required to deform each element into a shape of each of the topologically corresponding elements in the element data (B) for the post-forming shaped metal sheet, and imparting strain to remaining elements in the element data (D) for the hypothetical metal sheet prior to forming at a strain having an absolute value smaller than the strain required to deform each element into a shape of each of the topologically corresponding elements in the element data (B) for the post-forming shaped metal sheet or imparting no strain to the remaining elements.

[4] The metal sheet forming method of any one of [1] to [3], in which:

the element data (D) for the hypothetical metal sheet prior to forming is re-derived by performing the first step and the second step, or by performing the second step, after substituting the element data (D) for the hypothetical metal sheet prior to forming obtained at the second step in place of the element data (A) for the provisional metal sheet at the first step.

[5] The metal sheet forming method of any one of [1] to [3], in which:

an upper limit threshold value, or an upper limit threshold value and a lower limit threshold value, is or are set for a state change amount ($\Delta X$) between before and after forming for each of the topologically corresponding finite elements in the element data (D) for the hypothetical metal sheet prior to forming and the element data (B) for the post-forming shaped metal sheet; and the element data (D) for the hypothetical metal sheet prior to forming is repeatedly re-derived by performing the first step and the second step, or by performing the second step, after substituting the element data (D) for the hypothetical metal sheet prior to forming obtained at the second step in place of the element data (A) for the provisional metal sheet at the first step, either until the element data has a maximum value of the state change amount ($\Delta X$) not more than the threshold value when the threshold value has only been set for the upper limit of the state change amount ($\Delta X$), or until the element data has a maximum value and a minimum value of the state change amount ($\Delta X$) lying in a range from the upper limit threshold value to the lower limit threshold value when the threshold values have only been set for the upper limit and the lower limit of the state change amount ($\Delta X$).

[6] A metal sheet forming method employed when forming a metal sheet into a target shape by press-forming such that the metal sheet is sequentially formed into plural intermediate shapes different to the target shape and the target shape is formed from a final intermediate shape.

In the metal sheet forming method, in all or some processes out of processes to obtain the plural intermediate shapes and a process to obtain the target shape, adopting an intermediate shape obtained by adopting the target shape by the forming method of any one of [1] to [5] as the target shape of the process, as the intermediate shape to be formed in a process preceding the process.

[7] An intermediate shape design method employed when forming a metal sheet into a target shape by press-forming such that the metal sheet is formed into an intermediate shape different to the target shape and then the target shape is formed from the intermediate shape.

In the intermediate shape design method, based on element data (B) for a post-forming shaped metal sheet and element data (D) for a hypothetical metal sheet prior to forming derived by finite element analysis in which a first step described below and a second step described below are sequentially performed, strain is imparted to some elements in the element data (D) for the hypothetical metal sheet prior to forming at a strain required to deform each of the elements into a shape of each topologically corresponding element in the element data (B) for the post-forming shaped metal sheet;

for remaining elements from out of the element data (D) for the hypothetical metal sheet prior to forming, strain having a smaller absolute value than the strain required to deform each of the elements into the shape of each of the topologically corresponding elements in the element data (B) for the post-forming shaped metal sheet is imparted to the remaining elements, or no strain is imparted to the remaining elements;

and a shape of element data (G) for a hypothetical metal sheet after deformation when deformed is adopted as the intermediate shape.

The first step is a step in which the element data (B) for the post-forming shaped metal sheet is derived by forming analysis using a finite element method based on element data (A) for a provisional metal sheet.

The second step is a step in which the element data (A) for the provisional metal sheet is corrected so as to make a difference in shape smaller between each of the topologically corresponding elements in the element data (A) for the provisional metal sheet and the element data (B) for the post-forming shaped metal sheet, and the element data (D) for the hypothetical metal sheet prior to forming is derived.

[8] The intermediate shape design method of [7], in which at the second step, a step 2-1 described below, a step 2-2 described below, and a step 2-3 described below are sequentially performed such that the element data (A) for the provisional metal sheet is corrected so as to make the difference in shape smaller between each of the topologically corresponding elements in the element data (A) for the provisional metal sheet and the element data (B) for the post-forming shaped metal sheet, and the element data (D) for the hypothetical metal sheet prior to forming is derived.

The step 2-1 is a step in which a stress (F1) is derived for each element in the element data (A) for the provisional metal sheet, the stress (F1) being a stress amount required to be applied to each of the elements in the element data (A) for the provisional metal sheet to elastically deform each of the elements in the element data (A) for the provisional metal sheet into a shape of each of the topologically corresponding elements in the element data (B) for the post-forming shaped metal sheet.

The step 2-2 is a step in which a finite element model (I) is built by applying the stress (F1) or a stress (F2) not more than 1.5 times the stress (F1) corresponding to each of the elements in the element data (A) for the provisional metal sheet under application of a condition of restraining displacement in out-of-plane directions of nodes of each finite element.

The step 2-3 is a step in which post-elastic-deformation element data (H) is derived by performing elastic deformation analysis using a finite element method based on the finite element model (I) built at the step 2-2, and a shape of each of the finite elements in the element data (A) for the provisional metal sheet is corrected so as to be a shape of each of the finite elements of the post-elastic-deformation finite element data (H), and the corrected finite element data is adopted as the element data (D) for the hypothetical metal sheet prior to forming.

[9] The intermediate shape design method of [7] or [8], in which:

a stress (F3) is derived for each element of a stress amount required for elastic deformation of each of the elements in the element data (D) for the hypothetical metal sheet prior to forming into each of the topologically corresponding elements in the element data (B) for the post-forming shaped metal sheet;

a finite element model (J) is built by applying the stress (F3) required for the elastic deformation to some of the elements in the element data (D) for the hypothetical metal sheet prior to forming and by applying a stress having a smaller absolute value than the stress (F3) required for the elastic deformation or by applying no stress to remaining portions of the element data (D) for the hypothetical metal sheet prior to forming; and elastic deformation analysis is performed based on the finite element model (J) using a finite element method to derive the element data (G) for the hypothetical metal sheet after deformation when deformed by
  imparting strain to some of the elements in the element data (D) for the hypothetical metal sheet prior to forming at a strain required to deform each element into a shape of each of the topologically corresponding elements in the element data (B) for the post-forming shaped metal sheet, and
  imparting strain to remaining elements in the element data (D) for the hypothetical metal sheet prior to forming at a strain having an absolute value smaller than the strain required to deform each element into a shape of each of the topologically corresponding elements in the element data (B) for the post-forming shaped metal sheet or imparting no strain the remaining elements.

[10] The intermediate shape design method of any one of [7] to [9] in which:

the element data (D) for the hypothetical metal sheet prior to forming is re-derived by performing the first step and the second step, or by performing the second step, after substituting the element data (D) for the hypothetical metal sheet prior to forming obtained at the second step in place of the element data (A) for the provisional metal sheet at the first step.

[11] The intermediate shape design method of any one of [7] to [9], in which:

an upper limit threshold value, or an upper limit threshold value and a lower limit threshold value, is or are set for a state change amount ($\Delta X$) between before and after forming for each of the topologically corresponding finite elements in the element data (D) for the hypothetical metal sheet prior to forming and the element data (B) for the post-forming shaped metal sheet; and the element data (D) for the hypothetical metal sheet prior to forming is repeatedly re-derived by performing the first step and the second step, or by performing the second step, after substituting the element data (D) for the hypothetical metal sheet prior to forming obtained at the second step in place of the element data (A) for the provisional metal sheet at the first step, either
  until the element data has a maximum value of the state change amount ($\Delta X$) not more than the threshold value when the threshold value has only been set for the upper limit of the state change amount ($\Delta X$), or
  until the element data has a maximum value and a minimum value of the state change amount ($\Delta X$) lying in a range from the upper limit threshold value to the lower limit threshold value when the threshold values have only been set for the upper limit and the lower limit of the state change amount ($\Delta X$).

[12] An intermediate shape design method employed when forming a metal sheet into a target shape by press-forming such that the metal sheet is sequentially formed into plural intermediate shapes different to the target shape and the target shape is formed from a final intermediate shape.

In the intermediate shape design method, in all or some processes out of processes to obtain the plural intermediate shapes and a process to obtain the target shape, an intermediate shape obtained by adopting the target shape in the forming method of any one of [1] to [5] as the target shape of the process, is adopted as an intermediate shape to be formed in a process preceding the process.

[13] A die for forming a metal sheet, the die including die faces having a shape of the intermediate shape obtained by the metal sheet forming method of any one of [1] to [6].

[14] A computer program for designing an intermediate shape when forming a metal sheet into a target shape by press-forming such that the metal sheet is formed into an intermediate shape different to the target shape and then the target shape is formed from the intermediate shape.

In the computer program, in finite element analysis based on element data (A) for a provisional metal sheet and element data (B) for a post-forming shaped metal sheet topologically homeomorphic to the element data (A) for the provisional metal sheet, by sequentially performing a step 2-1 described below and a step 2-2 described below, a finite element model (I) is built for performing elastic deformation analysis using a finite element method to correct the element data (A) for the provisional metal sheet so as to make a difference in shape smaller between each topologically corresponding element in the element data (A) for the provisional metal sheet and the element data (B) for the post-forming shaped metal sheet, and to derive the element data (D) for a hypothetical metal sheet prior to forming.

The step 2-1 is a step in which a stress (F1) is derived for each element in the element data (A) for the provisional metal sheet, the stress (F1) being a stress amount required to be applied to each of the elements in the element data (A) for the provisional metal sheet to elastically deform each of the elements in the element data (A) for the provisional metal sheet into a shape of each of the topologically corresponding elements in the element data (B) for the post-forming shaped metal sheet.

The step 2-2 is a step in which a finite element model (I) is built by applying the stress (F1) or a stress (F2) not more than 1.5 times the stress (F1) corresponding to each of the elements in the element data (A) for the provisional metal sheet under application of a condition of restraining displacement in out-of-plane directions of nodes of each finite element.

[15] A computer program for designing an intermediate shape when forming a metal sheet into a target shape by press-forming such that the metal sheet is formed into an intermediate shape different to the target shape and then the target shape is formed from the intermediate shape.

In the computer program, in finite element analysis based on element data (A) for a provisional metal sheet and element data (B) for a post-forming shaped metal sheet topologically homeomorphic to the element data (A) for the provisional metal sheet, by sequentially performing a step 2-1 described below, a step 2-2 described below, and a step 2-3 described below, the element data (A) for the provisional metal sheet is corrected so as to make a difference in shape smaller between each topologically corresponding element in the element data (A) for the provisional metal sheet and the element data (B) for the post-forming shaped metal sheet, and the element data (D) for the hypothetical metal sheet prior to forming is derived.

The step 2-1 is a step in which a stress (F1) is derived for each element in the element data (A) for the provisional metal sheet, the stress (F1) being a stress amount required to be applied to each of the elements in the element data (A) for the provisional metal sheet to elastically deform each of the elements in the element data (A) for the provisional metal sheet into a shape of each of the topologically corresponding elements in the element data (B) for the post-forming shaped metal sheet.

The step 2-2 is a step in which a finite element model (I) is built by applying the stress (F1) or a stress (F2) not more than 1.5 times the stress (F1) corresponding to each of the elements in the element data (A) for the provisional metal sheet under application of a condition of restraining displacement in out-of-plane directions of nodes of each finite element.

The step 2-3 is a step in which post-elastic-deformation element data (H) is derived by performing elastic deformation analysis using a finite element method based on the finite element model (I), and a shape of each of the finite elements in the element data (A) for the provisional metal sheet is corrected so as to be a shape of each of the finite elements of the post-elastic-deformation finite element data (H), and the corrected finite element data is adopted as the element data (D) for the hypothetical metal sheet prior to forming.

[16] A computer program including, in finite element analysis based on element data (D) for a hypothetical metal sheet prior to forming and element data (B) for a post-forming shaped metal sheet topologically homeomorphic to the element data (D) for the hypothetical metal sheet prior to forming:

deriving for each element a stress (F3) required to elastically deform each of the elements in the element data (D) for the hypothetical metal sheet prior to forming into each of topologically corresponding elements in the element data (B) for the post-forming shaped metal sheet; and building a finite element model (J) by applying the stress (F3) required for the elastic deformation to some of the elements in the element data (D) for the hypothetical metal sheet prior to forming and by applying a stress having a smaller absolute value than the stress (F3) required for the elastic deformation or by applying no stress to remaining portions of the element data (D) for the hypothetical metal sheet prior to forming.

[17] A computer program including, in finite element analysis based on element data (D) for a hypothetical metal sheet prior to forming and element data (B) for a post-forming shaped metal sheet topologically homeomorphic to the element data (D) for the hypothetical metal sheet prior to forming:

deriving for each element a stress required to elastically deform each of the elements in the element data (D) for the hypothetical metal sheet prior to forming into each of topologically corresponding elements in the element data (B) for the post-forming shaped metal sheet;

building a finite element model (J) by applying the stress required for the deformation to some of the elements in the element data (D) for the hypothetical metal sheet prior to forming and by applying a stress having a smaller absolute value than the stress required for the deformation or by applying no stress to remaining portions of the element data (D) for the hypothetical metal sheet prior to forming; and performing elastic deformation analysis based on the built finite element model (J) using a finite element method to derive the element data (G) for the hypothetical metal sheet after deformation when deformed by imparting strain to some of the elements in the element data (D) for the hypothetical metal sheet prior to forming at a strain required to deform each of the elements into a shape of each of topologically corresponding elements in the element data (B) for the post-forming shaped metal sheet, and imparting strain to remaining elements in the element data (D) for the hypothetical metal sheet prior to forming at a strain having an absolute value smaller than the strain required to deform each of the elements into a shape of each of the topologically corresponding elements in the element data (B) for the post-forming shaped metal sheet or imparting no strain to the remaining elements in the element data (D) for the hypothetical metal sheet prior to forming.

[18] A computer program for deriving an intermediate shape when forming a metal sheet into a target shape by press-forming such that the metal sheet is formed into an intermediate shape different to the target shape and then the target shape is formed from the intermediate shape.

The computer program causing execution in a computer system of:

a first step to derive element data (A) for a provisional metal sheet and element data (B) for a post-forming shaped metal sheet for when forming the provisional metal sheet into the target shape by forming analysis using a finite element method;

a step 2-1 to derive a stress (F1) for each element in the element data (A) for the provisional metal sheet, the stress (F1) being a stress amount required to be applied to each of the elements in the element data (A) for the provisional metal sheet to elastically deform each of the elements in the element data (A) for the provisional metal sheet into a shape of each of topologically corresponding elements in the element data (B) for the post-forming shaped metal sheet;

a step 2-2 to build a finite element model (I) by applying the stress (F1) or a stress (F2) not more than 1.5 times the stress (F1) corresponding to each of the elements in the element data (A) for the provisional metal sheet under application of a condition of restraining displacement in out-of-plane directions of nodes of each finite element;

a step 2-3 to derive post-elastic-deformation element data (H) by performing elastic deformation analysis using a finite element method based on the finite element model (I) built at the step 2-2, and to correct a shape of each of the finite elements in the element data (A) for the provisional metal sheet so as to be a shape of each of the finite elements of the post-elastic-deformation finite element data (H), and to adopt the corrected finite element data as the element data (D) for the hypothetical metal sheet prior to forming; and a third step to derive a stress for each element required to elastically deform each element in the element data (D) for the hypothetical metal sheet prior to forming into each of topologically corresponding elements in the element data (B) for the post-forming shaped metal sheet, to build a finite element model (J) by applying the stress required for the deformation to some of the elements in the element data (D) for the hypothetical metal sheet prior to forming and by applying a stress having a smaller absolute value than the stress required for the deformation or by applying no stress to remaining portions of the element data (D) for the hypothetical metal sheet prior to forming, and to derive the intermediate shape by performing elastic deformation analysis using a finite element method based on the built finite element model (J).

[19] The computer program of [18] in which the computer program causes execution in the computer system of re-deriving the element data (D) for the hypothetical metal sheet prior to forming by sequentially performing the first step to the step 2-3, or by sequentially performing the step 2-1 to the step 2-3, after substituting the element data (D) for the hypothetical metal sheet prior to forming obtained at the step 2-3 in place of the element data (A) for the provisional metal sheet at the first step.

[20] The computer program of [18] or [19] in which:

an upper limit threshold value, or an upper limit threshold value and a lower limit threshold value, is or are set for a state change amount (ΔX) between before and after forming for each of the topologically corresponding finite elements in the element data (D) for the hypothetical metal sheet prior to forming and the element data (B) for the post-forming shaped metal sheet; and the element data (D) for the hypothetical metal sheet prior to forming is repeatedly re-derived by performing the first step to the step 2-3, or by performing the step 2-1 to the step 2-3, after substituting the element data (D) for the hypothetical metal sheet prior to forming obtained at the step 2-3 in place of the element data (A) for the provisional metal sheet at the first step, either until the element data has a maximum value of the state change amount (ΔX) not more than the threshold value when the threshold value has only been set for the upper limit of the state change amount (ΔX), or until the element data has a maximum value and a minimum value of the state change amount (ΔX) lying in a range from the upper limit threshold value to the lower limit threshold value when the threshold values have only been set for the upper limit and the lower limit of the state change amount (ΔX).

[21] The computer program of any one of [18] to [20] in which the computer program is employed to derive the intermediate shapes when forming a metal sheet into a target shape by press-forming such that the metal sheet is sequentially formed into plural intermediate shapes different to the target shape and the target shape is formed from a final intermediate shape.

The computer program substitutes the target shape of the computer program of any one of [18] to [20] in place of the next intermediate shape to be obtained by forming each of the intermediate shapes and sequentially performs the first step to the third step.

BRIEF DESCRIPTION OF DRAWINGS

FIG. 4 is a perspective view to explain changes in shape in minute regions of a metal sheet before and after forming in a case in which the metal sheet is formed into the target shape using a conventional forming method.

FIG. 5 is a perspective view to explain changes in shape in minute regions of a metal sheet before and after forming in a case in which the metal sheet is formed into the target shape using a suitable forming method.

FIG. 9 is a flowchart to explain a method of forming a metal sheet of the first exemplary embodiment.

FIG. 14A is a diagram illustrating an example of regions where stress is applied to a hypothetical metal sheet prior to forming corresponding to the first exemplary embodiment and Example 1.

FIG. 14B is a stress distribution diagram for the X direction along a cross-section 1 and a cross-section 2 of the hypothetical metal sheet illustrated in FIG. 14A.

FIG. 14C is a stress distribution diagram for the Y direction along a cross-section 1 and a cross-section 2 of the hypothetical metal sheet illustrated in FIG. 14A.

FIG. 15A is a diagram illustrating another example of regions where stress is applied to a hypothetical metal sheet prior to forming corresponding to the first exemplary embodiment and Example 3.

FIG. 15B is a stress distribution diagram for the X direction along a cross-section 5 and cross-section 6 of the hypothetical metal sheet illustrated in FIG. 15A.

FIG. 15C is a stress distribution diagram for the Y direction along a cross-section 5 and cross-section 6 of the hypothetical metal sheet illustrated in FIG. 15A.

FIG. 16A is a diagram illustrating an intermediate shape corresponding to the first exemplary embodiment and Example 1: (a) is a plan view, (b) is a perspective view, and (c) illustrates cross-sections along cross-section 3 and cross-section 4 in (b).

FIG. 18A is a flowchart to explain another modified example of a method of forming a metal sheet of the first exemplary embodiment.

FIG. 27 is a diagram illustrating a first intermediate shape corresponding to a second exemplary embodiment and Example 4: (a) is a plan view, (b) is a perspective view, and (c) illustrates a cross-section 7 of (b).

FIG. 28 is a diagram illustrating a second intermediate shape corresponding to a second exemplary embodiment and Example 4: (a) is a plan view, (b) is a perspective view, and (c) illustrates a cross-section 8 and a cross-section 9 of (a) and (b).

DESCRIPTION OF EMBODIMENTS

Explanation follows regarding an overview of a method of forming a metal sheet of an exemplary embodiment of the present invention, with reference to FIG. 1A to FIG. 5A.

Figure 1A:
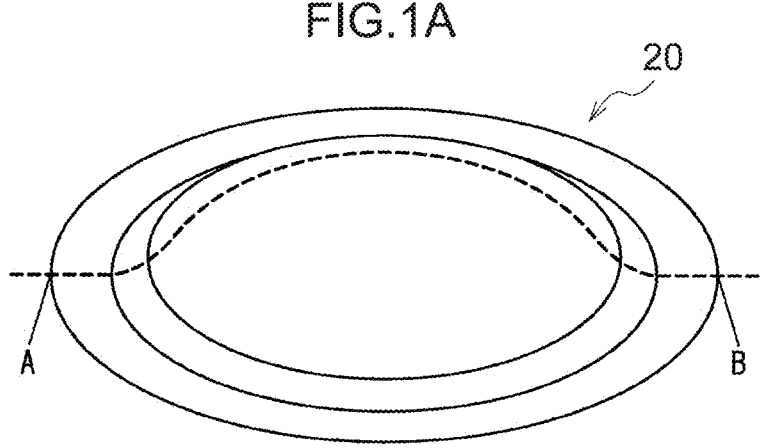
FIG. 1A is a perspective view illustrating a metal sheet that has been formed into a target shape by a press-forming method.
Figure 1B:
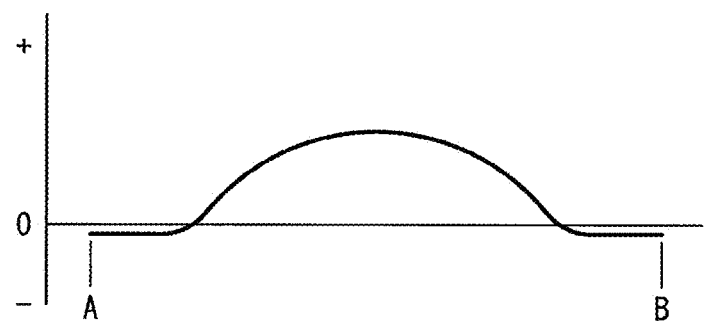
FIG. 1B is a graph illustrating a distribution of ratio of sheet thickness reduction along line A-B in FIG. 1 in a case in which a metal sheet having the target shape illustrated in FIG. 1A has been formed using a conventional method.

FIG. 1A is a perspective view illustrating a formed article (post-forming shaped metal sheet) 20 obtained by press-forming a circular sheet shaped metal sheet. FIG. 1B illustrates a distribution of a ratio of sheet thickness reduction along line A-B in FIG. 1A when the formed article 20 illustrated in FIG. 1A has been formed using a conventional method. The formed article 20 with the ratio of sheet thickness reduction distribution illustrated in FIG. 1B is a formed article that has been formed into the shape illustrated in FIG. 1A by pushing a punch with a hemispherical shaped leading end into a metal sheet of a blank in a state in which an outer peripheral portion of the metal sheet is restrained between a die and a holder. Note that the ratio of sheet thickness reduction (%) is found by (sheet thickness before processing−sheet thickness after processing)/sheet thickness before processing×100.

As illustrated in FIG. 1B, in the formed article 20 the ratio of sheet thickness reduction is greatest at a central portion. This is since the punch first contacts the central portion of the metal sheet, and then in the course of pushing the punch in further, the central portion of the metal sheet is stretched and thinned in sheet thickness to the greatest extent, with a large amount of strain. If the ratio of sheet thickness reduction at the central portion of the metal sheet exceeds a limit then localized necking or fracturing of the material occurs.

The present inventors considered the idea that fracturing of the material would be less liable to occur if forming was performed so as to reduce the maximum value of the ratio of sheet thickness reduction in the metal sheet after processing.

Figure 2:
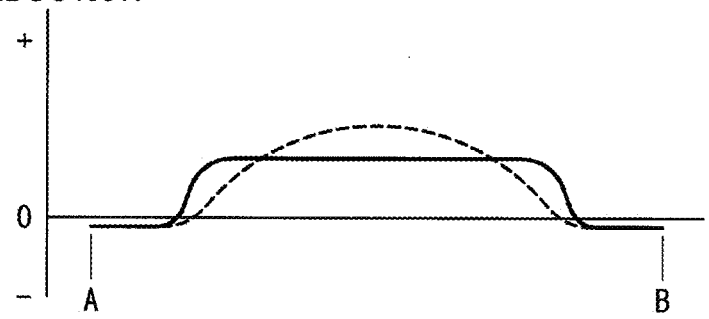
FIG. 2 is a graph illustrating a distribution of ratio of sheet thickness reduction along line A-B in a metal sheet having the target shape illustrated in FIG. 1A (dashed line), and a suitable ratio of sheet thickness reduction distribution (solid line).

More specifically, as illustrated by the solid line in FIG. 2, the present inventors considered the idea that if forming was performed so that the material was stretched evenly over a wide area of the metal sheet such that large local ratio of sheet thickness reduction did not arise, then the maximum value of the ratio of sheet thickness reduction would be lower in comparison to the conventional method illustrated by the dashed line in FIG. 2, thereby making the material less liable to fracture.

A detailed investigation of the ratio of sheet thickness reduction distribution illustrated in FIG. 2 indicates that the ratio of sheet thickness reduction illustrated by the solid line is lower than the dashed line at the central portion of the metal sheet (second location). However, the ratio of sheet thickness reduction illustrated by the solid line is higher than the dashed line in the vicinity of an outer edge portion (first location). Namely, the solid line illustrates a case in which the metal sheet is stretched further and the ratio of sheet thickness reduction is larger in the vicinity of the outer edge portion than the dashed line case, and the amount of stretching of the metal sheet is less and the ratio of sheet thickness reduction is smaller at the central portion than the dashed line case. As a result, the maximum value of the ratio of sheet thickness reduction illustrated by the solid line is smaller than the maximum value of the ratio of sheet thickness reduction illustrated by the dashed line. In order to stretch the metal sheet evenly in this manner to obtain the ratio of sheet thickness reduction distribution illustrated by the solid line in FIG. 2, first, for example, processing is performed to stretch the outer edge portion (to give the ratio of sheet thickness reduction distribution illustrated by the solid line in FIG. 3A). Next, processing may be performed to stretch the central portion (to give the ratio of sheet thickness reduction distribution illustrated in FIG. 3B). Note that the outer edge portion of the metal sheet is a first region including at least some locations where the ratio of sheet thickness reduction from the metal sheet is larger when a target shape is formed via an intermediate shape than when the target shape is formed directly from the metal sheet. The first region may entirely include locations where the ratio of sheet thickness reduction from the metal sheet is larger when a target shape is formed via an intermediate shape than when the target shape is formed directly from the metal sheet, or may include only some such locations. The central portion of the metal sheet is a second region including at least some locations where the ratio of sheet thickness reduction from the metal sheet is larger when the target shape is formed directly from the metal sheet than when the target shape is formed via an intermediate shape. The second region may entirely include locations where the ratio of sheet thickness reduction from the metal sheet is larger when the target shape is formed directly from the metal sheet than when the target shape is formed via an intermediate shape, or may include only some such locations.

Figure 3A:
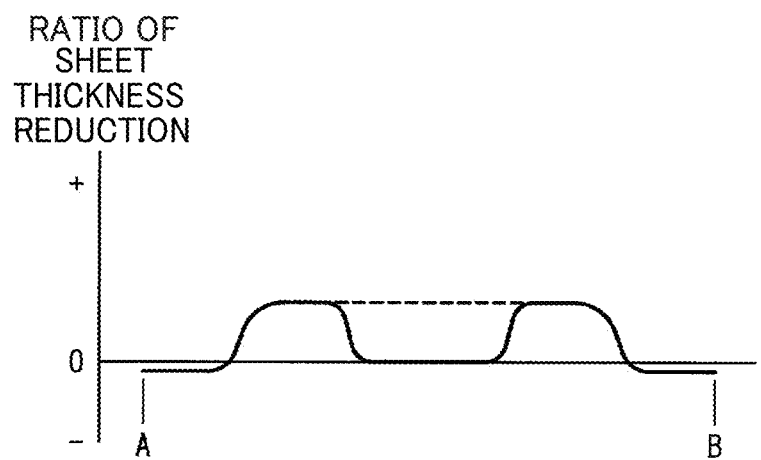
FIG. 3A is a graph illustrating a distribution of ratio of sheet thickness reduction along line A-B in a case in which a metal sheet has been press-formed into a substantially truncated circular cone shape (intermediate shape).
Figure 3B:
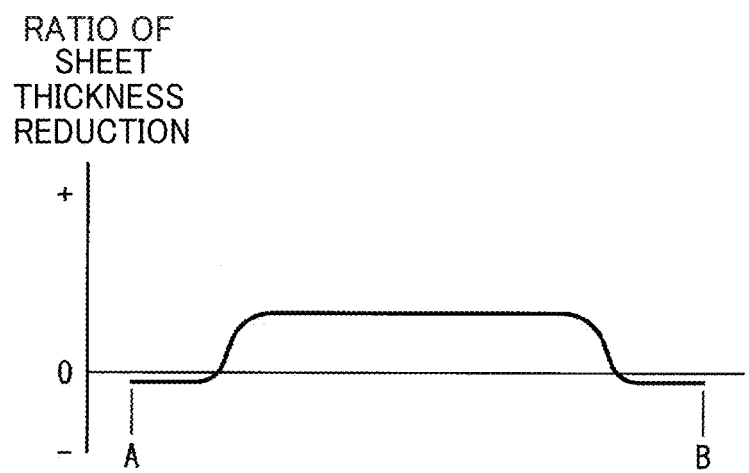
FIG. 3B is a graph illustrating a distribution of ratio of sheet thickness reduction along line A-B in a case in which a metal sheet that has been formed into a substantially truncated circular cone shape (intermediate shape) has been formed into the target shape illustrated in FIG. 1A.
Figure 3C:
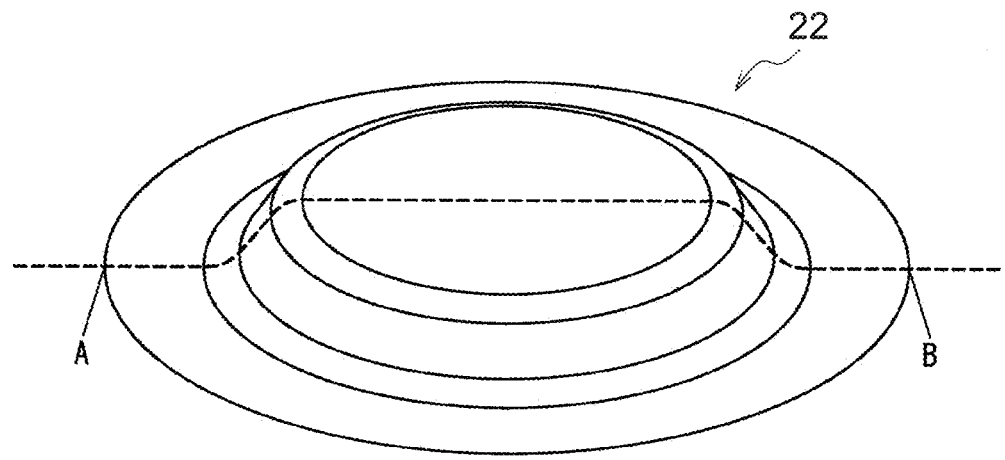
FIG. 3C is a perspective view illustrating a metal sheet that has been formed into a substantially truncated circular cone shape (intermediate shape).

More specifically, forming may be performed by forming a metal sheet into a substantially truncated circular cone shape 22 as illustrated in FIG. 3C as processing corresponding to FIG. 3A, and then by performing forming so as to project out an upper face of the substantially truncated circular cone shape 22 as processing corresponding to FIG. 3B. In this manner, instead of forming the stock metal sheet into the target shape by a single process, the metal sheet may be formed into an intermediate shape and the intermediate shape then formed into the target shape. Accordingly, locations that stretch less readily in normal forming processes (the outer edge portion of the location subject to processing) are stretched first (when forming the intermediate shape), after which it is then possible to process locations that stretch excessively in normal forming processes (the central portion of the locations subject to processing) so as to be stretched appropriately, enabling fracturing to be prevented.

Next, explanation follows regarding the findings of the present inventors when designing a suitable intermediate shape. FIG. 4 illustrates a provisional metal sheet 24, and a post-forming shaped metal sheet 26. The provisional metal sheet 24 is a sheet member employed for evaluation in a finite element method, and is a blank prior to forming. The post-forming shaped metal sheet 26 is a metal sheet including a substantially truncated four-sided pyramid shaped bulging portion 26A in the example of FIG. 4. The present inventors looked carefully at analysis results from the finite element method for a case in which the post-forming shaped metal sheet 26 was processed from the provisional metal sheet 24.

The provisional metal sheet 24 is divided into plural finite elements of rectangular shape in plan view, and one of these finite elements is examined in detail. This finite element will be called initial region α prior to forming. Moreover, in the finite elements of the post-forming shaped metal sheet 26, a finite element topologically homeomorphic to the initial region α prior to forming is called post-forming region α", and will be examined in detail. "Topologically homeomorphic finite elements" are finite elements having the same positional relationship to adjacent finite elements before and after forming. The post-forming region α" is positioned on an inclined portion of the bulging portion 26A. The shape of the region α prior to forming and the shape of the post-forming region α" are moreover illustrated in FIG. 4 superimposed on one another.

As illustrated in FIG. 4, although the initial region α prior to forming has a square shape, the post-forming region α" has a substantially rhomboidal shape. Moreover, the area of the post-forming region α" is increased in comparison to the area of the region α prior to forming.

In cases in which the provisional metal sheet is formed into the target shape by a single process, the ratio of sheet thickness reduction and strain that arise in the post-forming region α" depend on the change in shape between the regions a, a" before and after forming.

In cases in which the provisional metal sheet is an elastic body, the stress required to elastically deform the region α prior to forming into the post-forming region α" can be computed using the shape, strain, elastic modulus, and Poisson ratio of the element before and after forming.

Next, FIG. 5 illustrates the provisional metal sheet 24, a hypothetical metal sheet 25 prior to forming, and the post-forming shaped metal sheet 26. The provisional metal sheet 24 and the post-forming shaped metal sheet 26 are similar to those illustrated in FIG. 4. The hypothetical metal sheet 25 prior to forming is a hypothetical metal sheet obtained by correcting finite elements of the provisional metal sheet 24 so as to reduce the difference between the shapes of the topologically corresponding elements in the finite elements of the provisional metal sheet 24 and the finite elements of the post-forming shaped metal sheet 26. More specifically the hypothetical metal sheet 25 prior to forming is a metal sheet having element data obtained by the following analysis method.

Namely, a finite element model is built by applying the stress calculated in FIG. 4 required to elastically deform each of the finite elements of the provisional metal sheet 24 into each of the finite elements of the metal sheet 26 after forming, to each of the finite elements of the provisional metal sheet 24 under an applied condition of restraining displacement in out-of-plane directions of nodes of each of the finite elements. Then based on this finite element model, element data after elastic deformation is derived by performing elastic deformation analysis using a finite element method. The shape of each of the finite elements of the provisional metal sheet 24 is then corrected so as to become the shape of the respective finite element in the element data after elastic deformation, and a metal sheet for this corrected element data is adopted for the hypothetical metal sheet 25. The element data includes the shape and area of each of the finite elements, and the sheet thickness, area, and the like at each element. Note that the "out-of-plane directions" refers to directions orthogonal to a plane including the flat sheet shaped provisional metal sheet 24 is present.

The strain and ratio of sheet thickness reduction arising at each element when the shape of each of the finite elements in the element data for the provisional metal sheet 24 has been deformed to the shape of the element data for each of the finite elements in the post-forming shaped metal sheet 26 are adopted as the strain and ratio of sheet thickness reduction arising at each location when the provisional metal sheet 24 has been formed into the target shape. Moreover, the strain and ratio of sheet thickness reduction, arising at each element when the shape of each of the finite elements in the element data for the hypothetical metal sheet 25 has been deformed to the shape of the element data for each of the finite elements in the post-forming shaped metal sheet 26, are adopted as the strain and ratio of sheet thickness reduction arising at each location when the hypothetical metal sheet 25 has been formed into the target shape.

In cases in which a particular element of the provisional metal sheet 24 has been stretched greatly when formed to the target shape (namely, in cases in which a large strain arises and the ratio of sheet thickness reduction is large), a large stress is required to elastically deform that element from its shape prior to forming to the post-forming shape of that element. Regarding such elements, when, as described above, "a finite element model is built by applying the stress required to elastically deform each of the finite elements of the provisional metal sheet 24 into each of the finite elements of the metal sheet 26 after forming, to each of the finite elements of the provisional metal sheet 24 under an applied condition of restraining displacement in out-of-plane directions of nodes of each of the finite elements. Then based on this finite element model, element data after elastic deformation is derived by performing elastic deformation analysis using a finite element method", since a large stress is applied to such elements, these elements are stretched greatly by elastic deformation and the area thereof increases. The stretched element shapes resulting from this elastic deformation are the shapes of the corresponding elements in the hypothetical metal sheet 25.

In FIG. 5, the region α prior to forming contained in the provisional metal sheet 24, the shape of a region α' prior to forming contained in the hypothetical metal sheet 25 prior to forming, and the shape of the post-forming region α" contained in the post-forming shaped metal sheet 26 are illustrated superimposed on one another. These regions are topologically homeomorphic regions. In this example, elements in the region α of the provisional metal sheet 24 are stretched greatly to become the elements in the post-forming region α". A large stress is required in order to stretch the shapes of the elements of the region α into the shapes of the elements of the region α" by elastic deformation. When a finite element model is built by applying this stress to the elements in the region α of provisional metal sheet 24 under application of a condition of restraining displacement in out-of-plane directions, and elastic deformation analysis is performed, the elements of the region α are stretched and become larger to become the elements of the region α' of the hypothetical metal sheet 25 prior to forming. The elements of the region α' are closer in shape to the elements of the region α" than to the elements of the region α. Thus forming the region α" from the region α' results in less strain and a smaller ratio of sheet thickness reduction arising during forming than forming the region α" from the region α.

The amount by which the ratio of sheet thickness reduction decreases when the post-forming shaped metal sheet 26 is formed from the hypothetical metal sheet 25, in comparison to the ratio of sheet thickness reduction when the post-forming shaped metal sheet 26 is formed from the provisional metal sheet 24, is larger for elements applied with larger stress in the finite element model under application of the out-of-plane restraint condition, namely is larger for elements in a region greatly stretched and having a high ratio of sheet thickness reduction when the post-forming shaped metal sheet 26 is formed from the provisional metal sheet 24.

However, for elements not greatly stretched and having a small ratio of sheet thickness reduction when the post-forming shaped metal sheet 26 is formed from the provisional metal sheet 24, the stress applied in the finite element model under application of the out-of-plane restraint condition is also smaller, and there is a smaller decrease in the ratio of sheet thickness reduction when the post-forming shaped metal sheet 26 is formed from the hypothetical metal sheet 25.

Accordingly, consider a finite element model built to take the stress required to elastically deform each of the finite elements of the provisional metal sheet 24 into each of the finite elements of the post-forming metal sheet 26 across the metal sheet as a whole rather than some regions thereof, and to apply this stress to each of the finite elements of the provisional metal sheet 24 under application of the condition of restraining displacement in out-of-plane directions of nodes of each of the finite elements. When elastic deformation analysis is performed based on this finite element model using a finite element method to derive element data after elastic deformation, and the shapes of each of the finite elements of the provisional metal sheet 24 are corrected so as to become the shapes of each of the finite elements in the element data after elastic deformation, and the hypothetical metal sheet 25 is derived, the ratio of sheet thickness reduction when the post-forming shaped metal sheet 26 is formed from the hypothetical metal sheet 25 is more uniform than the ratio of sheet thickness reduction when the post-forming shaped metal sheet 26 is formed from the provisional metal sheet 24. This accordingly lowers the maximum value of the ratio of sheet thickness reduction.

When forming the post-forming shaped metal sheet 26 from the hypothetical metal sheet 25, consider the strain and ratio of sheet thickness reduction when the post-forming shaped metal sheet 26 is formed from the provisional metal sheet 24 compared to the strain and ratio of sheet thickness reduction when the post-forming shaped metal sheet 26 is formed from the hypothetical metal sheet 25. When an intermediate shape is formed first to stretch portions where strain and ratio of sheet thickness reduction are larger when the post-forming shaped metal sheet 26 is formed from the hypothetical metal sheet 25, and the post-forming shaped metal sheet 26 is then formed therefrom, a decrease can be achieved in the amount of stretching required to form portions having larger strain and ratio of sheet thickness reduction when the post-forming shaped metal sheet 26 is formed from the provisional metal sheet 25. This enables a closer shape to also be achieved in actual press-forming to when the post-forming shaped metal sheet 26 is formed from the hypothetical metal sheet 25 in the finite element model. This enables the maximum value of the ratio of sheet thickness reduction to be lowered.

The intermediate shape is derived in the following manner. First, taking the hypothetical metal sheet 25 to be an elastic body, the stress required for deformation is derived for each element of the hypothetical metal sheet 25, this being the stress required to elastically deform each element of the hypothetical metal sheet 25 into the shape of each of the corresponding elements in the post-forming shaped metal sheet 26. Next, a finite element model is built in which elements at portions where the strain and ratio of sheet thickness reduction when the post-forming shaped metal sheet 26 is formed from the hypothetical metal sheet 25 is larger than the strain and ratio of sheet thickness reduction when the post-forming shaped metal sheet 26 is formed from the provisional metal sheet 24, are applied with the derived stress required for deformation, and in which elements at portions where the strain and ratio of sheet thickness reduction when the post-forming shaped metal sheet 26 is formed from the provisional metal sheet 24 is larger than the strain and ratio of sheet thickness reduction when the post-forming shaped metal sheet 26 is formed from the hypothetical metal sheet 25 are applied with either a stress having a smaller absolute value than the stress required for deformation, or applied with no stress. The intermediate shape is derived by performing elastic deformation analysis with this finite element model. Note that in the present exemplary embodiment, reference to "large" or "small" stress refers to the absolute value of the stress being large or small. Similar also applies in the case of strain.

The intermediate shape derived in this manner is a shape formed to a shape close to that of the post-forming shaped metal sheet 26 at portions where the strain and ratio of sheet thickness reduction are larger when the post-forming shaped metal sheet 26 is formed from the hypothetical metal sheet 25 than when formed from the provisional metal sheet 24, and is a shape hardly formed at all at portions where the strain and ratio of sheet thickness reduction are larger when the post-forming shaped metal sheet 26 is formed from the provisional metal sheet 24 than when formed from the hypothetical metal sheet 25.

Accordingly, first forming such an intermediate shape enables portions where the strain and ratio of sheet thickness reduction are larger when the post-forming shaped metal sheet 26 is formed from the hypothetical metal sheet 25 to be formed and stretched first. This also enables the ratio of sheet thickness reduction when subsequently forming the target shape to be made more uniform, enabling the maximum value of the ratio of sheet thickness reduction to be lowered.

The intermediate shape is accordingly designed based on the shape and element data obtained as described above for the hypothetical metal sheet 25 prior to forming and the post-forming shaped metal sheet 26. The stock metal sheet is formed into this intermediate shape and then processed to the target shape, thereby making cracking due to fracturing of the material less liable to occur. In other words, the element data for the hypothetical metal sheet 25 prior to forming is derived from the element data for the post-forming shaped metal sheet 26 and the provisional metal sheet 24, and the intermediate shape is designed based on the element data for the post-forming shaped metal sheet 26 and the obtained shape and element data for the hypothetical metal sheet 25 prior to forming. Cracking due to fracturing of the material is accordingly less liable to occur, such that, moreover, an optimized intermediate shape can be designed even when the metal sheet is comparatively high strength sheet steel.

Explanation follows regarding an exemplary embodiment of the present invention, with reference to the drawings.

First Exemplary Embodiment

Figure 6:
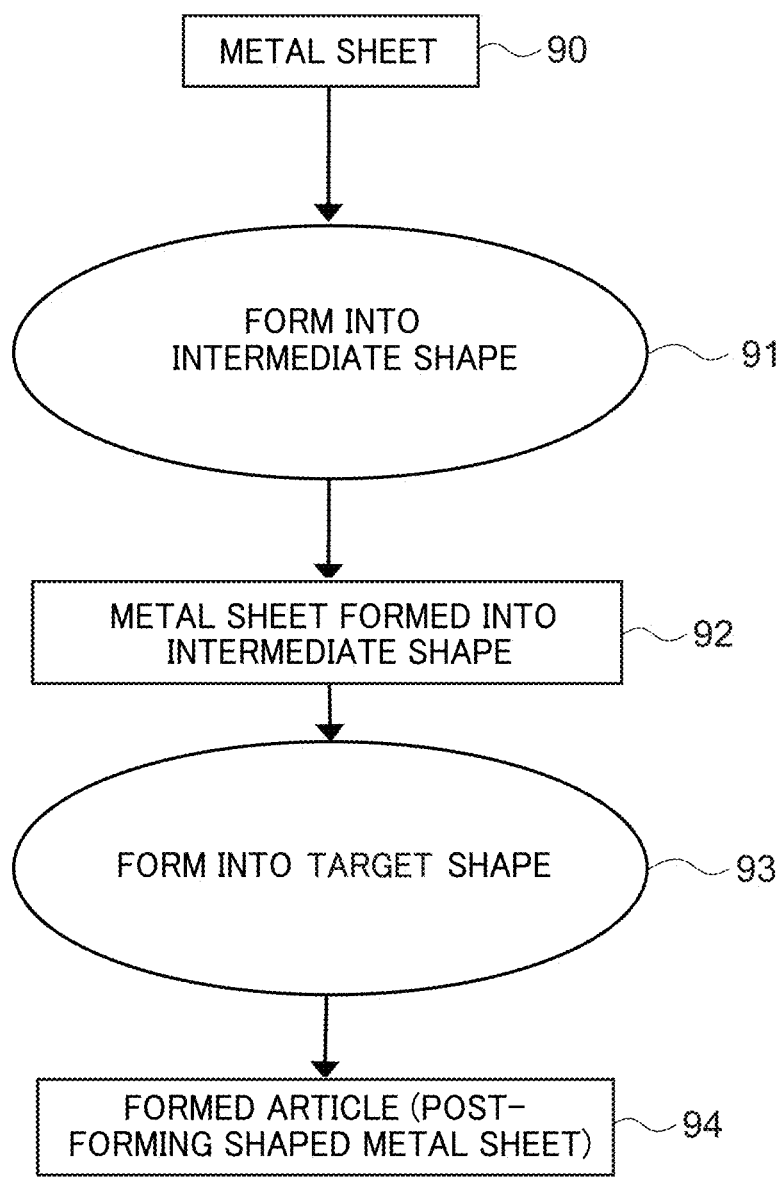
FIG. 6 is a flowchart to explain a method of forming a metal sheet of a first exemplary embodiment.

As illustrated by the flowchart in FIG. 6, a method of forming a metal sheet of a first exemplary embodiment is a method in which, when press-forming a metal sheet (90) to form a target shape, the metal sheet (90) is formed (91) into an intermediate shape that is different from the target shape, and a metal sheet formed into the intermediate shape (92) is then formed into the target shape to obtain a formed article (94). When this is performed, a shape obtained by following the procedure below is adopted as the intermediate shape. Namely, element data (D) for the hypothetical metal sheet 25 prior to forming is derived. A deformed shape is then adopted that has been deformed by imparting a strain to some elements in the element data (D) that is a strain required to deform each of these elements to the shape of each of the topologically corresponding elements in the element data (B) for the post-forming shaped metal sheet 26, while either imparting a strain to the remaining elements in the element data (D) that is a strain having a smaller absolute value than the strain required to deform each of these elements to the shape of each of the topologically corresponding elements in the element data (B) for the post-forming shaped metal sheet 26, or imparting no strain to these remaining elements.

Detailed explanation next follows regarding the method of forming a metal sheet of the first exemplary embodiment with reference to FIG. 7 to FIG. 9, and FIG. 35.

Figure 35:
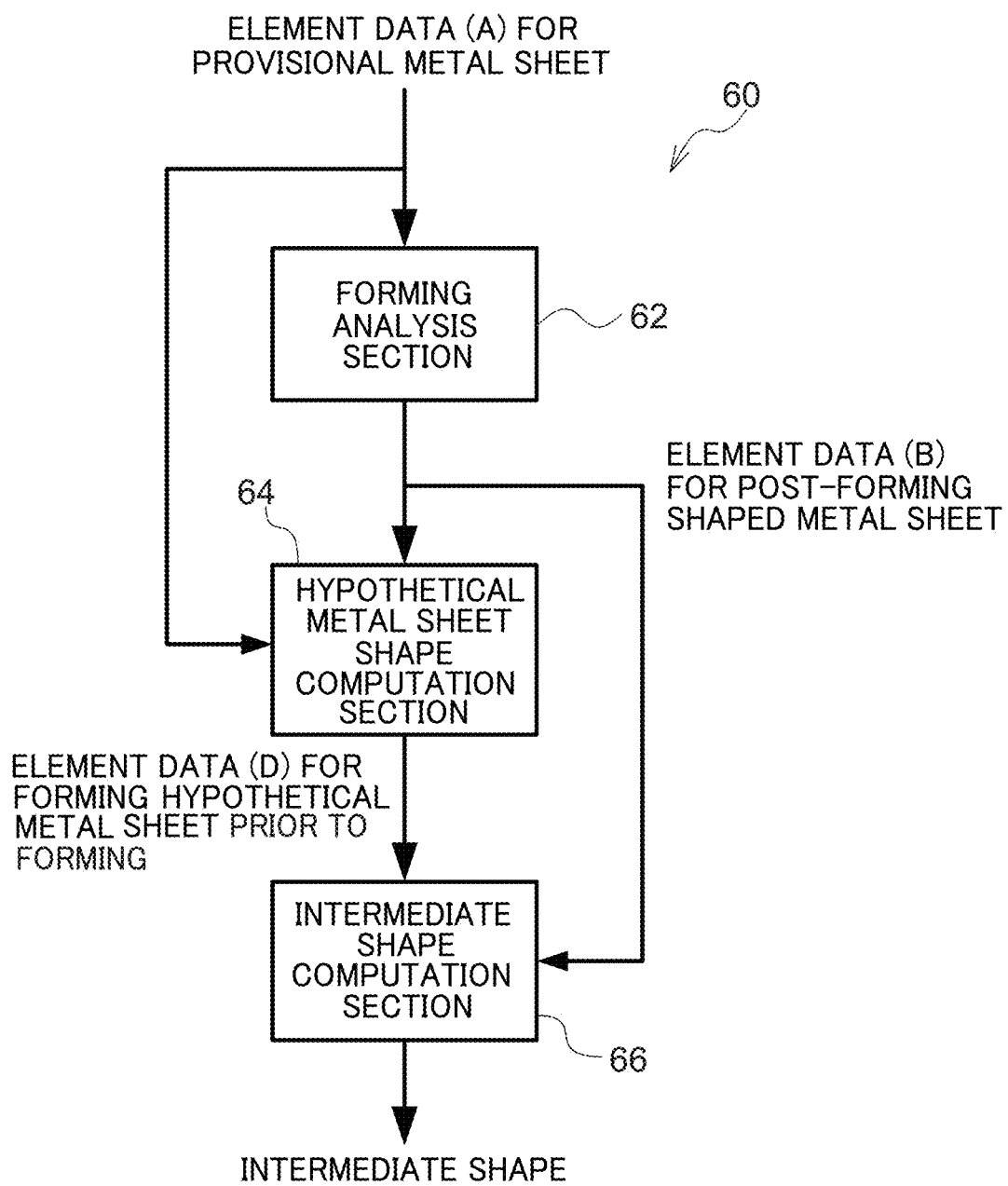
FIG. 35 is a functional block diagram illustrating an intermediate shape design device.

FIG. 35 is a functional block diagram illustrating design equipment 60 used to obtain the intermediate shape. As illustrated in FIG. 35, the design equipment 60 includes a forming analysis section 62, a hypothetical metal sheet shape computation section 64, and an intermediate shape computation section 66. The forming analysis section 62 performs forming analysis using a finite element method to derive the element data (B) for finite elements of the post-forming shaped metal sheet 26 based on the element data (A) for the finite elements of the provisional metal sheet 24. The hypothetical metal sheet shape computation section 64 derives the element data (D) for the hypothetical metal sheet 25 prior to forming based on the element data (B) for the post-forming shaped metal sheet 26 and element data (A) for the provisional metal sheet 24. The intermediate shape computation section 66 derives the intermediate shape from the element data (B) for the finite elements of the post-forming shaped metal sheet 26 and the element data (D) for the hypothetical metal sheet 25 prior to forming.

Figure 7:
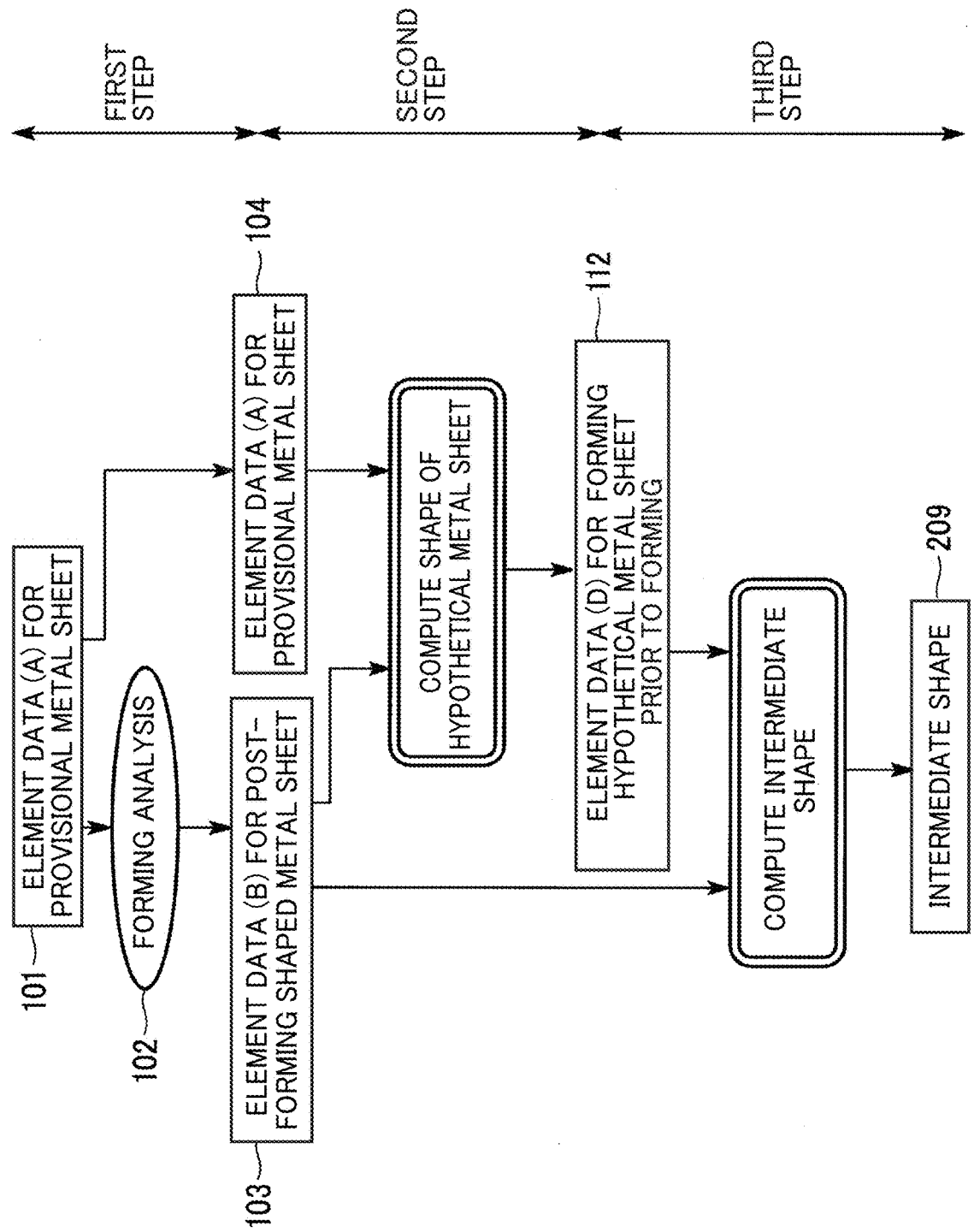
FIG. 7 is a flowchart to explain a method of forming a metal sheet of the first exemplary embodiment.

FIG. 7 is a flowchart to explain a procedure of the design method used to obtain the intermediate shape. As illustrated in FIG. 7, the design method for the intermediate shape includes a first step, a second step, and a third step. Note that the flowcharts of FIG. 7 to FIG. 9, described below, are also flowcharts representing a computer program used to execute the first step to the third step. Both rectangular boxes and elliptical boxes are drawn in the explanatory flowcharts in the present specification. Contents of data either before or after processing is illustrated in the rectangular boxes. Contents of processing performed with various data is illustrated in the elliptical boxes. The respective boxes are appended with reference numerals for convenience of explanation.

At the first step illustrated in FIG. 7, the element data (B) for the finite elements of the post-forming shaped metal sheet 26 is derived by forming analysis using a finite element method based on the element data (A) for the finite elements of the provisional metal sheet 24. Although not explicit in the flowchart, at the first step, state change amounts (ΔX) between before and after forming are derived for topologically corresponding finite elements in the element data (A) and (B). Note that the state change amounts (ΔX) include, for example, at least one out of a proportional area reduction, ratio of sheet thickness reduction, maximum proportional strain change, and minimum proportional strain change in the metal sheet between before and after forming. Next, at the second step, the element data (D) is derived for the hypothetical metal sheet 25 prior to forming based on the element data (B) for the post-forming shaped metal sheet 26 and the element data (A) for the provisional metal sheet 24. Next, at the third step, an intermediate shape is derived from the element data (B) for the finite elements of the post-forming shaped metal sheet 26 and the element data (D) for the hypothetical metal sheet 25 prior to forming.

Figure 8:
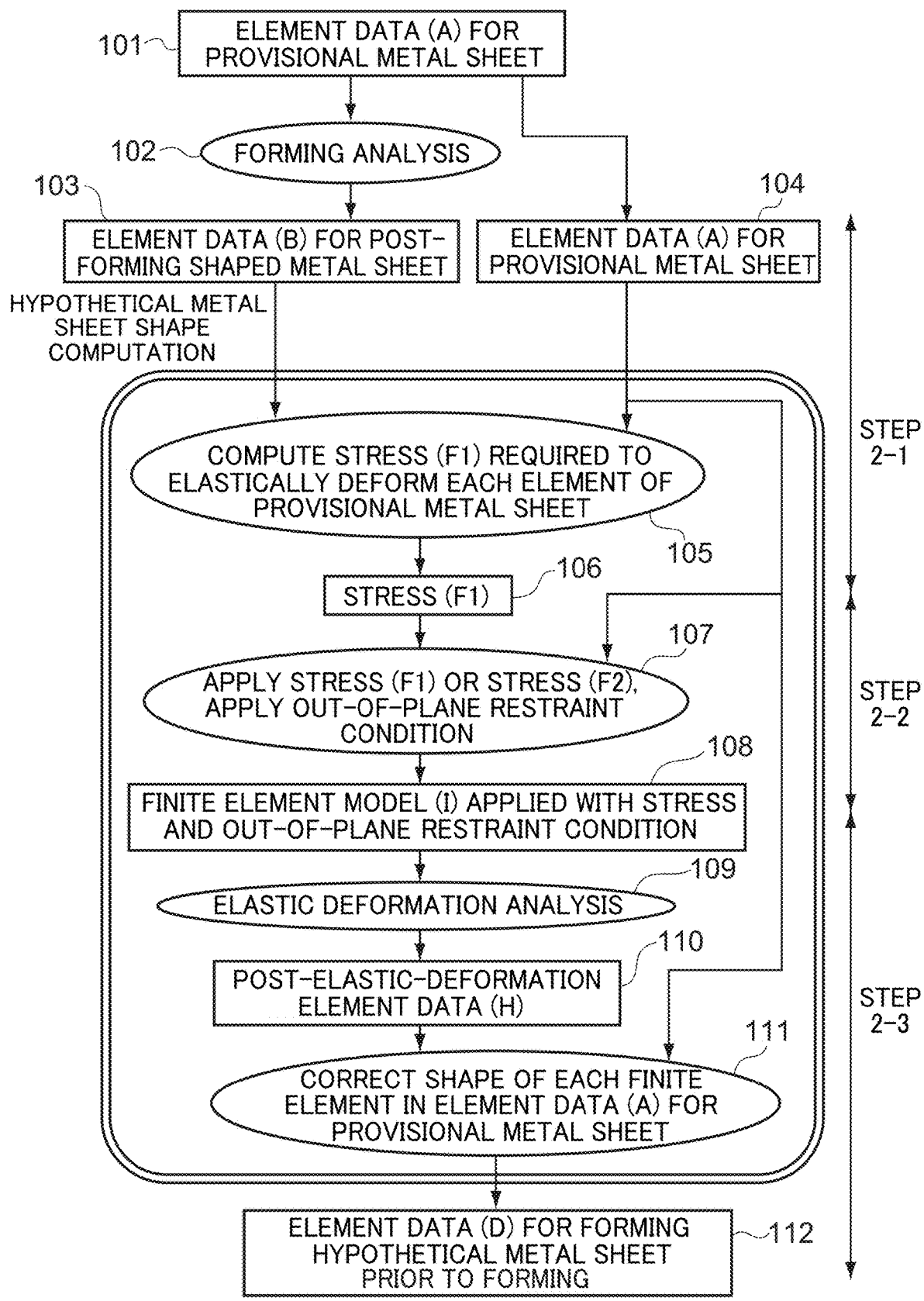
FIG. 8 is a flowchart to explain a method of forming a metal sheet of the first exemplary embodiment.

FIG. 8 and FIG. 9 illustrate flowcharts to explain in more detail the intermediate shape design method. The first step to the third step that have been described with reference to FIG. 7 are split into more detailed steps in FIG. 8 and FIG. 9.

First Step

As illustrated in FIG. 8, at the first step the element data (A) for the provisional metal sheet 24 (at 101) is prepared. For the element data (A), the provisional metal sheet 24 is divided into plural finite elements, and the element data (A) is set as the initial values for each finite element. Next, elasto-plastic forming analysis is executed using a finite element method (at 102). When this is performed, forming analysis is performed with the provisional metal sheet 24 modeled as an elasto-plastic body. The element data (B) for each of the finite elements of the post-forming shaped metal sheet 26 (at 103) is obtained as the result of this analysis.

Figure 10A:
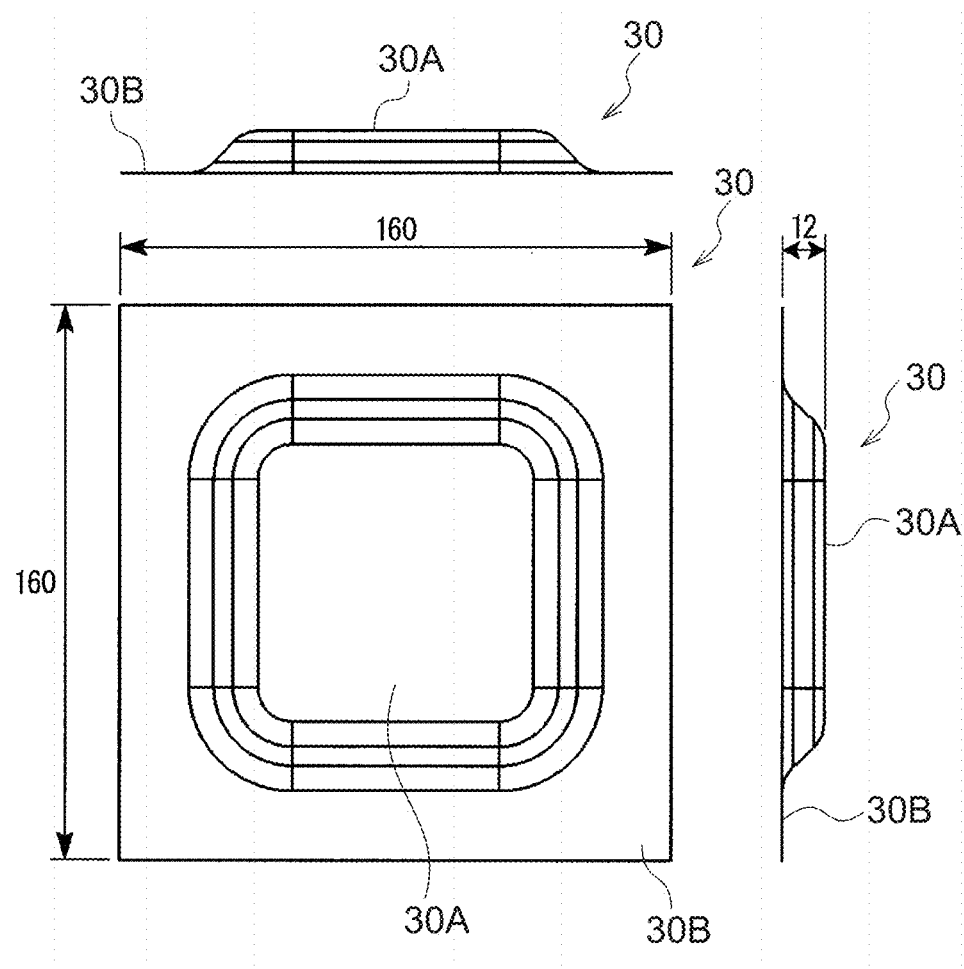
FIG. 10A is a three elevation diagram illustrating a product shape corresponding to the first exemplary embodiment, Example 1 to Example 4, and Comparative Examples 1 and 2.
Figure 10B:
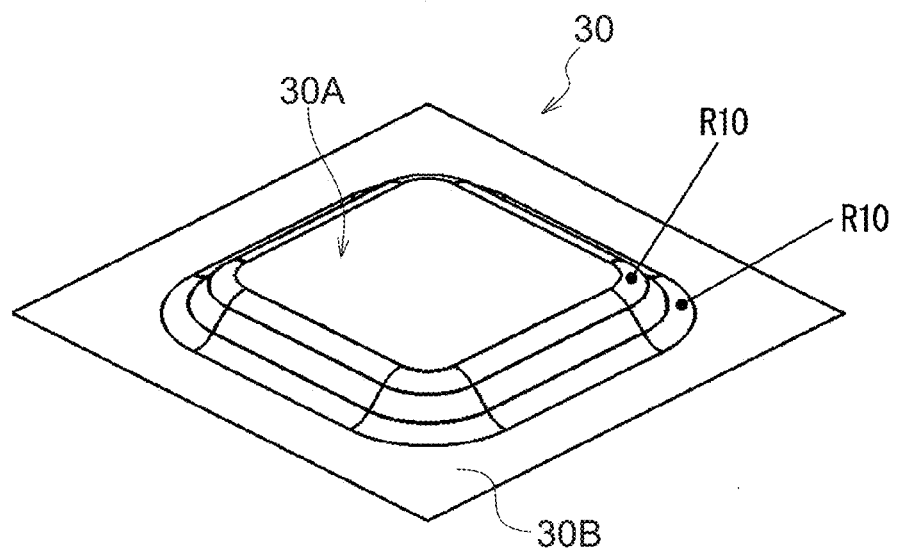
FIG. 10B is a perspective view illustrating a product shape corresponding to the first exemplary embodiment, Example 1 to Example 4, and Comparative Examples 1 and 2.

FIG. 10A illustrates a three elevation diagram of an example of a desired final product shape 30. FIG. 10B is a perspective view illustrating the product shape 30. The product shape 30 illustrated in FIG. 10A and FIG. 10B includes a bulging portion 30A and a flange 30B surrounding the bulging portion 30A. The bulging portion 30A has the shape of a substantially truncated four-sided pyramid with an external shape 160 mm in length, 160 mm in width, and 12 mm in height. A radius of curvature R between an inclined face of the bulging portion 30A and the flange 30B is set to 10 mm, and a radius of curvature R between an inclined face of the bulging portion 30A and an upper face of the bulging portion 30A is set to 10 mm. Note that applicable shapes for the present invention are not limited to the shape illustrated in FIG. 10A and FIG. 10B.

Figure 11A:
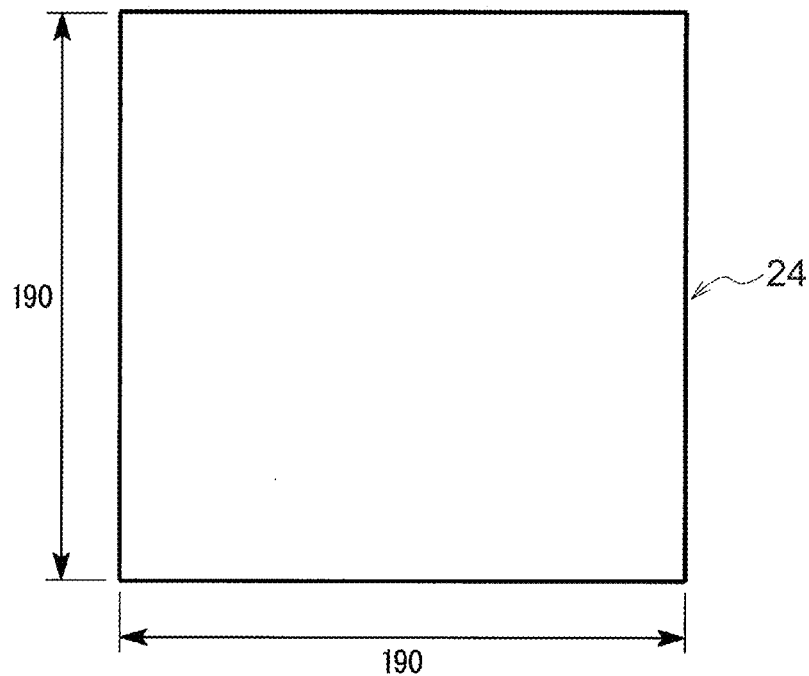
FIG. 11A is a schematic plan view illustrating a shape of a provisional metal sheet corresponding to the first exemplary embodiment, Example 1 to Example 4, and Comparative Examples 1 and 2.

When a stock metal sheet has been press-formed, variation arises in the outer peripheral profile and the like of the metal sheet after forming due to variation in material in-flow and the like. A target shape in the first exemplary embodiment is a shape slightly larger than an outer peripheral portion of the product shape 30, enabling the product shape 30 to be obtained by trimming excess in the outer peripheral portion after the target shape has been formed. Accordingly, for example, the shape of the provisional metal sheet 24 is set to a slightly larger shape than the minimum stock metal sheet shape required to form the product shape 30. Specifically, the shape of the provisional metal sheet 24 is set to a square 190 mm in length and width, as illustrated in FIG. 11A. The thickness of the provisional metal sheet shape is 1.2 mm.

Figure 11B:
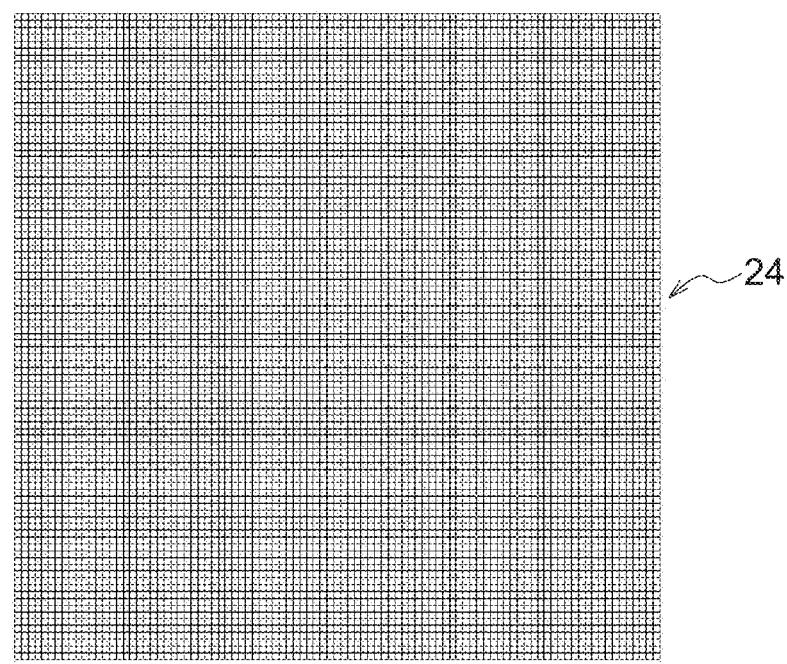
FIG. 11B is a diagram illustrating element data (A) for a provisional metal sheet corresponding to the first exemplary embodiment, Example 1 to Example 4, and Comparative Examples 1 and 2.

FIG. 11B illustrates a model in which the provisional metal sheet 24 illustrated in FIG. 11A has been divided into plural finite elements. This corresponds to the element data (A) for the provisional metal sheet at 101 in FIG. 8.

Figure 12:
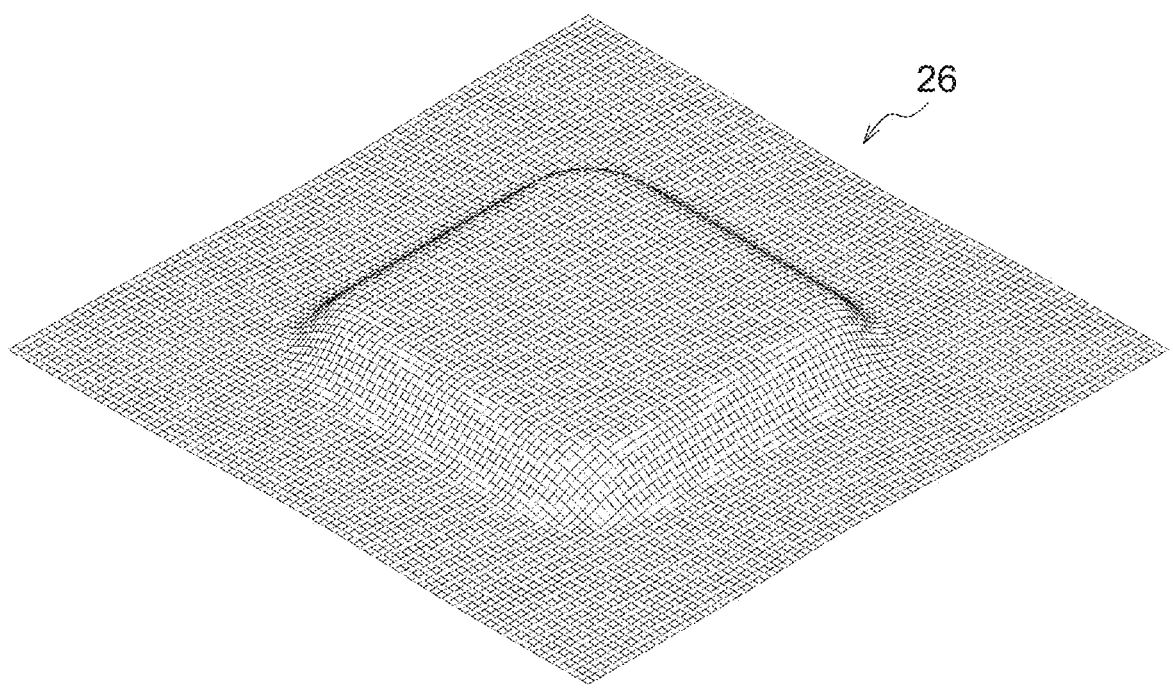
FIG. 12 is a diagram illustrating element data (B) for a post-forming shaped metal sheet corresponding to the first exemplary embodiment and Example 1.

Elasto-plastic forming analysis using a finite element method is performed based on the element data (A) for the provisional metal sheet 24 illustrated in FIG. 11B to derive a target shape when formed in a die having a shape in which the outer peripheral portion of the product shape 30 has been extended, thereby deriving the element data (B) for the post-forming shaped metal sheet 26. The derived element data (B) for the post-forming shaped metal sheet 26 is illustrated in FIG. 12. This corresponds to the element data (B) for the post-forming shaped metal sheet 26 at 103 in FIG. 8.

In the element data (B) for the post-forming shaped metal sheet 26 illustrated in FIG. 12, the outer peripheral portion is slightly larger than the product shape 30 illustrated in FIG. 10A and FIG. 10B. The outer peripheral portion of the element data (B) is rendered substantially the same shape as that of the product shape 30 of FIG. 10A and FIG. 10B by trimming.

Figure 37:
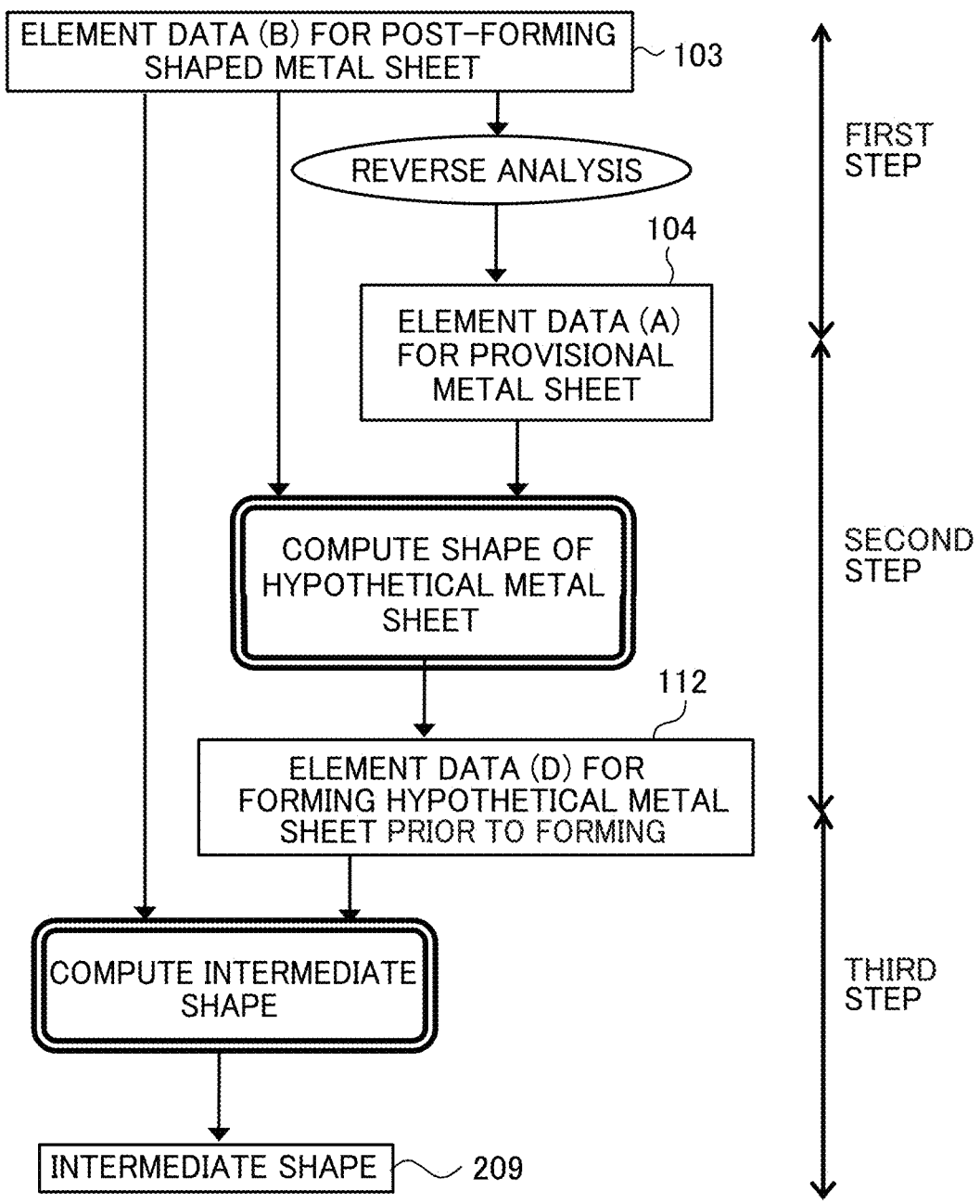
FIG. 37 is a flowchart to explain a method of forming a metal sheet employing reverse analysis.
Figure 38:
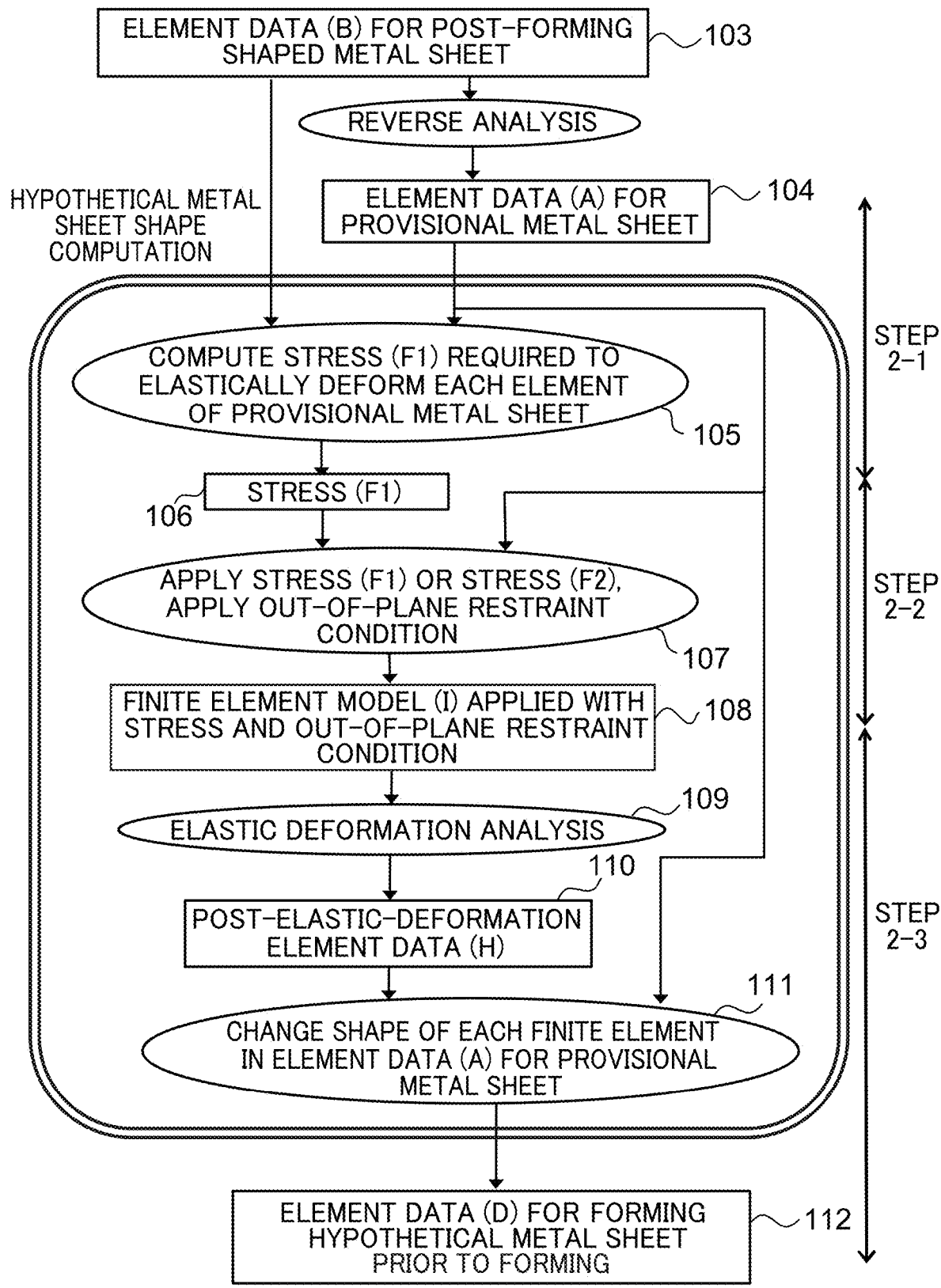
FIG. 38 is a flowchart to explain a method of forming a metal sheet employing reverse analysis.

Note that the shape of the provisional metal sheet 24 does not necessary need to be larger than the minimum stock metal sheet shape required to form the product shape 30. Moreover, the shape of the metal sheet 26 after forming does not need to be larger than the product shape 30, i.e. the target shape. In cases such as those in which dimensional precision is not demanded for the outer peripheral portion of the product shape 30, the shape of the provisional metal sheet 24 may be set to the minimum stock metal sheet shape required to form the product shape 30, and the shape of the metal sheet 26 after forming may be set to the product shape, i.e. the target shape. For example, the product shape 30 may be divided into finite elements, and a blank shape derived by performing reverse analysis on the divided finite elements so as to open out the finite elements of the product shape 30. The derived blank shape may then be adopted as the shape of the provisional metal sheet 24. In such cases, since the element data for the blank shape is the element data for the product shape 30 after forming, the element data for the product shape 30 may be set as the element data (B) for the post-forming shaped metal sheet 26, and the element data for the blank shape may be set as the element data (A) for the provisional metal sheet 24. For example, as illustrated in FIG. 37 and FIG. 38, the element data (A) for the provisional metal sheet may be derived based on the element data (B) for the post-forming shaped metal sheet by performing reverse analysis using a finite element method.

Although each of the finite elements has a square shape in the present exemplary embodiment, there is no limitation to a square shape, and other shapes may be employed. Moreover, the shapes of each of the finite elements may include plural different shape types.

Second Step

The second step is a step to correct the element data (A) for the provisional metal sheet 24 so as to decrease the difference in shape between topologically corresponding elements in the element data (A) for the provisional metal sheet 24 and the element data (B) for the post-forming shaped metal sheet 26, and to derive the element data (D) for the hypothetical metal sheet 25 prior to forming. The second step includes the following step 2-1, step 2-2, and step 2-3. Note that the second step is not limited thereto, and any steps may be performed that enable the element data (D) for the hypothetical metal sheet prior to forming to be derived.

Detailed explanation follows regarding each step.

Step 2-1

As illustrated in FIG. 8, at step 2-1, a stress (F1) is derived, the stress (F1) being the stress required to be applied to each of the finite elements of the provisional metal sheet 24 in order to elastically deform each element in the element data (A) for the provisional metal sheet 24 to the shape of each of the topologically corresponding elements in the element data (B) for the post-forming shaped metal sheet 26. Computation of the stress (F1) employs the element data (A) for the provisional metal sheet 24 (at 104) and the element data (B) for the post-forming shaped metal sheet 26 (at 103) obtained by performing elasto-plastic forming analysis.

In order to compute the stress (F1), first, each of the finite elements in the element data (B) for the post-forming shaped metal sheet 26 illustrated in FIG. 12 is associated with each of the finite elements in the element data (A) for the provisional metal sheet 24. This association associates the finite elements in the element data (A) for the provisional metal sheet 24 with the finite elements in the element data (B) for the post-forming shaped metal sheet 26 that are topologically homeomorphic to the finite elements in the element data (A). The stress (F1) is then derived (at 105 in FIG. 8) for each of the finite elements as the stress required to elastically deform the associated finite elements in the shape of the provisional metal sheet 24 into the associated finite elements in the post-forming shaped metal sheet 26, with the provisional metal sheet 24 being modeled as an elastic body. The obtained stress (F1) (at 106) may, for example, be derived from the shapes of each of the elements before and after forming by deriving the strain required to deform each of the elements in the element data (A) for the provisional metal sheet 24 into each of the shapes of the corresponding elements in the element data (B) for the post-forming shaped metal sheet 26. The stress (F1) can then be computed using the Poisson ratio between the derived required strain and the elastic modulus.

Step 2-2

Next, at step 2-2, a finite element model (I) (at 108) is obtained by applying the stress (F1) derived at step 2-1 (at 106) to each of the finite elements of the provisional metal sheet 24, or by applying a stress (F2) having an absolute value of more than 1.0 times but no more than 1.5 times the corresponding stress (F1) to each of the finite elements in the element data (A) for the provisional metal sheet 24, under application of a condition restraining displacement in out-of-plane directions of nodes of each of the finite elements (the out-of-plane restraint condition) (at 107).

Step 2-3

Next, at step 2-3, elastic deformation analysis is performed (at 109) using a finite element method based on the finite element model (I) at 108. Were elastic deformation analysis to be performed based on a finite element model without application of the out-of-plane restraint condition, then element data for the metal sheet having the final target shape would still be obtained. However, in the present exemplary embodiment analysis is performed based on the finite element model (I) under application of the out-of-plane restraint condition. Post-elastic-deformation element data (H) (at 110) is derived as a result.

Figure 13A:
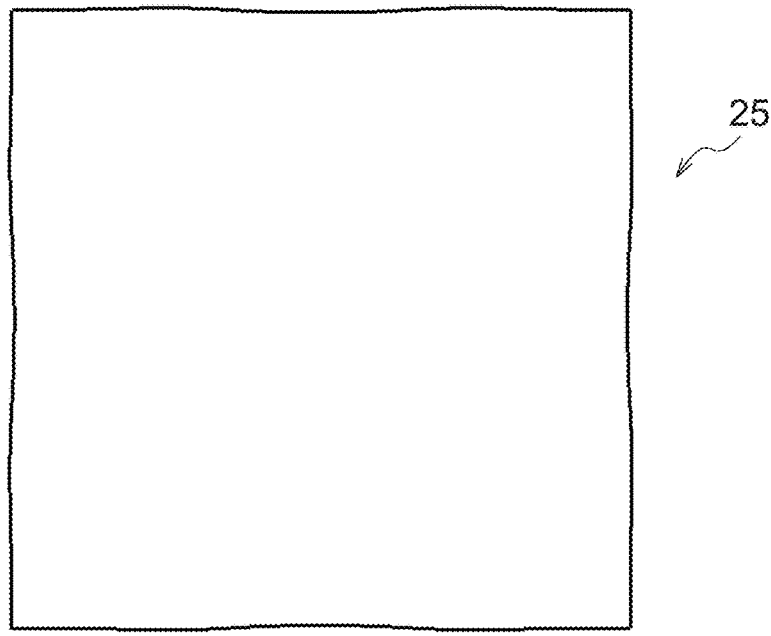
FIG. 13A is a schematic plan view illustrating a shape of a hypothetical metal sheet prior to forming corresponding to the first exemplary embodiment and Example 1.
Figure 13B:
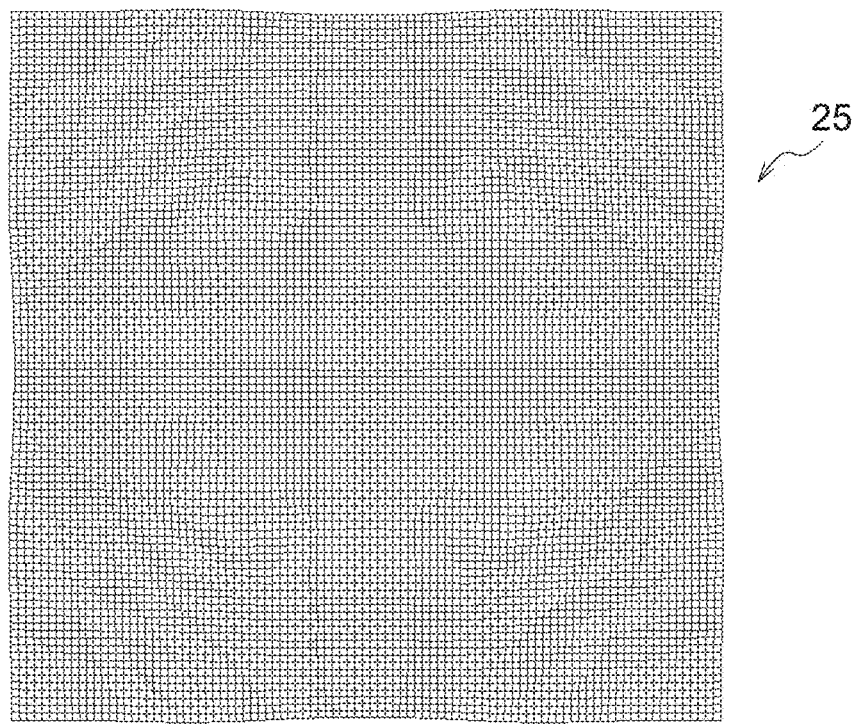
FIG. 13B is a diagram illustrating element data (D) for a hypothetical metal sheet prior to forming corresponding to the first exemplary embodiment and Example 1.

Next, the shape of each of the finite elements in the element data (A) for the provisional metal sheet 24 is corrected (at 111) so as to become the shape of each of the finite elements in the post-elastic-deformation finite element data (H). The corrected finite element data is adopted as the element data (D) for the hypothetical metal sheet 25 prior to forming (at 112). FIG. 13A illustrates the overall shape of the hypothetical metal sheet 25 prior to forming, and FIG. 13B illustrates the element data (D) for the hypothetical metal sheet 25.

The shapes in the finite element model (I) prior to elastic deformation, at 108, are the same as the shape and element shapes of the provisional metal sheet 24 illustrated in FIG. 11A and FIG. 11B. The overall shape of the metal sheet is square, and the shape of each of the elements is also square. By contrast, as illustrated in FIG. 13A, for the hypothetical metal sheet 25 with the post-elastic-deformation shape, the shape is slightly distorted and is not a perfect square. In the element data (D) for the hypothetical metal sheet 25 illustrated in FIG. 13B, the shapes of each of the finite elements have been modified from squares to slightly misshapen shapes. This corresponds to deformation caused by stress being applied to each of the finite elements prior to the elastic deformation analysis.

If the finite elements in the element data (A) for the provisional metal sheet 24 are compared against the corresponding finite elements in the element data (B) for the post-forming shaped metal sheet 26, elements to be stretched and enlarged by forming (namely, where strain and ratio of sheet thickness reduction occurring due to forming are large) are applied with larger stress. The corresponding finite elements in the element data for the hypothetical metal sheet 25 are accordingly made larger as a result of elastic deformation than the finite elements in the element data for the provisional metal sheet 24, and have a shape closer to the finite elements in the element data for the post-forming shaped metal sheet 26.

Note that if the stress applied to each of the finite elements in the element data (A) for the provisional metal sheet 24 at step 2-2 is less than the stress (F1) derived at step 2-1, then regions of material that require stretching would not be adequately stretched when actually forming the intermediate shape. This would result in larger strain being imparted when the intermediate shape is being formed into the final target shape, which would give rise to the possibility of cracking or fracturing of the final target shape. In the press-forming method of the present invention, the intermediate shape and the like are derived on the basis of numerical calculations using a finite element method. However, since the numerical calculations by finite element methods include computational errors, some difference will arise thereto in actual pressing. Moreover, in consideration of such errors in the numerical calculations, in order to reliably stretch the material in regions that require stretching to form the intermediate shape, the absolute values of the stress applied to the provisional metal sheet 24 may be set to a larger value than the absolute value of the stress (F1) derived at step 2-1. However, if the absolute values of the stress applied to the provisional metal sheet 24 exceeds 1.5 times the absolute values of the stress (F1), then when forming the intermediate shape from the provisional metal sheet 24, there may be portions in the intermediate shape where there is a localized increase in the ratio of sheet thickness reduction and strain, resulting in the possibility of cracking or fracturing.

Third Step

Next, at the third step, as illustrated in FIG. 9, the element data (D) for the hypothetical metal sheet 25 prior to forming and the element data (B) for the post-forming shaped metal sheet 26 are prepared (at 201, 202), and stress (F3) required to elastically deform the hypothetical metal sheet 25 prior to forming to the target shape is derived (at 203, 204) for each of the finite elements, with the hypothetical metal sheet 25 being modeled as an elastic body. The stress (F3) is, for example, computed from the shape of each of the elements before and after forming by deriving the strain required to deform each of the elements in the element data (D) for the hypothetical metal sheet 25 prior to forming into the shape of each of the corresponding elements in the element data (B) for the post-forming shaped metal sheet 26, and then using the Poisson ratio between the derived required strain and the elastic modulus.

Moreover, at the third step, a finite element model (J) is built (at 205, 206) by applying the stress (F3) (at 204) derived for each of the finite elements to some of the topologically corresponding finite elements of the hypothetical metal sheet 25 prior to forming, and applying a stress smaller than the stress (F3) to the remaining topologically corresponding finite elements, or applying no stress thereto. Specifically, the finite element model (J) is built (at 206) by applying the stress (F3) to some of the finite elements in the element data (D) for the hypothetical metal sheet 25 prior to forming, and applying a smaller stress than the stress (F3) to the remaining finite elements in the element data (D), or applying no stress thereto.

The finite elements applied with the stress (F3) from out of the element data (D) for the hypothetical metal sheet 25 prior to forming may be selected as elements in regions that require stretching when forming the intermediate shape. For example, the strain and the ratio of sheet thickness reduction arising when deforming each of the elements in the element data (A) for the provisional metal sheet 24 into the corresponding element in the element data (B) for the post-forming shaped metal sheet 26 may be compared against the strain and the ratio of sheet thickness reduction arising when deforming each of the elements in the element data (D) for the hypothetical metal sheet 25 into the corresponding element in the element data (B) for the post-forming shaped metal sheet 26. The elements for which the strain and the ratio of sheet thickness reduction is larger in the latter case may then be selected. Selection of the elements in regions that require stretching when forming the intermediate shape is not limited to the above, and the designer of the intermediate shape may freely select such elements based on the ratio of sheet thickness reduction, strain, or the like in the results of forming analysis, or based on the results of actual press-forming tests. Alternatively, threshold values may be set for the ratio of sheet thickness reduction, strain, proportional change in area, or the like.

The finite elements not selected from out of the element data (D) for the hypothetical metal sheet 25 prior to forming as finite elements in regions that require stretching when forming the intermediate shape may either be applied with a smaller stress than the stress (F3) or applied with no stress. In cases in which the intermediate shape is derived by not applying stress to the elements not selected from out of the element data (D) for the hypothetical metal sheet 25 prior to forming as finite elements in regions that require stretching when forming the intermediate shape, the ratio of sheet thickness reduction and strain at these portions during actual forming of the intermediate shape can be reduced. This enables the maximum value of the ratio of sheet thickness reduction when forming the target shape to be lowered.

However, in such cases, a discontinuity in stress arises at boundary portions between elements applied with the stress (F3) and elements not applied with stress when forming the intermediate shape. When the intermediate shape is derived by performing elastic deformation analysis on the finite element model (J) having a discontinuous stress distribution, this results in a shape in which extreme angle changes and the like arise at such boundary portions in the intermediate shape. This may result in issues such as the occurrence of creasing or the occurrence of wrinkling when forming the intermediate shape in an actual press.

As a solution to such issues occurring, instead of applying no stress to all of the elements that were not selected from out of the element data (D) for the hypothetical metal sheet 25 prior to forming as elements in regions that require stretching when forming the intermediate shape, stress with a smaller absolute value than the stress (F3) may be applied to elements in the vicinity of a boundary to elements that have been applied with the stress (F3), and the absolute value of the stress applied gradually decreased on progression away from the boundary so as to eliminate a discontinuity in the stress distribution.

FIG. 14A to FIG. 14C illustrate a case in which stress is not applied to the finite elements in remaining portions that are not the finite elements applied with the stress (F3). FIG. 15A to FIG. 15C illustrate a case in which a smaller stress than the stress (F3) is applied to the finite elements in remaining portions that are not the finite elements applied with the stress (F3).

In FIG. 14A, regions applied with the stress (F3) are indicated by diagonal lines, and a region not applied with stress is left blank.

The regions applied with the stress (F3) in FIG. 14A are, for example, elements for which the strain and the ratio of sheet thickness reduction are larger in the latter case in a comparison of the strain and the ratio of sheet thickness reduction that occur when each of the elements in the element data (FIG. 11B) for the provisional metal sheet are deformed into the corresponding elements in the element data (FIG. 12) for the post-forming shaped metal sheet 26, compared to the strain and the ratio of sheet thickness reduction that occur when each of the elements in the element data for the hypothetical metal sheet 25 (FIG. 13B) are deformed into the corresponding elements in the element data for the post-forming shaped metal sheet (FIG. 12).

Note that the method for deciding the regions to be applied with the stress (F3) is not limited thereto, and the designer of the intermediate shape may freely select such regions based on the ratio of sheet thickness reduction, strain, or the like in the results of forming analysis, or based on the results of actual press-forming tests. Alternatively, the decision may be made by setting threshold values for the ratio of sheet thickness reduction, strain, proportional change in area, or the like.

In FIG. 14B and FIG. 14C, stress distribution in the hypothetical metal sheet 25 prior to forming is illustrated by a solid line for a case in which the stress (F3) is applied to the diagonal line portions 25A and stress is not applied to the blank portion 25B in FIG. 14A. In FIG. 14B and FIG. 14C, there is a sudden change in stress at the boundaries between the regions applied with the stress (F3) and the region not applied with stress. Note that the dashed lines in the graphs in FIG. 14B and FIG. 14C illustrate the distribution of the stress (F3) in the regions for the regions where stress is not actually applied.

In FIG. 15A, regions applied with the stress (F3) are indicated by diagonal lines, and a region applied with a smaller stress than the stress (F3) is left blank. In FIG. 15B and FIG. 15C, stress distribution in the hypothetical metal sheet 25 prior to forming is illustrated by a solid line for a case in which, in FIG. 15A, the stress (F3) is applied to the diagonal line portions 25A, a smaller stress than the stress (F3) is applied to a portion of the blank portion 25B, and stress (F3) is not applied to the remaining portion of the blank portion 25B.

The smaller stress than the stress (F3) is applied in the vicinity of the boundaries between the diagonal line portions 25A and the blank portion 25B in FIG. 15A. In FIG. 15B and FIG. 15C, due to applying the smaller stress than the stress (F3) to locations between the regions applied with the stress (F3) and the non-applied region, stress changes gently at the boundaries between the regions applied with the stress (F3) and the region not applied with stress. Note that the dashed lines in the graphs in FIG. 15B and FIG. 15C illustrate the distribution of the stress (F3) in the region for regions applied with the smaller stress than the stress (F3) and the region not applied with stress.

Next, as illustrated at 207 in FIG. 9, elastic deformation analysis is performed on the finite element model (J) using a finite element method. When this is performed, the elastic deformation analysis is performed with the finite element model (J) modeled as an elastic body. Element data (G) (at 208) for the hypothetical metal sheet after deformation is obtained by this elastic deformation analysis. The shape of the element data (G) for the hypothetical metal sheet is adopted as the intermediate shape (at 209). FIG. 16A illustrates an intermediate shape 40 derived using the finite element model (J) having the stress distribution illustrated in FIG. 14A, FIG. 14B, and FIG. 14C.

Figure 16B:
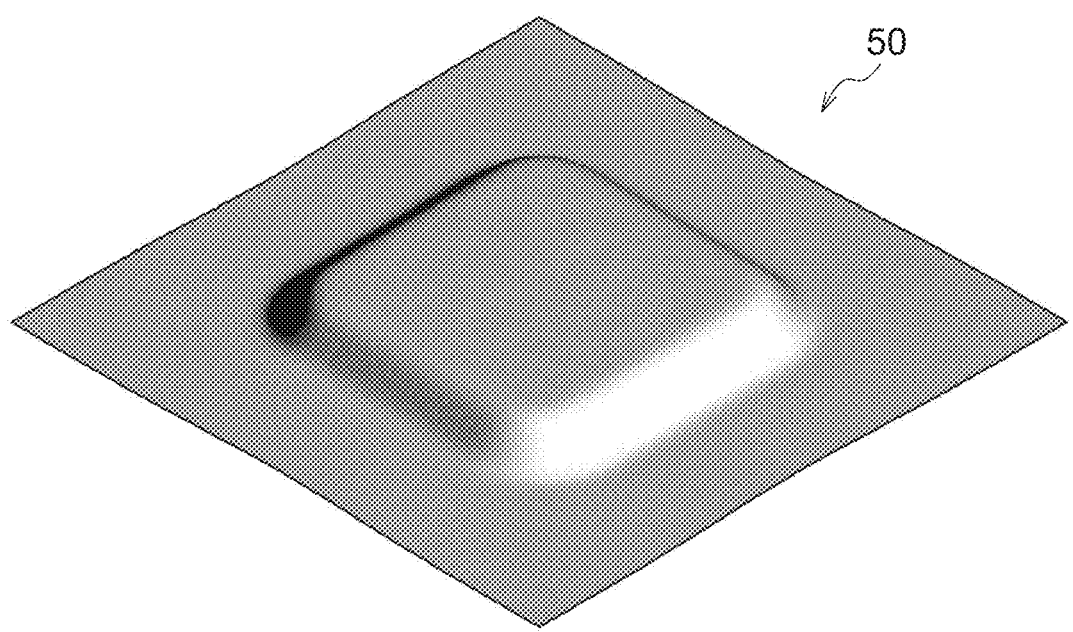
FIG. 16B is a perspective view illustrating a target shape when employing a material 2 in Example 1.

Moreover, in the present exemplary embodiment, the stock metal sheet may be formed into the intermediate shape 40 designed by the above procedure, followed by forming the intermediate shape 40 into a target shape 50, illustrated in FIG. 16B. A die for forming the metal sheet blank into the intermediate shape 40 may be designed with an upper die and a lower die using the intermediate shape 40 illustrated in FIG. 16A for the shape of the die faces. Alternatively, the upper die and the lower die may be designed using the intermediate shape 40 derived using the finite element model (J) having the stress distribution illustrated in FIG. 15A, FIG. 15B, and FIG. 15C as the shape of the die faces. Moreover, the die for forming the intermediate shape 40 into the target shape 50 may be designed with an upper die and a lower die using the target shape illustrated in FIG. 10A and FIG. 10B for the shape of the die faces.

Figure 36:
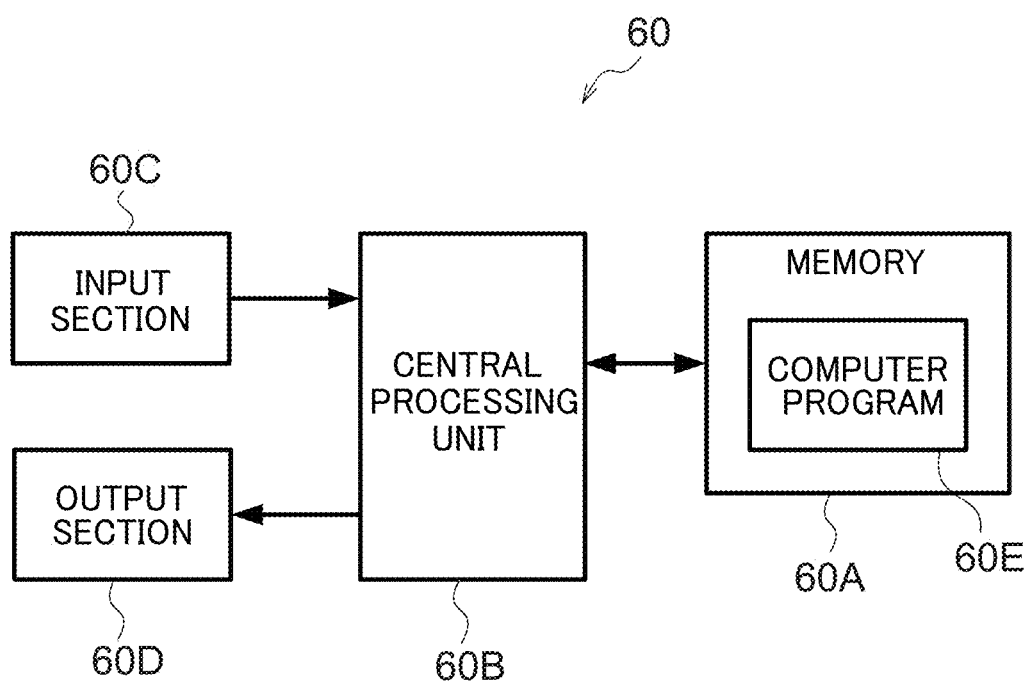
FIG. 36 is a block diagram illustrating a case in which an intermediate shape design device is configured by a computer system.

Moreover, the first step to the third step described above may be caused to be calculated on a computer system. Namely, the design equipment 60 illustrated in FIG. 35 may be configured by a computer system such as that illustrated in FIG. 36. As illustrated in FIG. 36, the design equipment 60 is configured by a computer system including memory 60A, a central processing unit 60B, an input section 60C, and an output section 60D. A computer program 60E for executing the flowcharts of FIG. 7 to FIG. 9 is stored in the memory 60A of the computer system. The program is read from the memory 60A into the central processing unit 60B, the element data (A) of the finite elements for the provisional metal sheet 24, the shape data for the target shape, and various physical values such as the Young's modulus, the Poisson ratio, the yield strength, the tensile strength of the metal sheet are input through the input section 60C, and calculations are executed in the central processing unit 60B. Data for an intermediate shape obtained as results of these calculations may be output to the output section 60D.

The computer program 60E for execution on the computer system may include step 2-2 described above and step 2-3 described above, may include step 2-1 described above, step 2-2 described above, and step 2-3 described above, or may include step 2-1 described above, step 2-2 described above, and step 2-3 described above as well as the third step described above. Alternatively, the computer program 60E may include only the third step described above. Alternatively, the computer program 60E may include step 2-1 described above and step 2-2 described above.

In the method of forming a metal sheet of the first exemplary embodiment, the element data (D) for the hypothetical metal sheet 25 prior to forming is computed from the element data (B) for the post-forming shaped metal sheet 26 and the element data (A) for the provisional metal sheet 24 by executing the first step to the third step. The element data (D) is derived through the calculation processes of the first step and the second step. The element data (D) has compressed differences in the element data between each of the finite elements compared to the element data (B) for the post-forming shaped metal sheet 26. This is due to performing elastic deformation analysis using a finite element method in which the stress (F1) required to deform each of the finite elements in the element data (A) for the provisional metal sheet 24 into each of the finite elements in the element data (B) for the post-forming shaped metal sheet 26 is applied to each of the finite elements in the element data for the provisional metal sheet 24, in a state applied with the condition of restraining displacement in out-of-plane directions of the nodes of each of the finite elements. An appropriate intermediate shape can then be designed by using the element data (D) to design the intermediate shape at the third step. Moreover, due to executing the first step to third step, the method of forming a metal sheet of the first exemplary embodiment enables an intermediate shape to be designed that is always appropriate without relying on the experience of the designer designing the intermediate shape. Moreover, since the metal sheet blank, is formed into the intermediate shape designed in this manner and then formed into the target shape, the maximum value of the ratio of sheet thickness reduction after forming can be made smaller, enabling cracking and fracturing to be suppressed. In particular, cracking and fracturing can be suppressed when processing a comparatively high strength sheet steel into the target shape.

Note that although the element data (D) for the hypothetical metal sheet 25 prior to forming obtained by performing the first step and the second step just once has compressed differences of the element data between each of the finite elements and a smaller maximum value of the ratio of sheet thickness reduction for the target shape compared to the element data (B) for each of the finite elements of the post-forming shaped metal sheet 26, there may, depending on the initial boundary conditions, be cases in which this compression is insufficient, leading to cracking and fracturing occurring in the target shape.

Figure 17A:
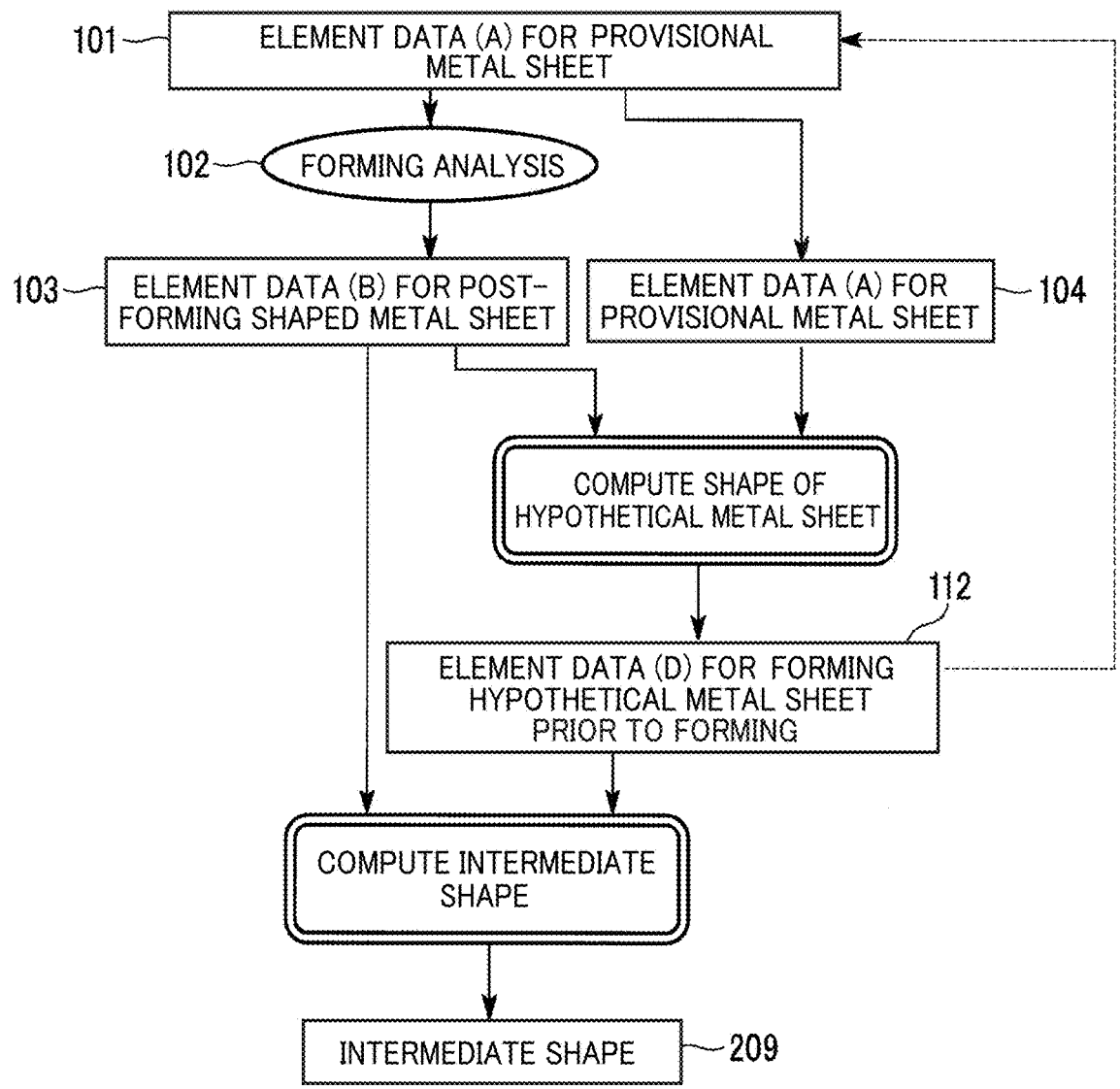
FIG. 17A is a flowchart to explain a modified example of a method of forming a metal sheet of the first exemplary embodiment.

Accordingly, as a modified example of the present exemplary embodiment, the first step to the second step, or the second step, may be performed repeatedly. Specifically, the following modified example may be adopted. As illustrated by the flowcharts in FIG. 17A and FIG. 17B, in a first modified example, the first step and the second step are performed repeatedly while substituting the element data (D) for the hypothetical metal sheet 25 prior to forming obtained at the second step in place of the element data (A) for the provisional metal sheet 24 prior to starting the first step. Moreover, as illustrated by the flowcharts in FIG. 18A and FIG. 18B, in a second modified example, the second step is performed repeatedly while substituting the element data (D) for the hypothetical metal sheet 25 prior to forming obtained at the second step in place of the element data (A) for the provisional metal sheet 24 prior to starting the second step.

The calculations can be made to converge by substituting the element data (D) for the hypothetical metal sheet 25 prior to forming obtained at the second step in place of the element data (A) for the provisional metal sheet 24 prior to starting the first step or prior to starting the second step in this manner and then repeating the subsequent steps. This enables differences in element data between each of the finite elements in the element data (D) for the hypothetical metal sheet 25 prior to forming to be greatly compressed, enabling cracking and fracturing in the target shape to be reliably prevented.

Determination as to whether or not to make the calculations converge as in the modified examples may made by deriving a state change amount (ΔX) between before and after forming for the topologically corresponding finite elements in the element data (D) for the hypothetical metal sheet 25 prior to forming and the element data (B) for the post-forming shaped metal sheet 26, setting a threshold value for the state change amount (ΔX), and determining whether or not the element data (D) is the threshold value of the state change amount (ΔX) or lower. For example, an upper limit threshold value, or an upper limit threshold value and a lower limit threshold value, may be set for the state change amount (ΔX) between before and after forming for each of the topologically corresponding finite elements in the element data (D) for the hypothetical metal sheet 25 prior to forming and the element data (B) for the post-forming shaped metal sheet 26. The converging calculation may then be performed by repeatedly performing the first step to the second step, or by performing the second step, until element data is obtained in which the maximum value of the state change amount (ΔX) is not more than the threshold value when an upper limit threshold value has been set for the state change amount (ΔX) alone, or until element data is obtained in which the maximum value and the minimum value of the state change amount (ΔX) lie in the range from the upper limit threshold value to the lower limit threshold value when both an upper limit and a lower limit threshold value have been set for the state change amount (ΔX).

The method of forming a metal sheet of the present exemplary embodiment is not limited to the product shape illustrated in FIG. 10A and FIG. 10B, and the present exemplary embodiment is applicable to forming various product shapes. For example, application may also be made to a product shape such as that illustrated in FIG. 19A and FIG. 19B. Explanation follows regarding an example of application to the product shape illustrated in FIG. 19A and FIG. 19B.

Figure 19A:
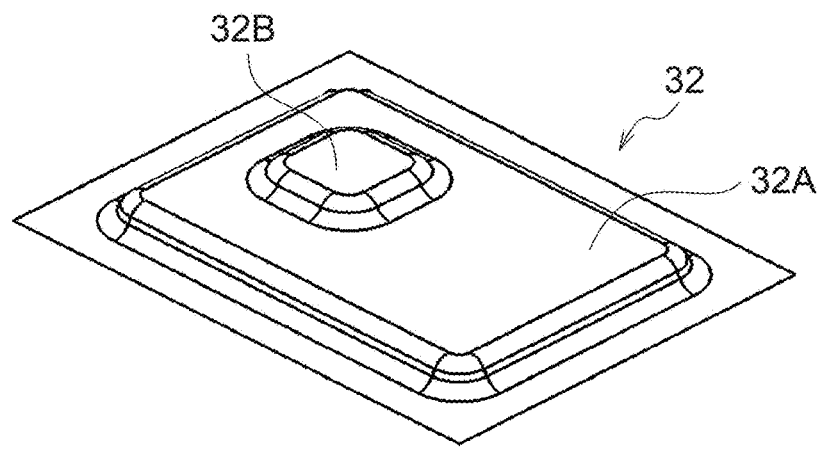
FIG. 19A is a perspective view illustrating a product shape corresponding to a third exemplary embodiment and Example 5, and Comparative Example 3.
Figure 19B:
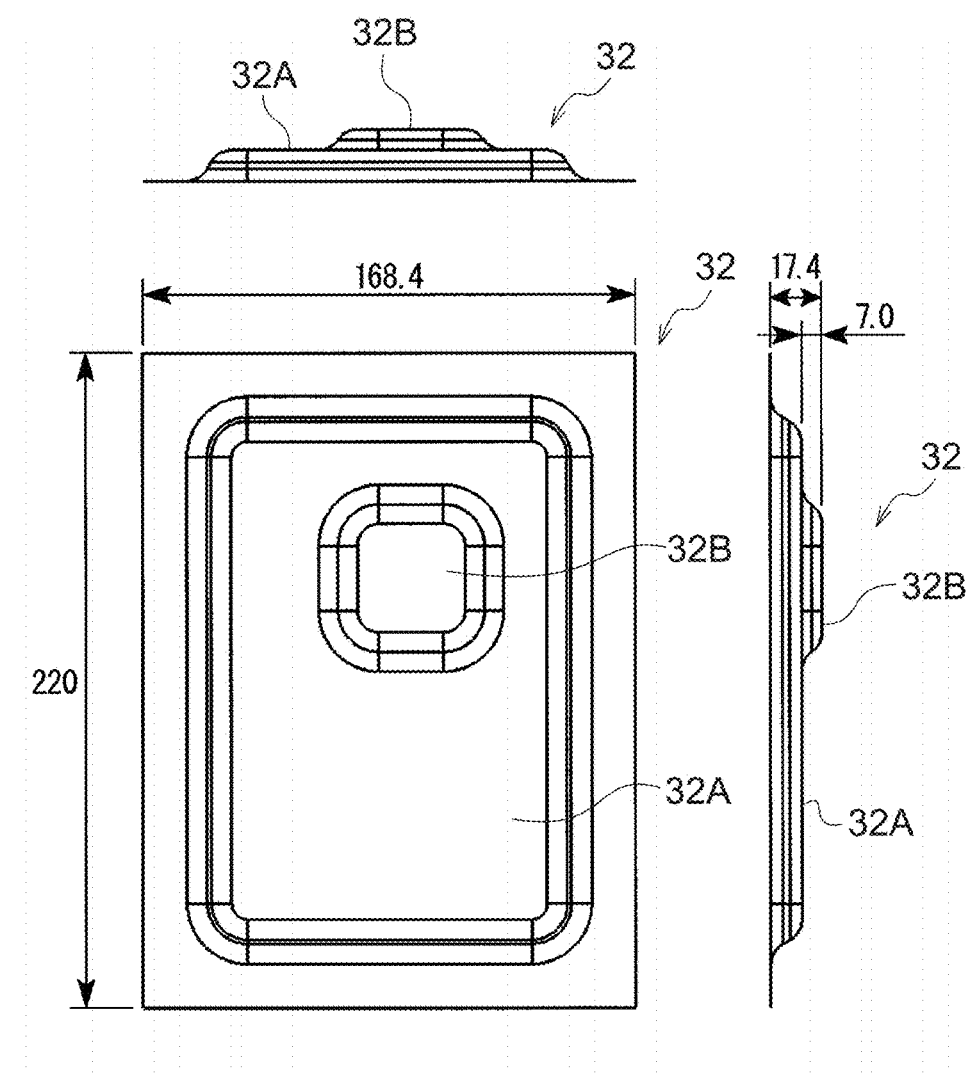
FIG. 19B is a three elevation diagram illustrating a product shape corresponding to the third exemplary embodiment and Example 5, and Comparative Example 3 in three planes.

FIG. 19A is a perspective view illustrating another desired final product shape 32, and FIG. 19B illustrates a three elevation diagram of the product shape 32. The product shape 32 illustrated in FIG. 19A and FIG. 19B has a rectangular outer shape with a length of 220 mm and a width of 168.4 mm, and has a two-stage bulging portion with a height of 17.4 mm. The bulging portion includes a first protrusion 32A at a first level of a height of 10.4 mm, and a second protrusion 32B at a second level of a height of 7.0 mm, the second protrusion 32B being formed above the first protrusion 32A and smaller than the first protrusion 32A. Inclined portions of each protrusion are set so as to have a radius of curvature R of 10 mm.

The shape of the provisional metal sheet 24 is a slightly larger shape than the minimum stock metal sheet shape required to form the product shape 32. Specifically, as illustrated in plan view in FIG. 20, the shape of the provisional metal sheet 24 is a rectangular shape with a length of 243 mm and a width of 189 mm. The thickness of the provisional metal sheet 24 is 1.2 mm.

Figure 20:
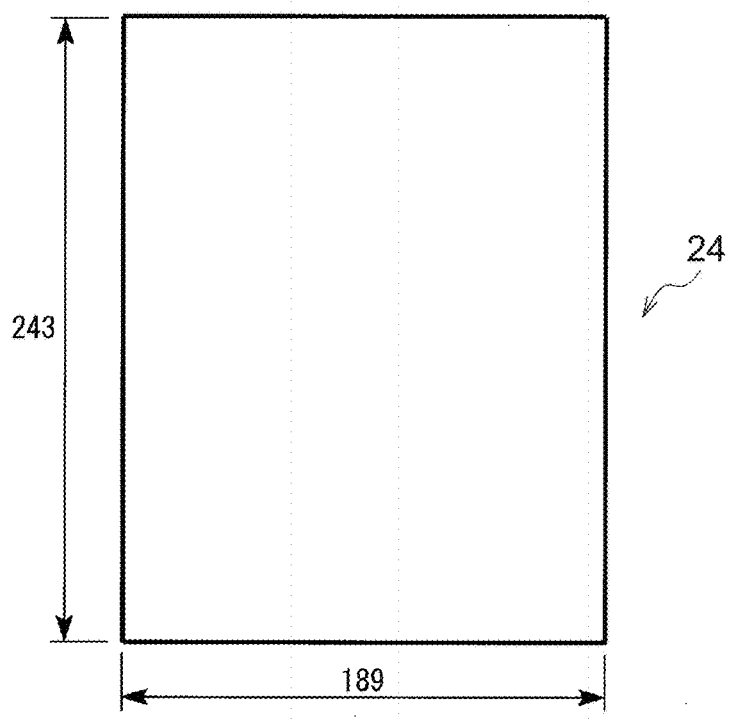
FIG. 20 is a schematic plan view illustrating a shape of a provisional metal sheet corresponding to the third exemplary embodiment and Example 5.
Figure 21:
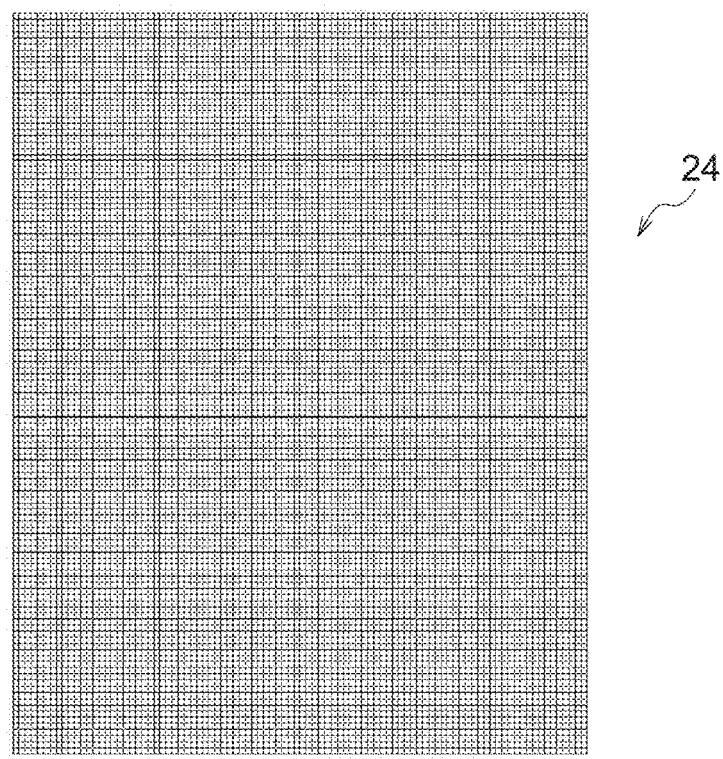
FIG. 21 is a diagram illustrating element data (A) for a provisional metal sheet corresponding to the third exemplary embodiment and Example 5.
Figure 22:
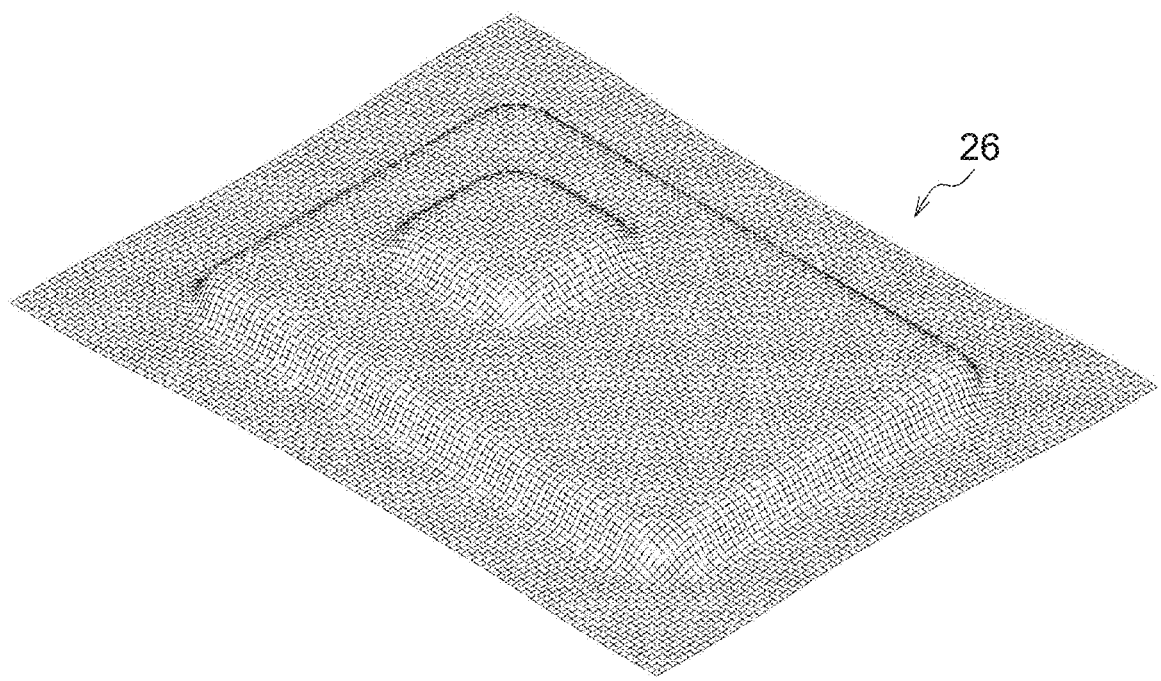
FIG. 22 is a diagram illustrating element data (B) for a post-forming shaped metal sheet corresponding to the third exemplary embodiment and Example 5.

FIG. 21 illustrates a model in which the provisional metal sheet 24 illustrated in FIG. 20 has been divided into plural finite elements. This corresponds to the element data (A) for the provisional metal sheet 24 at 101 in FIG. 7. Although the shape of the finite elements is a square shape, there is no limitation to being a square shape, and a different shape may be employed therefor. Based on the element data (A) for the provisional metal sheet 24 illustrated in FIG. 21, a target shape is derived by performing elasto-plastic forming analysis using a finite element method for when formed in a die having a shape in which the outer peripheral portion of the product profile 32 has been extended, and the element data (B) for the post-forming shaped metal sheet 26 is derived. Forming analysis is performed with the provisional metal sheet 24 modeled as an elastic body. The derived element data (B) for the post-forming shaped metal sheet 26 is illustrated in FIG. 22. This corresponds to the element data (B) for the post-forming shaped metal sheet 26 at 103 in FIG. 8. The element data (B) for the post-forming shaped metal sheet 26 illustrated in FIG. 22 has a slightly larger outer peripheral portion than the product shape 32 illustrated in FIG. 19A and FIG. 19B, and the product shape can be obtained by trimming the shape after forming.

Next, similarly to at 105 in FIG. 8, the stress (F1) to be applied to each of the finite elements of the provisional metal sheet 24 is derived with the provisional metal sheet modeled as an elastic body, the stress (F1) being the stress required to elastically deform each element in the element data (A) for the provisional metal sheet 24 into the shape of each of the topologically corresponding elements in the element data (B) for the post-forming shaped metal sheet 26.

Figure 23A:
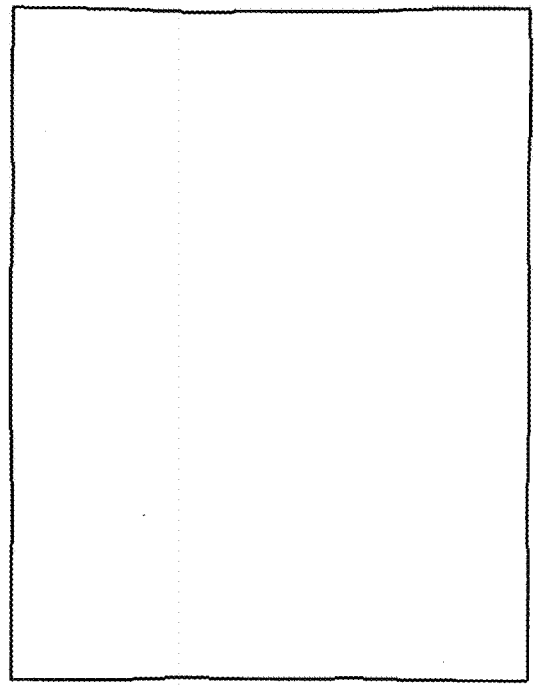
FIG. 23A is a schematic plan view illustrating a shape of a hypothetical metal sheet prior to forming corresponding to the third exemplary embodiment and Example 5.
Figure 23B:
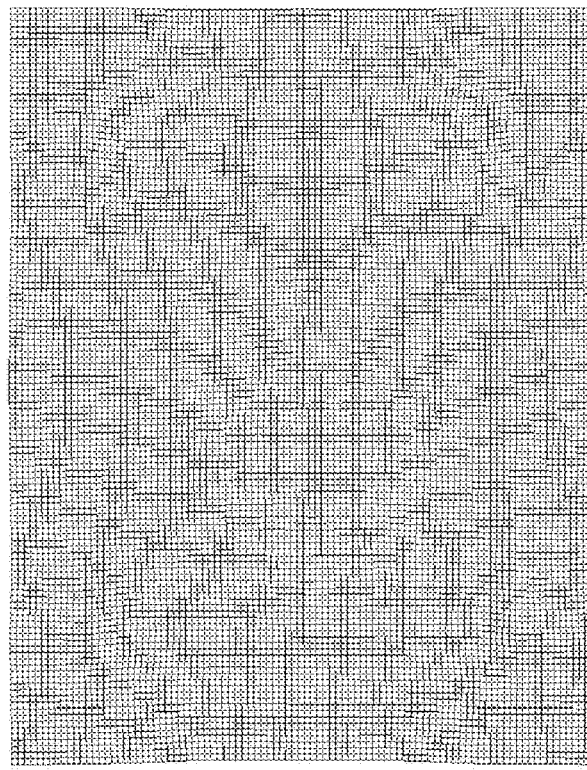
FIG. 23B is a diagram illustrating element data (D) for a hypothetical metal sheet prior to forming corresponding to the third exemplary embodiment and Example 5.

Next, similarly to at 107 in FIG. 8, the finite element model (I) is obtained (at 108) by either applying the stress (F1) to each of the finite elements of the provisional metal sheet 24, or applying stress (F2) having an absolute value of more than 1.0 times but no more than 1.5 times the corresponding stress (F1) to each of the finite elements of the provisional metal sheet 24, under application of a condition restraining displacement in out-of-plane directions of nodes of each of the finite elements (the out-of-plane restraint condition). Elastic deformation analysis using a finite element method is then performed based on the finite element model (I), similarly to at 109 in FIG. 8. The post-elastic-deformation element data (H) is derived as a result (at 110). Next, the shape of each of the finite elements in the element data (A) for the provisional metal sheet 24 is corrected (at 111) so as to become the shape of each of the finite elements in the post-elastic-deformation finite element data (H). The corrected finite element data is adopted as the element data (D) for the hypothetical metal sheet prior to forming (at 112). In the present exemplary embodiment, a shape and element data (D) for the hypothetical metal sheet 25 are obtained such as those illustrated in FIG. 23A and FIG. 23B.

The reason the post-elastic-deformation element data (H) is not employed as-is as the element data (D) for the hypothetical metal sheet 25 prior to forming is because parameters for the post-elastic-deformation element data (H) such as elastic sheet thickness and stress are changed from the state prior to forming through the steps at 105 to 109 in FIG. 8, but in contrast thereto, although the shape of each of the elements for the element data (D) for the hypothetical metal sheet 25 is the same as in the post-elastic-deformation element data (H), other parameters such as sheet thickness and stress are the same as in the element data (A) for the provisional metal sheet 24 in the state prior to forming, and are accordingly different from those in the post-elastic-deformation element data (H).

Figure 24:
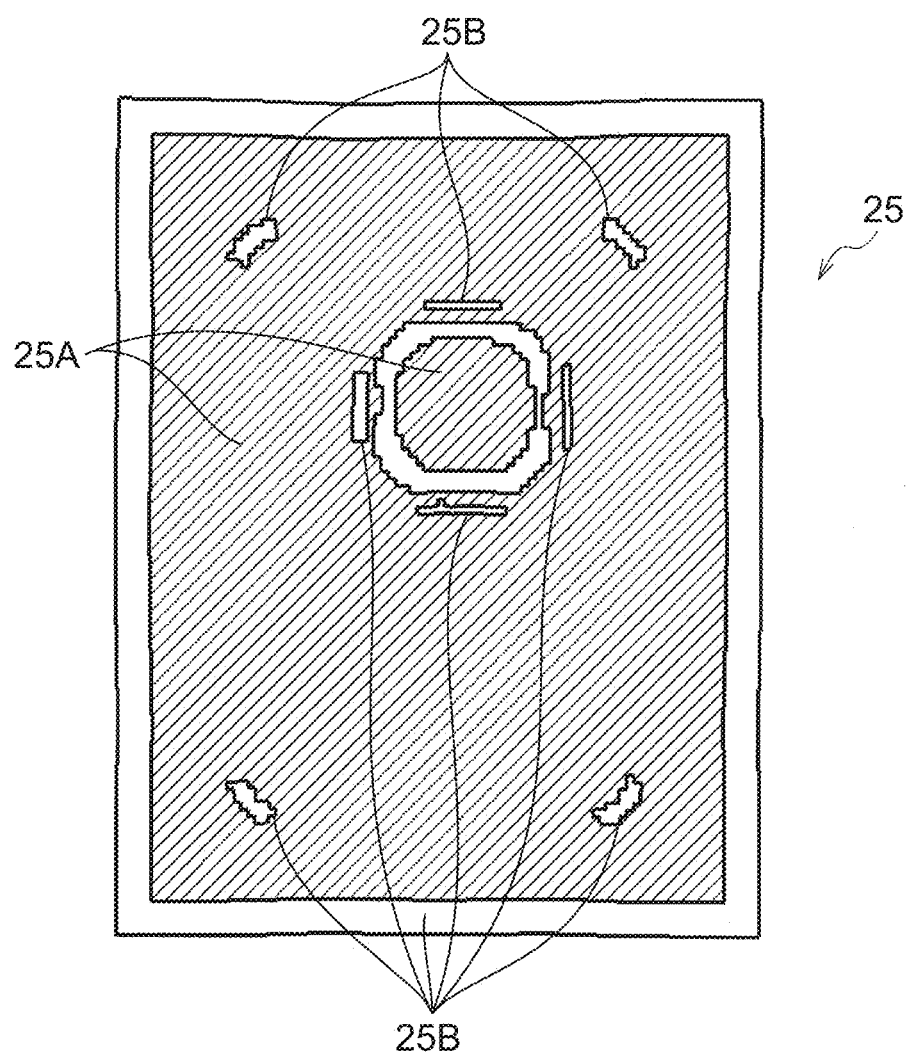
FIG. 24 is a plan view illustrating regions where stress is applied to a hypothetical metal sheet prior to forming corresponding to the third exemplary embodiment and Example 5.

Next, similarly to at 203 in FIG. 9, the stress (F3) required to elastically deform the hypothetical metal sheet 25 prior to forming to the target shape is derived for each of the finite elements with the hypothetical metal sheet 25 modeled as an elastic body. Next, similarly to at 205 in FIG. 9, the finite element model (J) (at 206) is built by applying the stress (F3) to some of the finite elements of the hypothetical metal sheet 25 prior to forming, and either applying stress smaller than the stress (F3) to the remaining finite elements stress, or applying no stress thereto. In FIG. 24, regions from out of the hypothetical metal sheet 25 prior to forming that are applied with the stress (F3) are illustrated by diagonal line portions 25A, and regions not applied with stress are illustrated by blank portions 25B.

In this example, the regions applied with the stress (F3) are selected by a comparison of the ratio of sheet thickness reduction arising when each of the elements in the element data (A) for the provisional metal sheet 24 is deformed into the corresponding element in the element data (B) for the post-forming shaped metal sheet 26 against the strain and the ratio of sheet thickness reduction arising when each of the elements in the element data (D) for the hypothetical metal sheet 25 is deformed into the corresponding element in the element data (B) for the post-forming shaped metal sheet 26. Regions of elements not in the outer peripheral portion of the hypothetical metal sheet 25 are then selected for which the strain and the ratio of sheet thickness reduction is significantly larger in the latter case. The reason the stress (F3) is not applied to the outer peripheral portion of the hypothetical metal sheet 25 is to avoid complicating the shape of the outer peripheral portion of the intermediate shape, and so as to facilitate design and manufacture of a die used to form the actual intermediate shape.

Figure 25:
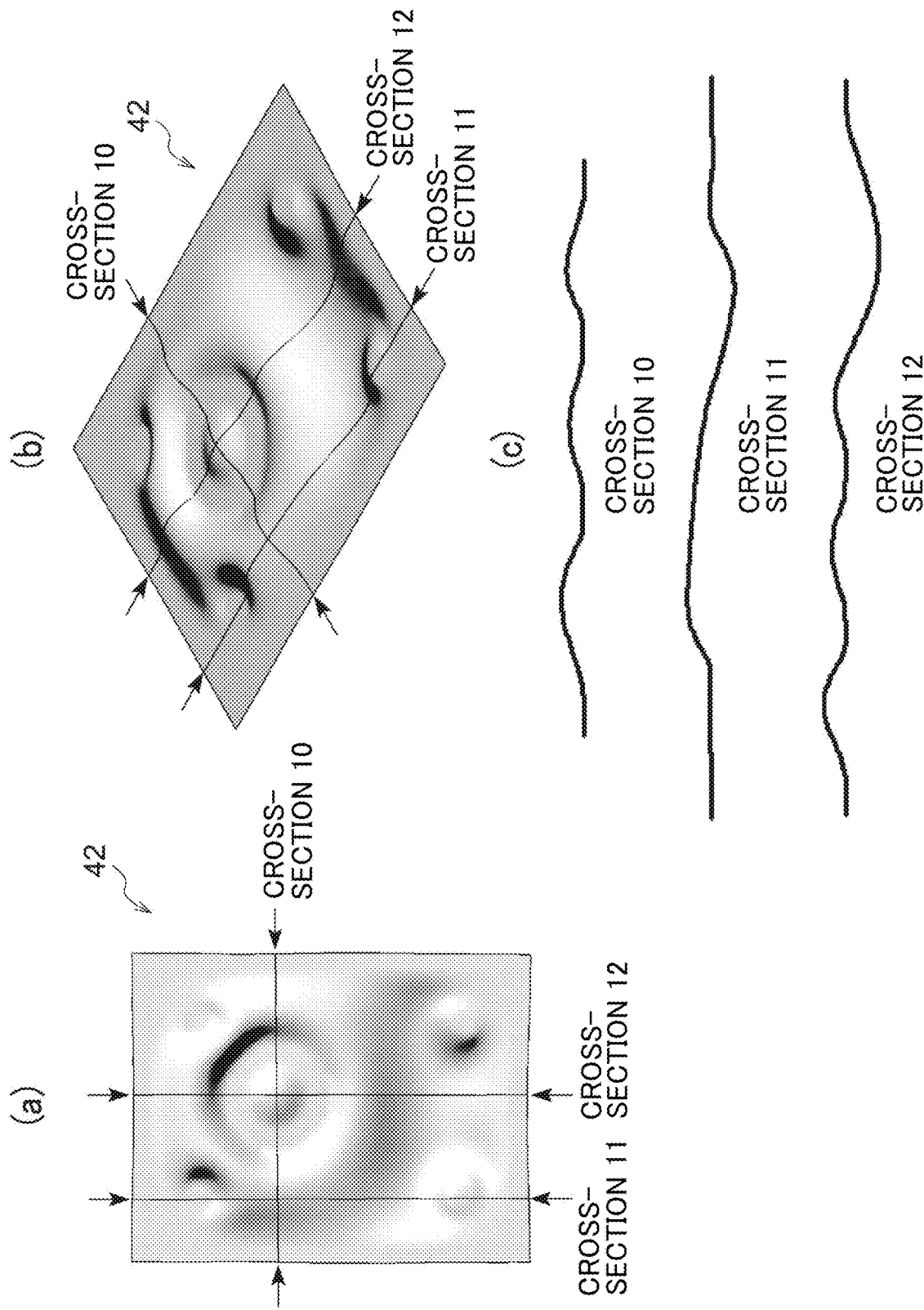
FIG. 25 is a diagram illustrating a metal sheet with an intermediate shape corresponding to the third exemplary embodiment and Example 5: (a) is a plan view, (b) is a perspective view, and (c) illustrates cross-sections 10 to 12 of (a) and (b).

Next, similarly to at 207 in FIG. 9, elastic deformation analysis is performed on the finite element model (J) using a finite element method. This elastic deformation analysis is performed here with the finite element model (J) modeled as an elastic body. The shape of the element data (G) obtained by this elastic deformation analysis is adopted as the intermediate shape (at 208, 209). FIG. 25 illustrates an intermediate shape 42 of the present example.

Figure 26:
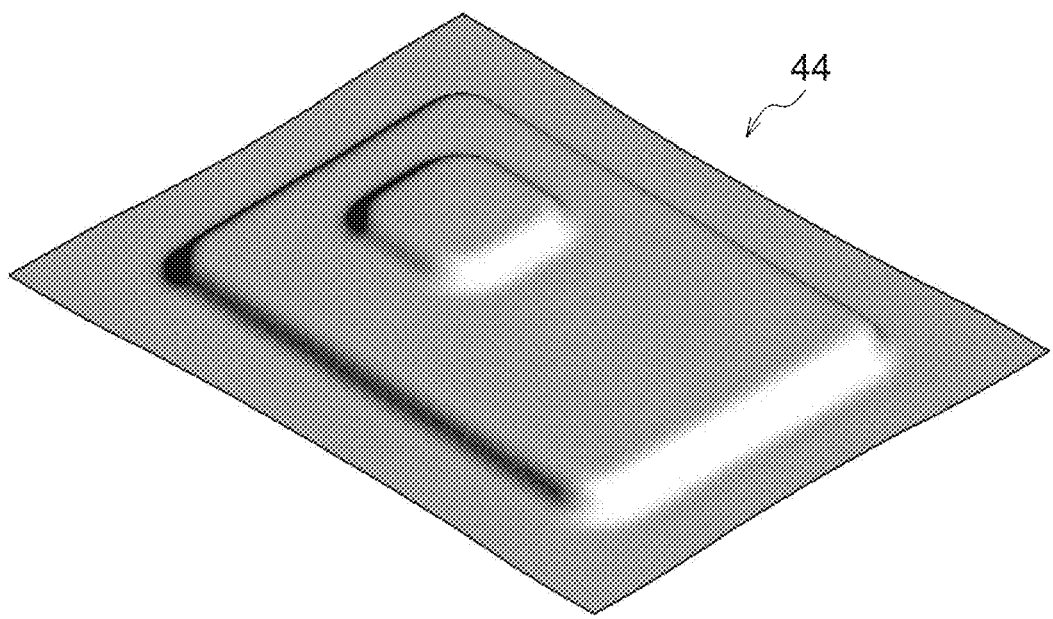
FIG. 26 is a perspective view illustrating a shape post-forming employing a material 2 in Example 5.

The metal sheet blank may then be formed into the intermediate shape designed by the above procedure, followed by forming the intermediate shape into the final target shape. A die for forming the metal sheet blank into the intermediate shape may be designed with an upper die and a lower die employing the intermediate shape 42 illustrated in FIG. 25 for the shape of the die faces. FIG. 26 illustrates a perspective view of a metal sheet 44 formed into the target shape. A die for forming the intermediate shape into the final target shape may be designed with an upper die and a lower die employing the target shape illustrated in FIG. 19A and FIG. 19B for the shape of the die faces.

Moreover, in the present example, a computer program may be prepared that includes an algorithm represented by the flowcharts in FIG. 7 to FIG. 9, and the intermediate shape designed by executing this computer program on a computer system. Moreover, the first step to the second step, or the second step, may be performed repeatedly while substituting the element data (D) for the hypothetical metal sheet 25 prior to forming for the element data (A) for the provisional metal sheet 24.

Second Exemplary Embodiment

Explanation follows regarding a second exemplary embodiment.

Although in the first exemplary embodiment explanation has been given regarding an example in which a metal sheet blank is formed into the intermediate shape, and the intermediate shape is then formed into the target shape, the present invention is not limited to a single intermediate shape, and a blank may be formed into a target shape via plural intermediate shapes. In the second exemplary embodiment, explanation will be given regarding a case in which the metal sheet blank is formed into a first intermediate shape, the first intermediate shape is formed into a second intermediate shape, and the second intermediate shape is formed into the target shape. Note that in the present exemplary embodiment, the shape and element data of a provisional metal sheet and a post-forming shaped metal sheet that form the basis for designing the intermediate shapes are similar to those of the first exemplary embodiment.

Even when an intermediate shape has been designed using the intermediate shape design method described in the first exemplary embodiment with the objective of forming the provisional metal sheet into the final target shape as described in the first exemplary embodiment, when the metal sheet has a comparatively high strength or low extension ratio, sometimes necking or cracking still occurs at the stage of forming the blank into the intermediate shape even though convergence calculations such as those described with reference to FIG. 17A, FIG. 17B, FIG. 18A, and FIG. 18B have been performed repeatedly. In such cases separate design needs to be performed to design an intermediate shape with which to form the intermediate shape obtained as a result of the initial calculations.

More specifically, first, similarly to in the first exemplary embodiment, an intermediate shape required to form the provisional metal sheet into the final target shape is designed. Next, the obtained intermediate shape is employed to substitute for the final target shape and new design is performed in a manner similar to that of the first exemplary embodiment to design an intermediate shape required to form the previously obtained intermediate shape.

Figure 29:
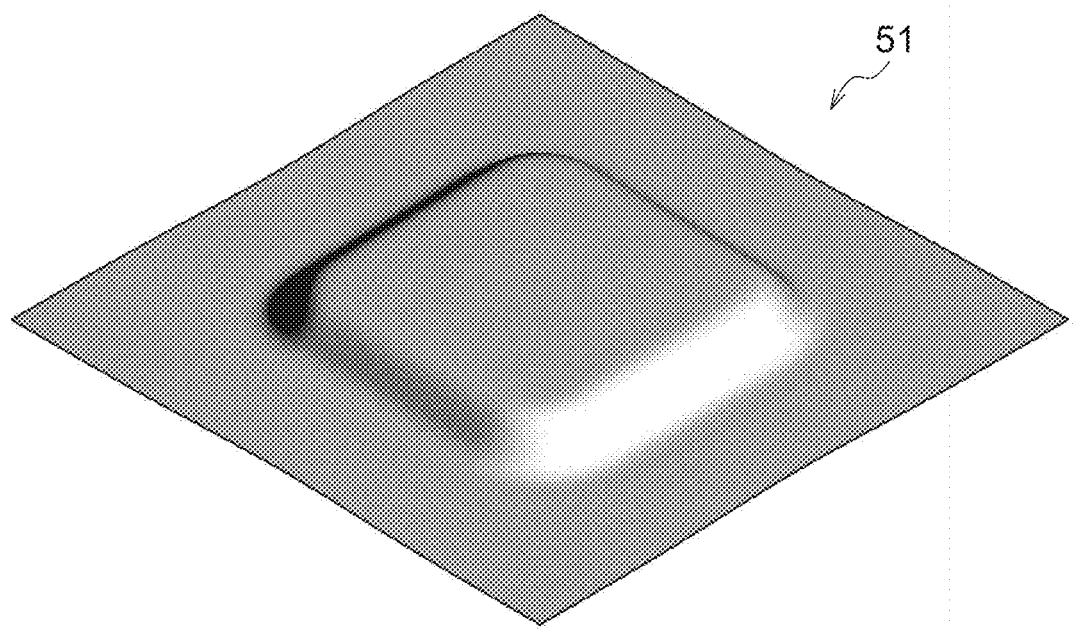
FIG. 29 is a perspective view illustrating a shape post-forming in a case in which a material 2 has been formed in Example 4.

FIG. 27 illustrates a first intermediate shape 46 of the present exemplary embodiment. FIG. 28 illustrates a second intermediate shape 48. FIG. 29 illustrates a metal sheet formed into a target shape 51. The first intermediate shape 46 illustrated in FIG. 27 is an intermediate shape obtained as a result of applying the intermediate shape design method described in the first exemplary embodiment while employing the second intermediate shape 48 of FIG. 28 as the target shape. The second intermediate shape 48 illustrated in FIG. 28 is an intermediate shape designed using a similar method to the intermediate shape design method described in the first exemplary embodiment.

Thus in order to obtain plural intermediate shapes, the method of forming a metal sheet of the present exemplary embodiment accordingly designs an intermediate shape using the design method described in the first exemplary embodiment, then employs the designed intermediate shape substituted in place of the target shape, and, by using the same process as in the intermediate shape design method described in the first exemplary embodiment, designs an intermediate shape to be employed to obtain the initially designed intermediate shape. The present exemplary embodiment accordingly enables appropriate intermediate shapes to be designed by substituting the designed intermediate shape in place of the target shape and performing the first step to the third step in cases in which the metal sheet blank is formed into the target shape via plural intermediate shapes.

The present invention is, however, not limited to the above exemplary embodiment, and the target shape may be obtained via three or more intermediate shapes. In such cases, the method of the present invention may be implemented to design all of the intermediate shapes, or the method of the present invention may be implemented to design only some of the intermediate shapes.

EXAMPLES

Explanation follows regarding examples of the present invention.

Comparative Example 1

Figure 30:
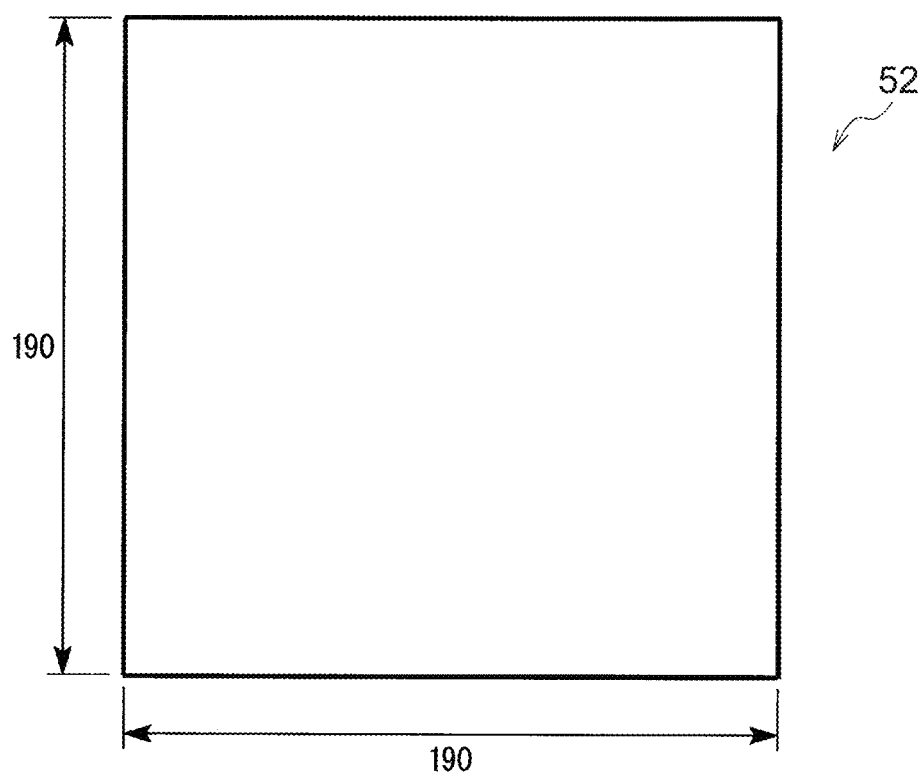
FIG. 30 is a schematic plan view illustrating a stock metal sheet of Comparative Example 1.
Figure 31:
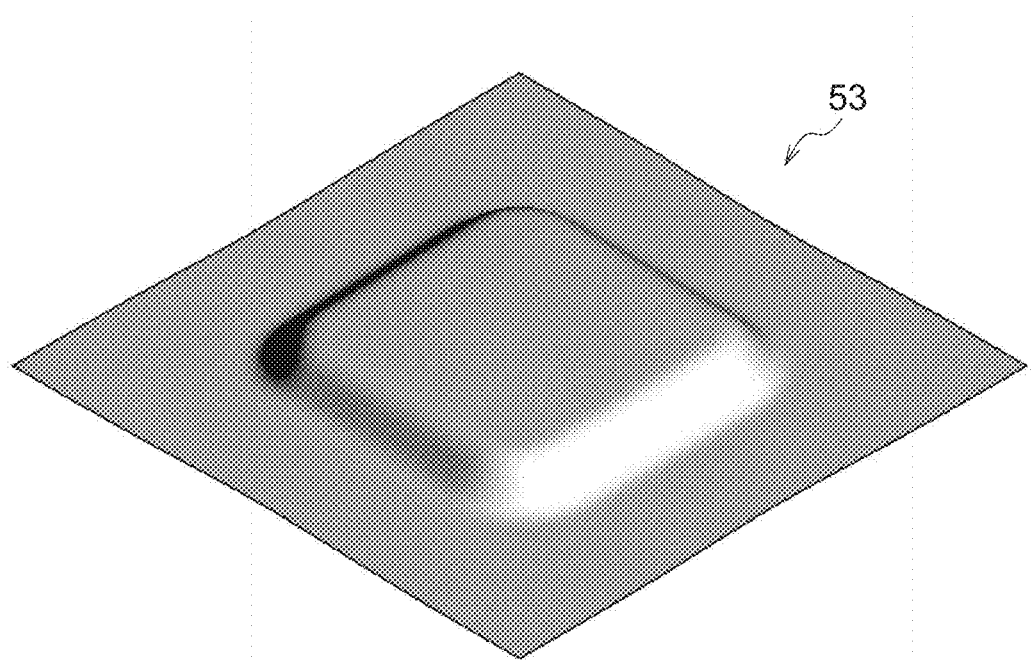
FIG. 31 is a perspective view illustrating a target shape formed using a material 1 in Comparative Example 1.

A formed article of a target shape was manufactured by press-forming (drawing) a metal sheet 52 having the shape illustrated in FIG. 30, rather than via an intermediate shape. More precisely, an outer edge portion of a metal sheet was restrained by a die and a blank holder, and drawing was performed by pushing in a punch. Four types of sheet steel, having the sheet thicknesses, tensile strengths, and elongations (EL) listed in Table 1, were employed as the metal sheet. The presence or absence of cracking and crease marks in the formed article were checked by visual inspection after forming. The results thereof are listed in Table 2. FIG. 31 illustrates a target shape 53 formed when using a material 1. As illustrated in Table 2, for Comparative Example 1, although forming could be performed without cracking or crease marks when using the material 1 having low strength and good extensibility, cracking occurred when using the material 2 to a material 4, these being configured from high strength sheet steel having a tensile strength in excess of 1000 MPa.

Example 1

Based on the shapes of the product shape 30 illustrated in FIG. 10A and FIG. 10B and the provisional metal sheet 24 illustrated in FIG. 11A, the shape of the hypothetical metal sheet 25 prior to forming and an intermediate shape were derived by using the procedure explained in the first exemplary embodiment. Then after forming the four types of sheet steel having the shape of the hypothetical metal sheet 25 prior to forming and the sheet thicknesses, tensile strengths, and elongations (EL) listed in Table 1 into the intermediate shape, the target shape was then formed. FIG. 16B illustrates a target shape when formed from steel of a material 2 in the shape of the hypothetical metal sheet 25. The shape of the hypothetical metal sheet 25 prior to forming and the intermediate shape were derived according to the flowcharts of FIG. 7, FIG. 8, and FIG. 9. First, the element data (B) for the post-forming shaped metal sheet 26 illustrated in FIG. 12 was derived using forming analysis from the element data (A) for the provisional metal sheet 24 illustrated in FIG. 11B, this being the shape of the provisional metal sheet 24 illustrated in FIG. 11A divided into elements in a finite element method. Moreover, the shape and the element data (D) for the hypothetical metal sheet 25 illustrated in FIG. 13A and FIG. 13B were derived from the element data (A) for the provisional metal sheet 24 and the element data (B) for the post-forming shaped metal sheet 26. When this was performed, the stress applied to the element data (A) for the provisional metal sheet at step 107 in FIG. 8 was set as a stress of 1.0 times the stress (F1) derived at step 106.

Next, an intermediate shape was derived from the element data (B) for the post-forming shaped metal sheet 26 and the element data (D) for the hypothetical metal sheet 25. When this was performed, at step 205 in FIG. 9, the finite element model (J) was built by applying no stress to finite elements that were not the finite elements applied with the stress (F3) in the element data (D) for the hypothetical metal sheet 25 prior to forming. The regions applied with the stress (F3) are the regions indicated by the diagonal line portions 25A in FIG. 14A, and the region not applied with stress is the region indicated by the blank portion 25B in FIG. 14A. The stress distribution at this stage is illustrated by the solid lines in the graphs of FIG. 14B and FIG. 14C. Note that the dashed lines in the graphs in FIG. 14B and FIG. 14C illustrate the distribution of the stress (F3) for the region where stress is not actually applied. The built finite element model (J) was then employed for elastic deformation analysis to derive the intermediate shape. The intermediate shape is the intermediate shape 40 illustrated in FIG. 16A.

The metal sheet 52 illustrated in FIG. 30 was then formed into the intermediate shape, followed by an attempt to form the shape illustrated in FIG. 16B. The formed article after forming was visually inspected for the presence or absence of cracking or crease marks. The results thereof are listed in Table 2. As illustrated in Table 2, crease marks occurred but cracking did not occur when the material 1 and the material 2 were employed in Example 1. However, although cracking did not occur, necking occurred when employing a material 3, and cracking occurred when employing the material 4. The regions where necking occurred with the material 3 and the regions where cracking occurred with the material 4 are all corner portions of the substantially truncated square pyramid shaped bulging portion at the center of the target shape.

When employing the material 2, which has higher strength and lower extensibility than the material 1, although cracking occurred in Comparative Example 1, forming could be performed in Example 1 of the present invention without cracking occurring. Note that the crease marks that occurred with the material 1 and the material 2 were generated at the boundaries between the regions applied with the stress (F3) and the non-applied region. This was caused by the sudden change in stress at the boundaries between the regions applied with the stress (F3) and the non-applied region.

Example 2

Similarly to in Example 1, based on the shapes of the product shape 30 illustrated in FIG. 10A and FIG. 10B and the provisional metal sheet 24 illustrated in FIG. 11A, the shape of the hypothetical metal sheet 25 prior to forming and an intermediate shape were derived by using the procedure explained in the first exemplary embodiment. Then after forming the four types of sheet steel having the shape of the hypothetical metal sheet 25 prior to forming and the sheet thicknesses, tensile strengths, and elongations (EL) listed in Table 1 into the intermediate shape, the target shape was then formed. The shape of the hypothetical metal sheet 25 prior to forming and the intermediate shape were derived according to the flowcharts of FIG. 17A, FIG. 17B, and FIG. 9.

Figure 32:
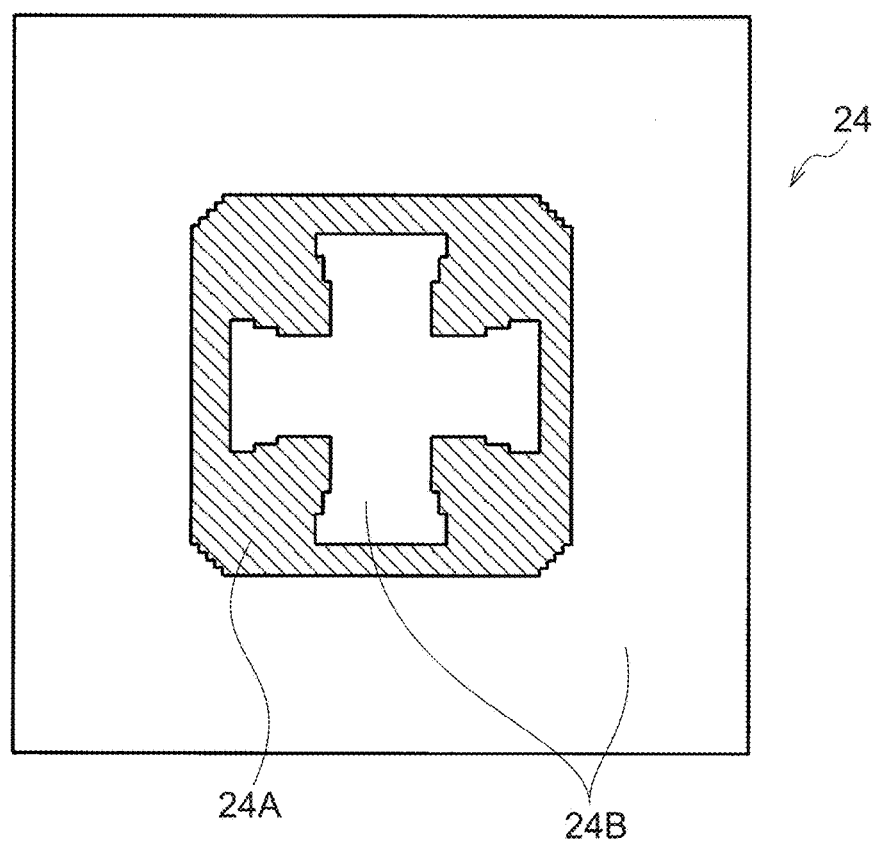
FIG. 32 is a plan view illustrating regions applied with stress in a provisional metal sheet corresponding to Example 2 and Comparative Example 2.

There are two differences between Example 2 and Example 1. The first difference relates to the stress applied to the element data (A) for the provisional metal sheet 24 (step 107 in FIG. 17B) when deriving the shape and the element data (D) for the hypothetical metal sheet 25 from the element data (A) for the provisional metal sheet 24 and the element data (B) for the post-forming shaped metal sheet 26. In Example 1, the stress applied to the element data (A) for the provisional metal sheet 24 was set to a stress of 1.0 times the stress (F1), whereas in Example 2, the stress was set to a stress of 1.0 times the stress (F1) for some portions, and the stress was set to 1.2 times the stress (F1) for the remaining portions. Specifically, stress of 1.0 times the stress (F1) was applied to blank portions 24B of the provisional metal sheet 24 in FIG. 32, and stress of 1.2 times the stress (F1) was applied to a diagonal line portion 24A. Note that the regions in which necking occurred when forming the material 3 in Example 1 were corner portions of the substantially truncated square pyramid shaped bulging portion at the center of the target shape, and regions in the element data for the provisional metal sheet 24 corresponding to these regions were contained within the regions applied with stress of 1.2 times the stress (F1).

Figure 17B:
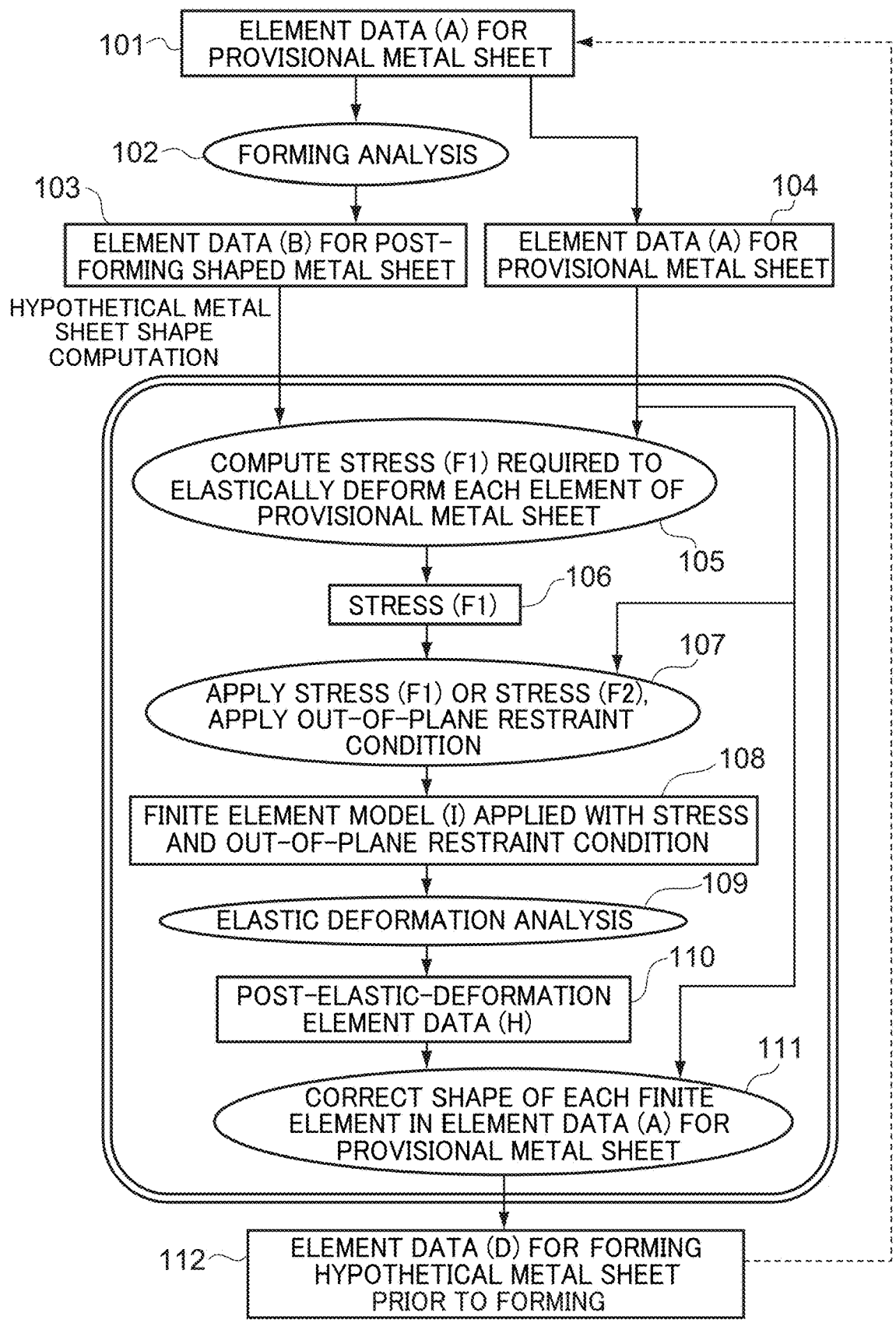
FIG. 17B is a flowchart illustrating greater detail for the flowchart of FIG. 17A.
Figure 18B:
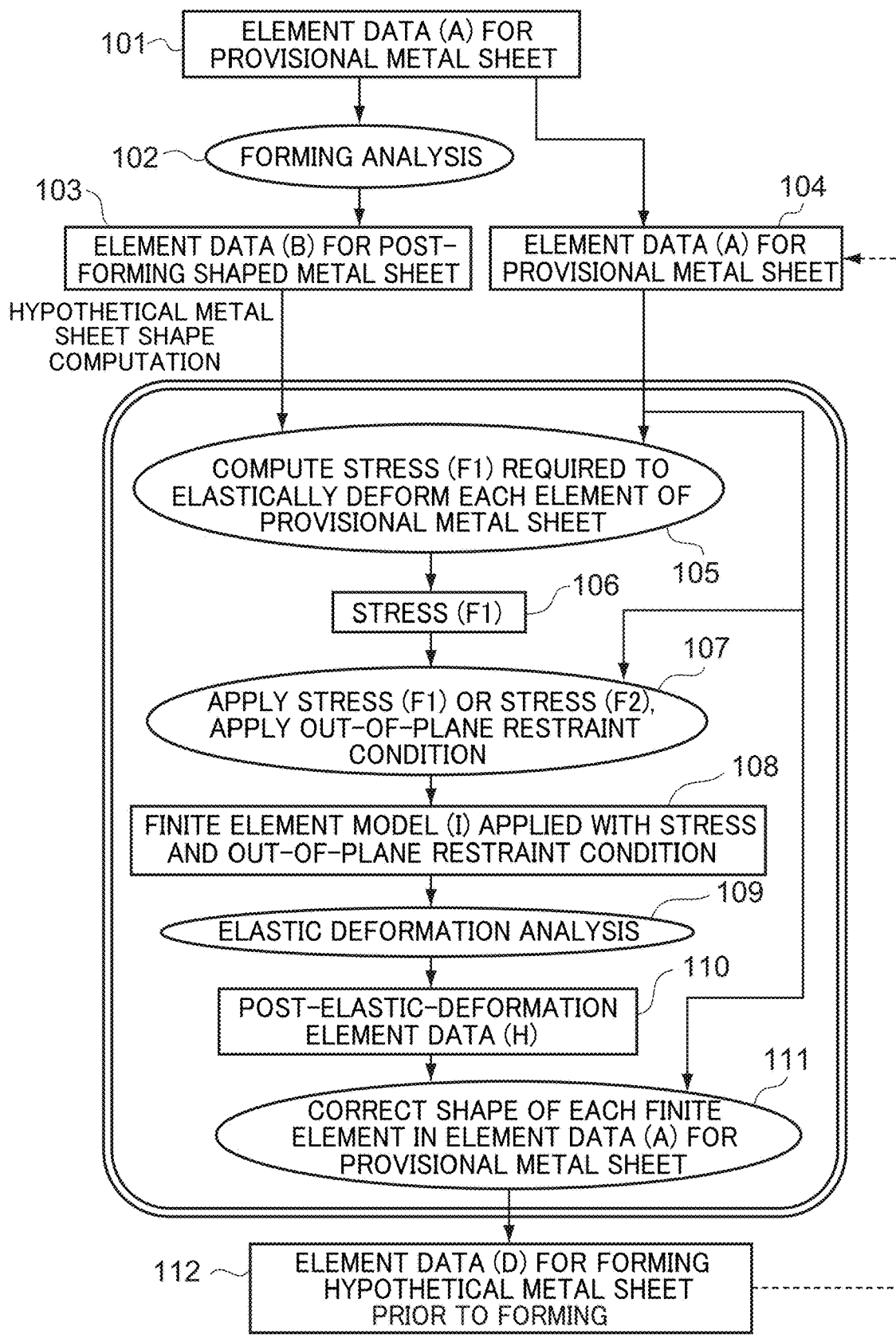
FIG. 18B is a flowchart illustrating greater detail for the flowchart of FIG. 18A.

The second difference is that after deriving the element data (D) for the hypothetical metal sheet 25 prior to forming as in the flowchart of FIG. 17B, derivation of the element data (D) for the hypothetical metal sheet was repeated two more times while replacing the element data (A) for the provisional metal sheet 24 with the element data (D) for the hypothetical metal sheet 25.

The formed article after forming was visually inspected for the presence or absence of cracking or crease marks. The results thereof are listed in Table 2. As illustrated in Table 2, although crease marks occurred, cracking did not occur when employing the material 1 to the material 3 in Example 2. However, cracking occurred when employing the material 4. Although necking occurred when employing the material 3 in Example 1, forming could be performed without the occurrence of cracking or necking when employing the material 3 in Example 2. This is due to setting a larger stress to be applied to the element data (A) for the provisional metal sheet 24 than in Example 1 when deriving the shape and the element data (D) for the hypothetical metal sheet 25 at locations where there is a large reduction in sheet thickness during forming (the regions where necking occurred), and due to re-deriving the element data (D) for the hypothetical metal sheet 25 two more times so as to further optimize the element data (D) for the hypothetical metal sheet 25.

Comparative Example 2

Similarly to in Example 2, based on the shapes of the product shape illustrated in FIG. 10A and FIG. 10B and the provisional metal sheet 24 illustrated in FIG. 11A, the shapes of the hypothetical metal sheet 25 prior to forming and an intermediate shape were derived by using the procedure explained in the first exemplary embodiment. Then after forming the four types of sheet steel having the shape of the hypothetical metal sheet 25 prior to forming and the sheet thicknesses, tensile strengths, and elongations (EL) listed in Table 1 into the intermediate shape, the target shape was then formed.

The shape of the hypothetical metal sheet 25 prior to forming and the intermediate shape were derived according to the flowcharts of FIG. 17A, FIG. 17B, and FIG. 9. After deriving the element data (D) for the hypothetical metal sheet 25 prior to forming following the flowchart of FIG. 17A, derivation of the element data (D) for the hypothetical metal sheet 25 was repeated two more times while replacing the element data (A) for the provisional metal sheet 24 with the element data (D) for the hypothetical metal sheet 25. The obtained shape and element data (D) for the hypothetical metal sheet 25 were a shape and data slightly different from the shape and element data illustrated in FIG. 13A and FIG. 13B due to these two repetitions.

The difference between Example 3 and Example 2 is in the stress applied to the element data (A) for the provisional metal sheet 24 (step 107 in FIG. 17B) when deriving the shape and the element data (D) for the hypothetical metal sheet 25 from the element data (A) for the provisional metal sheet 24 and the element data (B) for the post-forming shaped metal sheet 26. In Example 2, a stress of 1.0 times the stress (F1) was applied to the blank portions 24B in FIG. 32 and a stress of 1.2 times the stress (F1) was applied to the diagonal line portion 24A, whereas in Comparative Example 2 a stress of 1.0 times the stress (F1) was applied to the blank portions 24B in FIG. 32 and a stress of 2.0 times the stress (F1) was applied to the diagonal line portion 24A. The formed article after forming was visually inspected for the presence or absence of cracking or crease marks. The results thereof are listed in Table 2.

As illustrated in Table 2, although forming could be performed without the occurrence of cracking or necking when employing the material 1 to the material 3 in Example 2, in Comparative Example 2, although forming could be performed without the occurrence of cracking or necking when employing the material 1, cracking occurred when employing the material 2 to the material 3. This is due to setting too large a stress in the diagonal line portion 24A in FIG. 32 to be applied to the element data (A) for the provisional metal sheet 24 when deriving the shape and the element data (D) for the hypothetical metal sheet 25.

Example 3

Based on the shapes of the product shape 30 illustrated in FIG. 10A and FIG. 10B and the provisional metal sheet 24 illustrated in FIG. 11A, the shape of the hypothetical metal sheet 25 prior to forming and an intermediate shape were derived by using the procedure explained in the first exemplary embodiment. Then after forming the four types of sheet steel having the shape of the hypothetical metal sheet 25 prior to forming and the sheet thicknesses, tensile strengths, and elongations (EL) listed in Table 1 into the intermediate shape, the target shape was then formed.

The shapes of the hypothetical metal sheet 25 prior to forming and the intermediate shape were derived according to the flowcharts of FIG. 7, FIG. 8, and FIG. 9. First, the element data (B) for the post-forming shaped metal sheet 26 illustrated in FIG. 12 was derived using forming analysis from the element data (A) for the provisional metal sheet 24 illustrated in FIG. 11B, this being the shape of the provisional metal sheet 24 illustrated in FIG. 11A divided into elements in a finite element method. Moreover, the shape and the element data (D) for the hypothetical metal sheet 25 illustrated in FIG. 13A and FIG. 13B were then derived from the element data (A) for the provisional metal sheet 24 and the element data (B) for the post-forming shaped metal sheet 26. When this was performed, the stress applied to the element data (A) for the provisional metal sheet 24 at step 107 in FIG. 8 was set to a stress of 1.0 times the stress (F1) derived at step 106.

Next, the intermediate shape was derived from the element data (B) for the post-forming shaped metal sheet 26 and the element data (D) for the hypothetical metal sheet 25.

When this was performed, at step 205 in FIG. 9, the finite element model (J) was built by applying a smaller stress than the stress (F3), or by applying no stress, to finite elements that are not the finite elements applied with the stress (F3) in the element data (D) for the hypothetical metal sheet 25 prior to forming. Regions applied with the stress (F3) are the regions indicated by the diagonal line portions 25A in FIG. 15A, and regions applied with a smaller stress than the stress (F3) are the regions in the blank portion 25B in FIG. 15A that lie in the vicinity of the boundary to the diagonal line portions 25A. No stress was applied to regions in the blank portion 25B in FIG. 15A other than these regions in the blank portion 25B. The stress distribution at this stage was as illustrated by the solid lines in the graphs of FIG. 15B and FIG. 15C. Note that the dashed lines in the graphs in FIG. 15B and FIG. 15C illustrate the distribution of the stress (F3) for the regions where actually a smaller stress than the stress (F3) is applied or where actually stress is not applied (i.e. regions corresponding to the blank portion in FIG. 15A).

The built finite element model (J) was then employed for elastic deformation analysis to derive the intermediate shape. The metal sheet 52 illustrated in FIG. 30 was then formed into the intermediate shape, followed by an attempt to form the target shape 53 illustrated in FIG. 31.

The formed article after forming was visually inspected for the presence or absence of cracking or crease marks. The results thereof are listed in Table 2.

As illustrated in Table 2, neither crease marks nor cracking occurred when employing the material 1 and the material 2 in Example 3. However, although cracking did not occur with the material 3 necking did occur, and cracking occurred with the material 4.

When employing the material 2, which has higher strength and lower extensibility than the material 1, although cracking occurred in Comparative Example 1, forming could be performed without cracking occurring in Example 3 of the present invention. The reason why crease marks did not occur in Example 3 is that, as illustrated in FIG. 15B and FIG. 15C, the change in stress between finite elements applied with the stress (F3) and other finite elements was gentler than in the case of Example 1.

Example 4

Based on the shapes of the product shape 30 illustrated in FIG. 10A and FIG. 10B and the provisional metal sheet 24 illustrated in FIG. 11A, the four types of sheet steel having the sheet thicknesses, tensile strengths, and elongations (EL) listed in Table 1 were formed into the target shape following the procedure explained in the second exemplary embodiment. Intermediate shapes were designed by the procedure explained in the second exemplary embodiment. Namely, a first intermediate shape and a second intermediate shape were designed. FIG. 27 illustrates a first intermediate shape 46 and FIG. 28 illustrates a second intermediate shape 48. When designing the intermediate shapes, the stress applied to the element data (A) for the provisional metal sheet 24 at step 107 in FIG. 8 was set to a stress of 1.0 times the stress (F1) derived at step 106. At step 205 in FIG. 9, a finite element model (J) was built to apply no stress to finite elements that are not the finite elements applied with the stress (F3), and an intermediate shape obtained through performing the elastic deformation analysis of step 207. The formed article after forming was visually inspected for the presence or absence of cracking or crease marks. The results thereof are listed in Table 2. As illustrated in Table 2, forming could be performed without necking or cracking occurring for all of the materials 1 to 4 in Example 4.

As described above, in Example 1 and Example 3, the metal sheet made from the material 2 (thickness: 1.2 mm, tensile strength: 1029 MPa, EL: 15%) was able to be formed into the target shape without cracking or necking occurring. Crease marks were also absent in the case of Example 3. Moreover, in Example 2, the metal sheet made from the material 3 (thickness: 1.2 mm, tensile strength: 1195 MPa, EL: 10%) was able to be formed into the target shape without cracking or necking occurring. Furthermore, in Example 4, the metal sheet made from the material 4 (thickness: 1.2 mm, tensile strength: 1348 MPa, EL: 8%) was also able to be formed into the target shape without cracking or necking occurring.

However, in Comparative Examples 1 and 2, although the metal sheet made from the material 1 (thickness: 1.2 mm, tensile strength: 460 MPa, EL: 37%) was able to be formed into the target shape without cracking or necking occurring, cracking occurred and the target shape could not be formed when the metal sheets were made from the materials 2 to 4. It is thought that cracking of the material 2 occurred due to not forming an intermediate shape in Comparative Example 1. Moreover, in Comparative Example 2, it is thought that cracking occurred when employing the material 2 due to the stress applied to the diagonal line region in FIG. 32 being set to a stress of 2.0 times the stress (F1) derived at step 106.

TABLE 1

|  | Sheet thickness (mm) | Tensile strength (MPa) | EL (%) |
| --- | --- | --- | --- |
| Material 1 | 1.2 | 460 | 37 |
| Material 2 | 1.2 | 1029 | 15 |
| Material 3 | 1.2 | 1195 | 10 |
| Material 4 | 1.2 | 1348 | 8 |

TABLE 2

|  | Comparative Example 1 | Example 1 | Example 2 | Comparative Example 2 | Example 3 | Example 4 |
| --- | --- | --- | --- | --- | --- | --- |
| Intermediate shape formation | No intermediate shape formed | Single intermediate shape formed | Single intermediate shape formed | Single intermediate shape formed | Single intermediate shape formed | Two intermediate shapes formed |
| Multiple of stress (F1), this being the stress required to be applied to element data (A) for provisional metal sheet for elastic deformation, when | 1.0 | 1.0 | 1.0 and 1.2 | 1.0 and 1.2 | 1.0 | 1.0 |

TABLE 2-continued

| | | Comparative Example 1 | Example 1 | Example 2 | Comparative Example 2 | Example 3 | Example 4 |
|---|---|---|---|---|---|---|---|
| deriving element data (D) for hypothetical metal sheet prior to forming | | | | | | | |
| Pressing outcome | Material 1 | Good No crease marks | Good Some crease marks | Good Some crease marks | Good Some crease marks | Good No crease marks | Good No crease marks |
| | Material 2 | Cracking | Good Some crease marks | Good Some crease marks | Cracking | Good No crease marks | Good Some crease marks |
| | Material 3 | Cracking | Acceptable Necking and some crease marks | Good Some crease marks | Cracking | Acceptable Necking occurred but no crease marks | Good Some crease marks |
| | Material 4 | Cracking | Cracking | Cracking | Cracking | Cracking | Good Some crease marks |

Comparative Example 3

Figure 33:
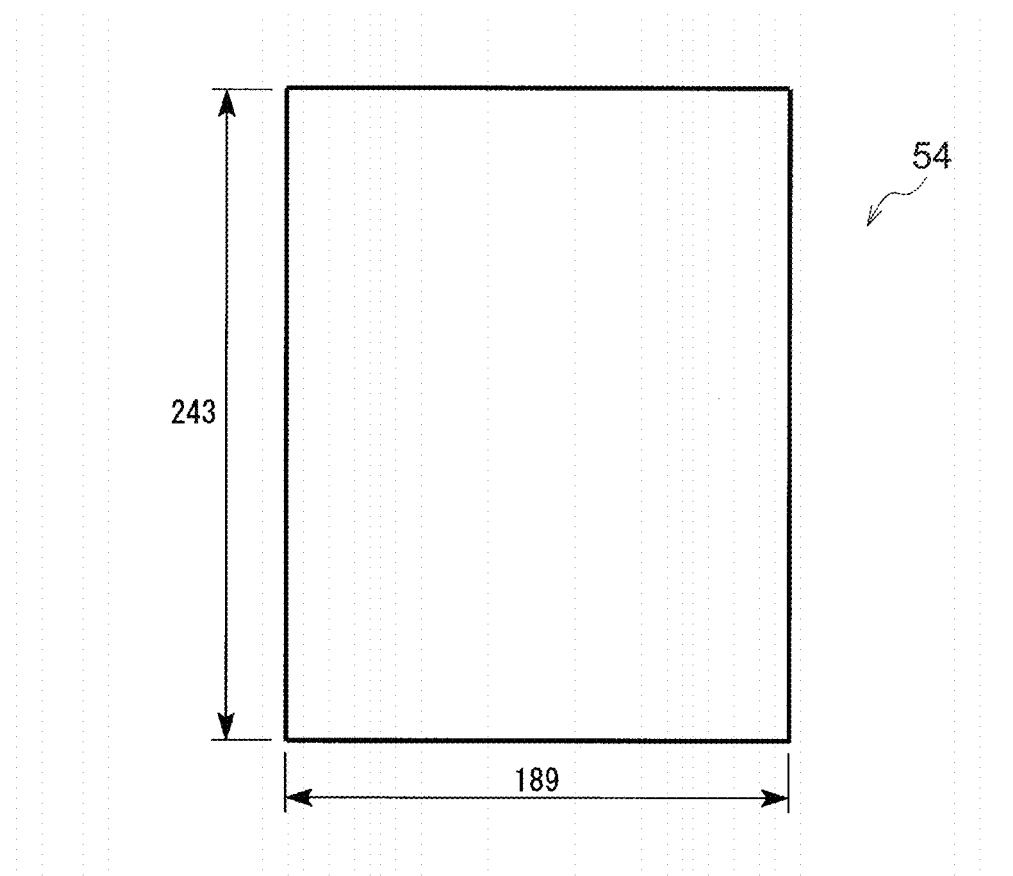
FIG. 33 is a schematic plan view illustrating a stock metal sheet corresponding to Comparative Example 3.
Figure 34:
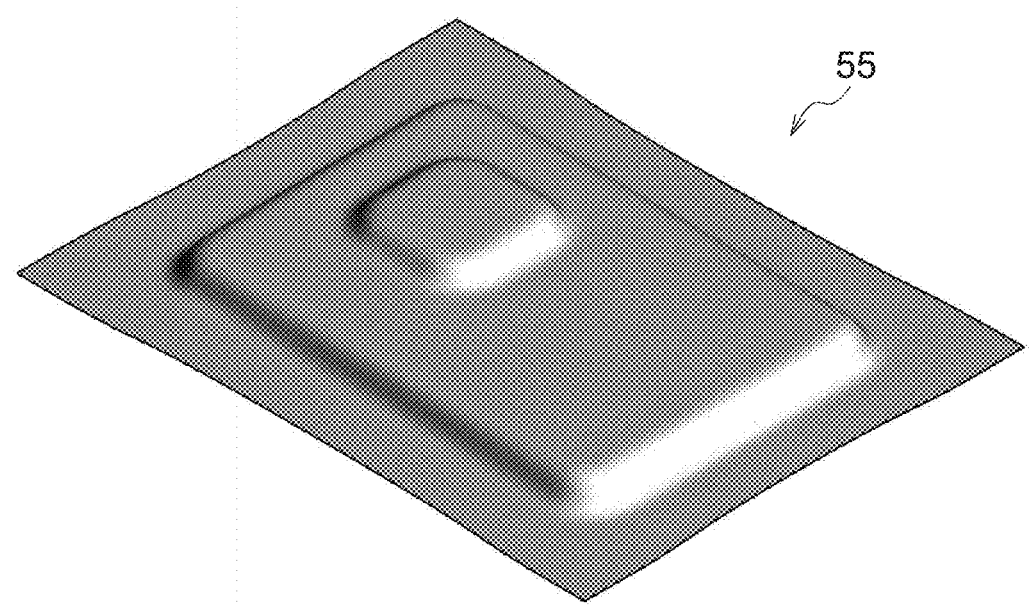
FIG. 34 is a perspective view illustrating a target shape corresponding to Comparative Example 3.

In order to obtain the product shape 30 illustrated in FIG. 19A and FIG. 19B, a metal sheet 54 illustrated in FIG. 33 was press-formed (drawn) without going through an intermediate shape, to manufacture a formed article 55 having a target shape as illustrated in FIG. 34. More precisely, an outer edge portion of the metal sheet was restrained by a die and a blank holder, and drawing was performed by pushing in a punch. Three types of sheet steel (the materials 1 to 3) having the sheet thicknesses, tensile strengths, and elongations (EL) listed in Table 1 were employed as the metal sheets. The presence or absence of cracking was checked by visual inspection of the formed article after forming. The results thereof are listed in Table 3.

As illustrated in Table 3, for Comparative Example 3, although forming could be performed without cracking occurring when using the material 1 having low strength and good extensibility, cracking occurred when using the materials 2 to 3 made from high strength sheet steel having a tensile strength in excess of 1000 MPa.

Example 5

Based on the shapes of the product shape illustrated in FIG. 19A and FIG. 19B and the provisional metal sheet 24 illustrated in FIG. 20, the shape of the hypothetical metal sheet 25 prior to forming and an intermediate shape were derived by using the procedure explained in the first exemplary embodiment. Then after forming the three types of sheet steel (the materials 1 to 3) having the shape of the hypothetical metal sheet 25 prior to forming and the sheet thicknesses, tensile strengths, and elongations (EL) listed in Table 1 into the intermediate shape, the target shape was then formed.

FIG. 26 illustrates a metal sheet 44 formed into a target shape by forming steel of the material 2 having the shape of the hypothetical metal sheet 25. The shape of the hypothetical metal sheet 25 prior to forming and the intermediate shape were derived according to the flowcharts in FIG. 7, FIG. 8, and FIG. 9. First, the element data (B) for the post-forming shaped metal sheet 26 illustrated in FIG. 22 was derived using forming analysis from the element data (A) for the provisional metal sheet 24 illustrated in FIG. 21, this being the shape of the provisional metal sheet 24 illustrated in FIG. 20 divided into elements in a finite element method. Moreover, the shape and the element data (D) for the hypothetical metal sheet 25 illustrated in FIG. 23A and FIG. 23B were derived from the element data (A) for the provisional metal sheet 24 and the element data (B) for the post-forming shaped metal sheet 26. When this was performed, the stress applied to the element data (A) for the provisional metal sheet 24 at step 107 in FIG. 8 was set as a stress of 1.0 times the stress (F1) derived at step 106.

Next, an intermediate shape was derived from the element data (B) for the post-forming shaped metal sheet 26 and the element data (D) for the hypothetical metal sheet 25. When this was performed, the finite element model (J) was built at step 205 in FIG. 9 so as not to apply stress to finite elements that are not the finite elements applied with the stress (F3) in the element data (D) for the hypothetical metal sheet 25 prior to forming. Regions applied with the stress (F3) are the regions illustrated by the diagonal line portions 25A in FIG. 24, and a region not applied with stress is the region illustrated by the blank portion 25B in FIG. 24. The built finite element model (J) was then employed for elastic deformation analysis to derive the intermediate shape. The derived intermediate shape is illustrated in FIG. 25.

The metal sheet 54 illustrated in FIG. 33 made from the materials 1 to 3 was then formed into the intermediate shape illustrated in FIG. 25, followed by an attempt to form the shape illustrated in FIG. 34. The formed article after forming was visually inspected for the presence or absence of cracking or crease marks. The results thereof are listed in Table 3. As illustrated in Table 3, in Example 5, forming could be performed without cracking occurring for the material 1 to the material 3. In Example 5, forming could also be performed without cracking occurring even for the materials 2 to 3, these being made from high strength sheet steel having a tensile strength in excess of 1000 MPa, for which cracking occurred in the case of Comparative Example 3.

TABLE 3

|  |  | Comparative Example 3 | Example 5 |
|---|---|---|---|
| Intermediate shape formation |  | No intermediate shape formed | Single intermediate shape formed |
| Pressing outcome | Material 1 | Good | Good |
|  | Material 2 | Cracking | Good |
|  | Material 3 | Cracking | Good |

EXPLANATION OF THE REFERENCE NUMERALS

A element data for provisional metal sheet
B element data for post-forming shaped metal sheet
D element data for hypothetical metal sheet prior to forming
F1 stress required to be applied to each element of element data (A) for provisional metal sheet for elastic deformation into a shape of each topologically corresponding element in element data (B) for post-forming shaped metal sheet
F2 stress greater than 1.0 times F1 but no more than 1.5 times F1

What is claimed is:

1. A method of forming a metal sheet into a target shape by press-forming, such that the metal sheet is formed into an intermediate shape that is different from the target shape and then the target shape is formed from the intermediate shape, the method comprising:
when forming the intermediate shape from the metal sheet, forming the intermediate shape by forming a first region including at least a portion at which a ratio of sheet thickness reduction from the metal sheet is larger when the target shape is formed via the intermediate shape than when the target shape is formed directly from the metal sheet; and
based on element data (B) for a post-forming shaped metal sheet and element data (D) for a hypothetical metal sheet prior to forming derived by finite element analysis in which a first step and a second step are sequentially performed:
imparting strain to at least one element, corresponding to the first region, in the element data (D), at a strain required for deformation into respective shapes of respective elements in the element data (B) that correspond to each of the at least one element in the element data (D);
for remaining elements in the element data (D), corresponding to a second region including at least a portion at which a ratio of sheet thickness reduction from the metal sheet is larger when the target shape is formed directly from the metal sheet than when the target shape is formed via the intermediate shape, imparting strain, having a smaller absolute value than strain required for deformation into respective shapes of respective elements in the element data (B) corresponding to each of the remaining elements, to the remaining elements or imparting no strain to the remaining elements; and
adopting a shape of element data (G) for a hypothetical metal sheet after deformation, in a case in which the hypothetical metal sheet prior to forming has been deformed, as the intermediate shape, wherein:
the first step comprises preparing element data (A) for a provisional metal sheet and the element data (B) for the post-forming shaped metal sheet; and
the second step comprises correcting the element data (A) so as to reduce a difference in shape between each corresponding element in the element data (A) and the element data (B), and deriving the element data (D).

2. The method of claim 1, wherein, in the first step, the element data (B) is derived, by formation analysis using a finite element method, based on the element data (A).

3. The method of claim 1, wherein, in the first step, the element data (A) is derived, by reverse analysis using a finite element method, based on the element data (B).

4. The method of claim 1, wherein, in the second step, a step 2-1, a step 2-2, and a step 2-3 are sequentially performed such that the element data (A) is corrected so as to reduce the difference in shape between each corresponding element in the element data (A) and the element data (B), and the element data (D) is derived, wherein:
step 2-1 comprises deriving a stress (F1) for each element in the element data (A), the stress (F1) being a stress amount required to elastically deform each of the elements in the element data (A) into a shape of each corresponding element in the element data (B);
step 2-2 comprises building a finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element; and
step 2-3 comprises deriving post-elastic-deformation element data (H) by performing elastic deformation analysis using a finite element method based on the finite element model (I) built in the step 2-2, correcting respective shapes of the finite elements in the element data (A) to respective shapes of the finite elements of the post-elastic-deformation finite element data (H), and adopting the corrected finite element data as the element data (D).

5. The method of claim 4, wherein the stress (F2) has an absolute value that is larger than the stress (F1) but no more than 1.5 times larger than the stress (F1).

6. The method of claim 1, further comprising:
deriving a stress (F3) for each element in the element data (D), the stress (F3) being a stress amount required for elastic deformation into respective shapes of the respective elements in the element data (B) corresponding to the respective elements in the element data (D);
building a finite element model (J) by applying the stress (F3) required for the elastic deformation to at least one of the elements in the element data (D), and by applying a stress having a smaller absolute value than the stress (F3) required for the elastic deformation, or by applying no stress, to remaining elements in the element data (D); and
performing elastic deformation analysis based on the finite element model (J), using a finite element method, to derive the element data (G) for the hypothetical metal sheet after deformation, by:
imparting strain to at least one of the elements in the element data (D) at a strain required for deformation into respective shapes of the respective elements in the element data (B) corresponding to the at least one of the elements, and
imparting strain to remaining elements in the element data (D) at a strain having a smaller absolute value than the strain required for deformation into respective shapes of the respective elements in the element data (B)

corresponding to the remaining elements, or imparting no strain to the remaining elements in the element data (D).

7. The method of claim 6, further comprising applying stress to the remaining elements such that the stress applied to elements, among the remaining elements in the element data (D) that are in a vicinity of a boundary with the at least one of the elements, has a smaller absolute value than the stress (F3), and the absolute value of the stress gradually decreases in a direction away from the elements in the vicinity of the boundary.

8. The method of claim 1, further comprising recalculating the element data (D) by performing the first step and the second step, or by performing the second step, after substituting the element data (D) obtained in the second step in place of the element data (A) in the first step.

9. The method of claim 1, further comprising:
setting an upper limit threshold value, or an upper limit threshold value and a lower limit threshold value, for a state change amount ($\Delta X$) before and after forming for each corresponding element in the element data (D) and the element data (B); and
repeatedly recalculating the element data (D) by performing the first step and the second step, or by performing the second step, after substituting the element data (D) obtained in the second step in place of the element data (A) in the first step, either:
until the element data (D) has a maximum value of the state change amount ($\Delta X$) that is not higher than the threshold value when the threshold value has only been set for the upper limit of the state change amount ($\Delta X$), or
until the element data (D) has a maximum value and a minimum value of the state change amount ($\Delta X$) lying in a range from the upper limit threshold value to the lower limit threshold value when the threshold values have been set for the upper limit and the lower limit of the state change amount ($\Delta X$).

10. A method of forming a metal sheet into a target shape by press-forming such that the metal sheet is sequentially formed into a plurality of intermediate shapes that are different from the target shape and the target shape is formed from a final intermediate shape, the method comprising:
in at least one process selected from a group consisting of a process to obtain the plurality of intermediate shapes and a process to obtain the target shape, adopting a shape obtained by the method of claim 1 as an intermediate shape to be formed in a process preceding the at least one process.

11. A method of designing an intermediate shape when forming a metal sheet into a target shape by press-forming, such that the metal sheet is formed into an intermediate shape that is different from the target shape and then the target shape is formed from the intermediate shape, the method comprising:
when forming the intermediate shape from the metal sheet, adopting, as the intermediate shape, a shape in which a first region is formed that includes at least a portion at which a ratio of sheet thickness reduction from the metal sheet is larger when the target shape is formed via the intermediate shape than when the target shape is formed directly from the metal sheet; and
based on element data (B) for a post-forming shaped metal sheet and element data (D) for a hypothetical metal sheet prior to forming derived by finite element analysis, in which a first step and a second step are sequentially performed:
imparting strain to at least one element corresponding to the first region in the element data (D), at a strain required for deformation into respective shapes of respective elements in the element data (B) corresponding to each element of the at least one element;
for remaining elements in the element data (D) corresponding to a second region including at least a portion at which a ratio of sheet thickness reduction from the metal sheet is larger when the target shape is formed directly from the metal sheet than when the target shape is formed via the intermediate shape, imparting strain, having a smaller absolute value than strain required for deformation into respective shapes of respective elements in the element data (B) corresponding to each of the remaining elements, to the remaining elements, or imparting no strain to the remaining elements; and
adopting a shape of element data (G) for a hypothetical metal sheet after deformation, in a case in which the hypothetical metal sheet prior to forming has been deformed, as the intermediate shape, wherein:
the first step comprises preparing element data (A) for a provisional metal sheet and the element data (B); and
the second step comprises correcting the element data (A) so as to reduce a difference in shape between each of topologically corresponding elements in the element data (A) and the element data (B), and deriving the element data (D).

12. The method of designing an intermediate shape of claim 11, wherein, in the first step, the element data (B) is derived by formation analysis using a finite element method, based on the element data (A).

13. The method of designing an intermediate shape of claim 11, wherein, in the first step, the element data (A) is derived, by reverse analysis using a finite element method, based on the element data (B).

14. The method of designing an intermediate shape of claim 11, wherein, in the second step, a step 2-1, a step 2-2, and a step 2-3 are sequentially performed such that:
the element data (A) is corrected so as to reduce the difference in shape between each corresponding element in the element data (A) and the element data (B), and the element data (D) is derived, wherein:
step 2-1 comprises deriving a stress (F1) for each element in the element data (A), the stress (F1) being a stress amount required to be applied to each of the elements in the element data (A) to elastically deform each of the elements in the element data (A) into a shape of each of the topologically corresponding elements in the element data (B);
step 2-2 comprises building a finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element; and
step 2-3 comprises deriving post-elastic-deformation element data (H) by performing elastic deformation analysis using a finite element method based on the finite element model (I) built in the step 2-2, correcting respective shapes of the finite elements in the element data (A) to respective shapes of the finite elements of the post-elastic-deformation finite element data (H), and adopting the corrected finite element data as the element data (D).

15. The method of designing an intermediate shape of claim 14, wherein the stress (F2) has an absolute value that is larger than the stress (F1) but no more than 1.5 times larger than the stress (F1).

16. The method of designing an intermediate shape of claim 11, further comprising:
    deriving a stress (F3) for each element in the element data (D), the stress (F3) being a stress amount required for elastic deformation into respective shapes of the respective elements in the element data (B) corresponding to the respective elements in the element data (D);
    building a finite element model (J) by applying the stress (F3) required for the elastic deformation to at least one of the elements in the element data (D), and by applying a stress having a smaller absolute value than the stress (F3) required for the elastic deformation, or by applying no stress, to remaining elements in the element data (D); and
    performing elastic deformation analysis based on the finite element model (J) using a finite element method, to derive the element data (G) for the hypothetical metal sheet after deformation in a case of deformation by:
    imparting strain to at least one of the elements in the element data (D) at a strain required for deformation into respective shapes of the respective elements in the element data (B) corresponding to the at least one of the elements, and
    imparting strain to remaining elements in the element data (D) at a strain having a smaller absolute value than the strain required for deformation into respective shapes of the respective elements in the element data (B) corresponding to the remaining elements, or imparting no strain to the remaining elements in the element data (D).

17. The method of designing an intermediate shape of claim 16, further comprising applying stress to the remaining elements such that the stress applied to elements, among the remaining elements in the element data (D) that are in a vicinity of a boundary with the at least one of the elements, has a smaller absolute value than the stress (F3), and the absolute value of the stress gradually decreases in a direction away from the elements in the vicinity of the boundary.

18. The method of designing an intermediate shape of claim 11, further comprising recalculating the element data (D) by performing the first step and the second step, or by performing the second step, after substituting the element data (D) obtained in the second step in place of the element data (A) in the first step.

19. The method of designing an intermediate shape of claim 11, further comprising:
    setting an upper limit threshold value, or an upper limit threshold value and a lower limit threshold value, for a state change amount ($\Delta X$) before and after forming for each topologically corresponding finite element in the element data (D) and the element data (B); and
    repeatedly recalculating the element data (D) by performing the first step and the second step, or by performing the second step, after substituting the element data (D) obtained in the second step in place of the element data (A) in the first step, either:
    until the element data (D) has a maximum value of the state change amount ($\Delta X$) that is not higher than the threshold value when the threshold value has only been set for the upper limit of the state change amount ($\Delta X$), or
    until the element data (D) has a maximum value and a minimum value of the state change amount ($\Delta X$) lying in a range from the upper limit threshold value to the lower limit threshold value when the threshold values have been set for the upper limit and the lower limit of the state change amount ($\Delta X$).

20. A method of designing an intermediate shape when forming a metal sheet into a target shape by press-forming, such that the metal sheet is sequentially formed into a plurality of intermediate shapes that are different from the target shape and the target shape is formed from a final intermediate shape, the method comprising:
    in at least one process selected from a group consisting of a process to obtain the plurality of intermediate shapes and a process to obtain the target shape, adopting a shape obtained by the method of claim 11 as an intermediate shape to be formed in a process preceding the at least one process.

21. A die for forming a metal sheet, the die comprising die faces having a shape of an intermediate shape obtained by the method of forming a metal sheet of claim 1.

22. A non-transitory computer readable recording medium at which is recorded a computer program for designing an intermediate shape used when forming a metal sheet into a target shape by press-forming, such that the metal sheet is formed into an intermediate shape that is different from the target shape and then the target shape is formed from the intermediate shape, the computer program causing a computer to execute processing comprising:
    when forming the intermediate shape from the metal sheet, adopting, as the intermediate shape, a shape in which a first region is formed that includes at least a portion at which a ratio of sheet thickness reduction from the metal sheet is larger when the target shape is formed via the intermediate shape than when the target shape is formed directly from the metal sheet; and
    finite element analysis based on element data (A) for a provisional metal sheet and element data (B) for a post-forming shaped metal sheet corresponding to the element data (A), the finite element analysis comprising:
    sequentially performing a step 2-1 and a step 2-2 and a step 2-3; and
    thereby building a finite element model (I) for performing elastic deformation analysis using a finite element method to correct the element data (A) so as to reduce a difference in shape between each corresponding element in the element data (A) and the element data (B), and to derive element data (D) for a hypothetical metal sheet prior to forming, wherein:
    step 2-1 comprises deriving a stress (F1) for each element in the element data (A), the stress (F1) being a stress amount required to be applied to each of the elements in the element data (A) to elastically deform each of the elements in the element data (A) into a shape of each of the corresponding elements in the element data (B);
    step 2-2 comprises building the finite element model (I) by applying a stress (F2), having an absolute value that is not lower than the stress (F1) derived in the step 2-1, to each of the elements in the element data (A) under application of a condition of restraining displacement in out-of-plane directions of nodes of each finite element; and
    step 2-3 comprises deriving post-elastic-deformation element data (H) by performing elastic deformation analysis using a finite element method based on the finite element model (I), correcting respective shapes of the finite elements in the element data (A) to respective shapes of the finite elements of the post-elastic-deformation finite element data (H), and adopting the corrected finite element data as the element data (D).

23. The non-transitory computer readable recording medium of claim 22, wherein the stress (F2) has an absolute value that is larger than the stress (F1) but no more than 1.5 times larger than the stress (F1).

24. The non-transitory computer readable recording medium of claim 22, the processing further comprising finite element analysis based on the element data (D) and the element data (B) corresponding to the element data (D), the finite element analysis comprising:
  deriving a stress (F3) for each element in the element data (D), the stress (F3) being a stress amount required for elastic deformation into respective shapes of the respective elements in the element data (B) corresponding to the respective elements in the element data (D); and
  building a finite element model (J) by applying the stress (F3) required for the elastic deformation to at least one of the elements corresponding to the first region in the element data (D), and by applying a stress having a smaller absolute value than the stress (F3) required for the elastic deformation, or by applying no stress, to remaining elements in the element data (D), the remaining elements corresponding to a second region including at least a portion at which a ratio of sheet thickness reduction from the metal sheet is larger when the target shape is formed directly from the metal sheet than when the target shape is formed via the intermediate shape.

25. The non-transitory computer readable recording medium of claim 24, the finite element analysis further comprising:
  performing elastic deformation analysis using a finite element method based on the finite element model (J), and
  deriving element data (G) for the hypothetical metal sheet after deformation in a case in which the hypothetical metal sheet prior to forming has been deformed by:
  imparting strain to at least one of the elements corresponding to the first region in the element data (D) at a strain required for deformation into respective shapes of the respective elements in the element data (B) corresponding to the at least one of the elements, and
  imparting strain to remaining elements corresponding to the second region in the element data (D) at a strain having a smaller absolute value than the strain required for deformation into respective shapes of the respective elements in the element data (B) corresponding to the remaining elements, or imparting no strain to the remaining elements.

26. The non-transitory computer readable recording medium of claim 24, the processing further comprising applying stress to the remaining elements such that the stress applied to elements, among the remaining elements in the element data (D) that are in a vicinity of a boundary with the at least one of the elements, has a smaller absolute value than the stress (F3), and the absolute value of the stress gradually decreases in a direction away from the elements in the vicinity of the boundary.

27. The non-transitory computer readable recording medium of claim 24, the processing further comprising:
  a first step of deriving element data (A) for the provisional metal sheet and element data (B) for the post-forming shaped metal sheet for when forming the provisional metal sheet into the target shape by forming analysis using a finite element method; and
  a third step of deriving the intermediate shape by performing elastic deformation analysis using a finite element method based on the finite element model (J).

28. The non-transitory computer readable recording medium of claim 27, the processing further comprising re-calculating the element data (D) by sequentially performing the first step to the step 2-3, or the step 2-1 to the step 2-3, after substituting the element data (D) obtained in the step 2-3 in place of the element data (A) in the first step.

29. The non-transitory computer readable recording medium of claim 27, the processing further comprising:
  setting an upper limit threshold value, or an upper limit threshold value and a lower limit threshold value, for a state change amount ($\Delta X$) before and after forming for each corresponding element in the element data (D) and the element data (B); and
  repeatedly recalculating the element data (D) by performing the first step to the step 2-3, or by performing the step 2-1 to the step 2-3, after the substituting element data (D) obtained in the step 2-3 in place of the element data (A) in the first step, either:
  until the element data (D) has a maximum value of the state change amount ($\Delta X$) that is not higher than the threshold value when the threshold value has only been set for the upper limit of the state change amount ($\Delta X$), or
  until the element data (D) has a maximum value and a minimum value of the state change amount ($\Delta X$) lying in a range from the upper limit threshold value to the lower limit threshold value when the threshold values have been set for the upper limit and the lower limit of the state change amount ($\Delta X$).

30. The non-transitory computer readable recording medium of claim 27, wherein:
  the computer program is employed to derive the intermediate shape when forming a metal sheet into a target shape by press-forming such that the metal sheet is sequentially formed into a plurality of the intermediate shapes that are different from the target shape and the target shape is formed from a final intermediate shape; and
  the computer program causes a computer to substitute a shape derived by the computer program for the intermediate shape and to sequentially perform the first step to the third step.

* * * * *